(12) United States Patent
Mase

(10) Patent No.: US 9,633,278 B2
(45) Date of Patent: Apr. 25, 2017

(54) OBJECT IDENTIFICATION DEVICE, METHOD, AND STORAGE MEDIUM

(71) Applicant: NEC Corporation, Minato-ku, Tokyo (JP)

(72) Inventor: Ryota Mase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/655,836

(22) PCT Filed: Dec. 25, 2013

(86) PCT No.: PCT/JP2013/007579
§ 371 (c)(1),
(2) Date: Jun. 26, 2015

(87) PCT Pub. No.: WO2014/103297
PCT Pub. Date: Jul. 3, 2014

(65) Prior Publication Data
US 2015/0356374 A1    Dec. 10, 2015

(30) Foreign Application Priority Data

Dec. 28, 2012 (JP) ................................. 2012-288397

(51) Int. Cl.
*G06K 9/66* (2006.01)
*G06K 9/46* (2006.01)
(Continued)

(52) U.S. Cl.
CPC .......... *G06K 9/4671* (2013.01); *G06T 7/0044* (2013.01); *G06T 7/60* (2013.01); *G06T 2207/10004* (2013.01)

(58) Field of Classification Search
CPC ............................ G06K 9/4671; G06T 7/0044
(Continued)

(56) References Cited

U.S. PATENT DOCUMENTS

| 6,711,293 B1 | 3/2004 | Lowe |
| 2009/0141984 A1 | 6/2009 | Nakamura et al. |
| 2010/0284608 A1 | 11/2010 | Monti et al. |

FOREIGN PATENT DOCUMENTS

| CN | 1790052 A | 6/2006 |
| CN | 101425144 A | 5/2009 |

(Continued)

OTHER PUBLICATIONS

Nakamura et al, an English machine translation of JP2009-116385, 2009.*

(Continued)

*Primary Examiner* — Ruiping Li

(57) ABSTRACT

Disclosed is an object identification device and the like for reducing identification error in a reference image which presents an object that is only slightly difference from an object presented in an input image. The object identification device includes a local feature quantity matching unit for calculating geometric transformation information for transformation from a coordinate in a reference image to a corresponding coordinate in an input image, and matching a local feature quantity extracted from the reference image and a local feature quantity extracted from the input image, an input image different area determination unit for transforming the different area in the reference image on a basis of the geometric transformation information about the input image determined to be in conformity by the matching, and determining a different area in the input image corresponding to the different area in the reference image, an input image different area feature quantity extraction unit for correcting a different area in the input image, and extracting a feature quantity from the corrected different area of the input image, and a feature quantity matching unit for matching a feature quantity extracted by the input image different (Continued)

area feature quantity extraction unit and a feature quantity extracted from the different area in the reference image, and outputting a matching result.

10 Claims, 55 Drawing Sheets

(51) Int. Cl.
*G06T 7/00* (2017.01)
*G06T 7/60* (2017.01)

(58) Field of Classification Search
USPC .......................................................... 382/195
See application file for complete search history.

(56) References Cited

FOREIGN PATENT DOCUMENTS

| | | |
|---|---|---|
| CN | 101620671 A | 1/2010 |
| CN | 101425144 B | 5/2012 |
| JP | 2007115109 A | 5/2007 |
| JP | 2009116385 A | 5/2009 |
| JP | 2010079545 A | 4/2010 |
| JP | 2010-128925 A | 6/2010 |
| JP | 2010128925 A | 6/2010 |
| JP | 2010266964 A | 11/2010 |
| JP | 2011-076575 A | 4/2011 |
| JP | 2011076575 A | 4/2011 |
| WO | 2012108088 A1 | 8/2012 |

OTHER PUBLICATIONS

Shiiyama et al, an English machine translation of JP2011-076575, 2011.*
Soma et al, an English machine translation of JP2010-128925, 2010.*
David G. Lowe, "Distinctive Image Features from Scale-Invariant Keypoints", (United States), International Journal of Computer Vision, 60(2), Nov. 2004, p. 91-110. Cited in Specification.
International Search Report for PCT Application No. PCT/JP2013/007579, mailed on Apr. 1, 2014.
English Translation of Written Opinion for PCT Application No. PCT/JP2013/007579.
Taiwanese Office Action for TW Application No. 102148002 dated on Nov. 16, 2015 with English Translation.
Chinese Office Action for CN Application No. 201380073881.3 mailed on Nov. 30, 2016 with English Translation.

* cited by examiner

OBJECT IDENTIFICATION DEVICE, METHOD, AND STORAGE MEDIUM

This application is a National Stage Entry of PCT/JP2013/007579 filed on Dec. 25, 2013, which claims priority from Japanese Patent Application 2012-288397 filed on Dec. 28, 2012, the contents of all of which are incorporated herein by reference, in their entirety.

TECHNICAL FIELD

The present invention relates to a device, a method, and a storage medium for accurately identifying an object in an image.

BACKGROUND ART

A method has been suggested to extract feature quantities in a local area (local feature quantities) around each feature point by detecting many distinctive points in an image (feature points) in order to identify a subject in the image in a robust manner against changes in the size of image-capturing and the angle, and occlusion. A local feature quantity extraction device using SIFT (Scale Invariant Feature Transform) feature quantity is disclosed in PTL1 and NPL1 as a typical method.

First, a local feature quantity extraction device extracts information about brightness from each pixel of an image, and detects many distinctive points (feature points) from the extracted brightness information. Then, the local feature quantity extraction device outputs feature point information which is information about each of the detected feature points. In this case, for example, the feature point information indicates the coordinate position and the scale of a detected local feature point, the orientation of the feature point, and the like. Then, the local feature quantity extraction device obtains a local area, where feature quantity extraction is performed, from the feature point information, i.e., the coordinate value, the scale, the orientation, and the like of each of the detected feature points, and generates (describes) local feature quantities.

Then, an image including the same subject as the subject in the captured image is identified by comparing a local feature quantity 1 extracted from the captured image (i.e., input image) with a local feature quantity 2 generated from a referred image as described in NPL 1. More specifically, first, distances of all the combinations of the feature quantities describing information about each feature point constituting the local feature quantity 1 and the feature quantities constituting the local feature quantity 2 are calculated in the feature space. Then, a combination of the local feature quantity 1 and the local feature quantity 2 of which calculated distance is the closest is determined to be corresponding feature quantities. Further, a combination of feature points which are the sources for generating these corresponding feature quantities is also determined to be corresponding. Thereafter, a determination is made as to whether the combination of feature points determined to be corresponding moves according to particular geometric transformation information from the coordinate position of the feature point in the input image to the coordinate position of the feature point in the reference image. Whether the corresponding feature points are correct or incorrect is determined on the basis of the determination of this movement. In this case, when the number of feature points determined to be correctly corresponding is equal to or more than a preset value, the same subject is determined to be shown.

CITATION LIST

Patent Literature

[PTL 1] Specification of U.S. Pat. No. 6,711,293
[PTL 2] Japanese Patent Application Laid-Open No. 2010-79545
[PTL 3] WO2012/108088
[PTL 4] Japanese Patent Application Laid-Open No. 2010-266964
[PTL 5] Japanese Patent Application Laid-Open No. 2010-128925
[PTL 6] Japanese Patent Application Laid-Open No. 2007-115109

Non Patent Literature

[NPL 1] David G. Lowe, "Distinctive image features from scale-invariant keypoints", (United States), International Journal of Computer Vision, 60(2), November, 2004, p. 91-110

SUMMARY OF INVENTION

Technical Problem

In an object identification method using a related local feature quantity, an object is identified on the basis of a correspondence relationship of a local feature quantity extracted from brightness information of an input image and a local feature quantity extracted from brightness information of a reference image. As a result, in a case where an image showing an object that is only slightly difference from an object shown in an input image is adopted as a reference image, there are many corresponding feature points between the input image and the reference image, and therefore, there is a problem in that both of the images are falsely identified as an image showing the same object.

It is a main object of present invention to provide a device, a method, and a storage medium for suppressing identification error in a reference image which presents an object that is only slightly difference from an object presented in an input image, and more accurately identifying a reference image showing the identical object.

Solution to Problem

An object identification device according to the present invention includes: a local feature quantity matching unit that calculates geometric transformation information for transformation from a coordinate in a reference image to a corresponding coordinate in an input image, and matches a local feature quantity extracted from the reference image and a local feature quantity extracted from the input image; an input image different area determination unit that transforms the different area in the reference image on a basis of the geometric transformation information about the input image determined to be in conformity by the matching, and determines a different area in the input image corresponding to the different area in the reference image; an input image different area feature quantity extraction unit that corrects a different area in the input image, and extracts a feature quantity from the corrected different area of the input image; and a feature quantity matching unit that matches a feature quantity extracted by the input image different area feature quantity extraction unit and a feature quantity extracted from the different area in the reference image, and outputs a matching result.

An object identification method according to the present invention includes: calculating geometric transformation information for transformation from a coordinate in a reference image to a corresponding coordinate in an input image, and matching a local feature quantity extracted from the reference image and a local feature quantity extracted from the input image; transforming the different area in the reference image on the basis of the geometric transformation information about the input image determined to be in conformity by the matching, and determining a different area in the input image corresponding to the different area in the reference image; correcting a different area in the input image; and extracting a feature quantity from the corrected different area of the input image, and matching a feature quantity extracted from the different area of the input image and a feature quantity extracted from the different area in the reference image, and outputting a matching result.

A program according to the present invention causes a computer to execute: local feature quantity matching processing of calculating geometric transformation information for transformation from a coordinate in a reference image to a corresponding coordinate in an input image, and matching a local feature quantity extracted from the reference image and a local feature quantity extracted from the input image; input image different area determination processing of transforming the different area in the reference image on the basis of the geometric transformation information about the input image determined to be in conformity by the matching, and determining a different area in the input image corresponding to the transformed different area in the reference image; input image different area feature quantity extraction processing of correcting a different area in the input image, and extracting a feature quantity from the corrected different area of the input image; and feature quantity matching processing of matching a feature quantity extracted by the input image different area feature quantity extraction processing and a feature quantity extracted from the different area in the reference image, and outputting a matching result.

The configuration described above is employed, so that the input image different area determination unit determines the different area in the input image by transforming the different area in the reference image on the basis of the geometric transformation information calculated by the local feature quantity matching unit, and the input image different area feature quantity extraction unit extracts the feature quantity from the different area in the input image, and the feature quantity matching unit matches the feature quantity extracted from the different area in the input image and the feature quantity extracted from the different area in the reference image, and therefore, small difference, which is not able to be identified by performing only the matching based on a conventional local feature quantity, is able to be distinguished, and only an image showing the same object is able to be identified, and therefore the object of the present invention is achieved.

Further, the present invention is also able to be realized by a computer readable nonvolatile storage medium storing the program.

Advantageous Effects of Invention

According to the present invention, a technique capable of reducing identification error in a reference image which presents an object that is only slightly difference from an object presented in an input image.

DESCRIPTION OF EMBODIMENTS

First Exemplary Embodiment

The first exemplary embodiment according to the present invention will be described with reference to drawings.

Figure 1:
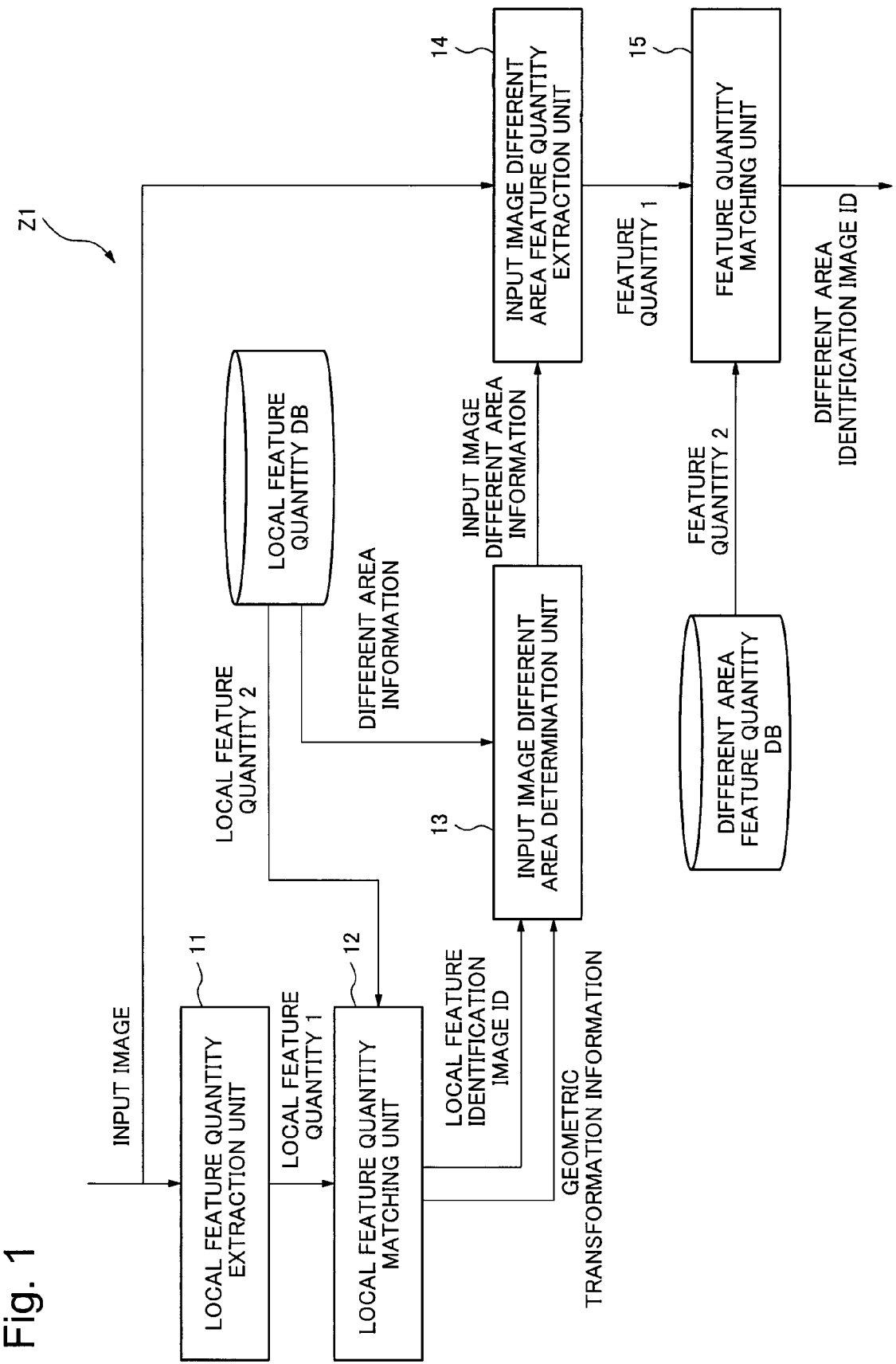
FIG. 1 is a block diagram illustrating an example of a configuration of an object identification device according to a first exemplary embodiment.

FIG. 1 is a block diagram illustrating an example of a configuration of an object identification device according to the first exemplary embodiment of the present invention. An object identification device Z1 includes a local feature quantity extraction unit 11, a local feature quantity matching unit 12, an input image different area determination unit 13, an input image different area feature quantity extraction unit 14, and a feature quantity matching unit 15. The object identification device Z1 is able to be made by using an information processing device such as a personal computer and a mobile information terminal. The function of each unit constituting the object identification device Z1 is able to be realized by, for example, using a storage area such as a memory and causing a processor to extract and execute a program stored in the storage area. It should be noted that constituent elements in other exemplary embodiments described later is able to be realized in the same manner.

A database may be abbreviated as "DB" in the drawings and the explanation below.

The local feature quantity extraction unit 11 extracts a local feature quantity from an input image. The details of processing performed by the local feature quantity extraction unit 11 will be described later.

The local feature quantity matching unit 12 matches a local feature quantity 1, which is a local feature quantity extracted from the input image by the local feature quantity extraction unit 11, and a local feature quantity 2, which is a local feature quantity extracted from a reference image, and outputs geometric transformation information for correcting geometric deviation between the input image and the reference image. This geometric transformation information is calculated in order to determine correctness/incorrectness of correspondence of a local feature point when the local feature quantity 1 and the local feature quantity 2 are matched. Further, the local feature quantity matching unit 12 outputs an image ID (Identification) of a reference image determined to be showing the identical object (and more specifically, as a result of matching, the local feature quantity is determined to be the same) as a local feature identification image ID. As illustrated in FIG. 1, the local feature quantity 2 may be extracted from multiple reference images in advance and may be stored to a database, or may be extracted on-the-fly by the local feature quantity extraction unit 11 from the reference image. When stored to the database, a local feature quantity extracted from a reference image presenting a similar object may be associated and registered. The details of processing performed by the local feature quantity matching unit 12 will be described later.

The input image different area determination unit 13 uses the geometric transformation information received from the local feature quantity matching unit 12 to perform geometric transformation on the reference image corresponding to the local feature identification image ID which is output from the local feature quantity matching unit 12, or different areas of a reference image group related to the local feature identification image ID, and outputs input image different area information.

In this case, the different area is an area where there is a slight difference between an object presented in the input image and the object presented in the reference image. There are multiple different areas in an image. For example, in a case where the different area is in the rectangular shape, the different area information of the reference image (or the reference image group) may be coordinate value information about the four corners of the different area in the reference image. Alternatively, the different area information may be information representing coordinate values of a pixel group constituting the different area in the reference image. In a case where the difference between an object presented in the input image and an object presented in the reference image is a character string area in the object, the different area information may be coordinate value information about the four corners of the reference image in the rectangular shape enclosing the entire character string, or may be a coordinate value information group about the four corners of the reference image in the rectangular shape enclosing each character constituting the character string, or may be information about both of them.

The input image different area information is information obtained by applying geometric transformation information to each of the coordinate values of the four corners of the different area in the reference image. The input image different area information is indicated by, for example, the coordinate values of the four corners of the different area in the input image. Alternatively, in a case where the different area information in the reference image is coordinate value information about a pixel group constituting the different area in the reference image, the geometric transformation information may be applied to each of the pixel group, and the coordinate value information about the pixel group constituting the different area in the input image may be adopted as the input image different area information. In a case where the difference between an object presented in the input image and an object presented in the reference image is a character string area in the object, the input image different area information may be coordinate value information about the four corners of the area of the input image obtained by applying the geometric transformation information to each coordinate value about the four corners of the reference image in the rectangular shape enclosing the entire character string. Alternatively, the input image different area information may be a coordinate value information group of the four corners of the area of the input image obtained by applying the geometric transformation information to each coordinate value about the four corners of the reference image in the rectangular shape enclosing each character constituting the character string. Still alternatively, the input image different area information may be information about both of them. The different area information of the reference image is registered in advance to the database. The method for realizing this may be such that, in a case where the local feature quantity 2 is stored as the database, the different area information of the reference image may be stored together in the local feature quantity DB as illustrated in FIG. 1. The details of processing performed by the input image different area determination unit 13 will be described later.

The input image different area feature quantity extraction unit 14 corrects the different area in the input image on the basis of the input image different area information determined by the input image different area determination unit 13, and extracts the feature quantity from the corrected different area. The details of processing performed by the input image different area feature quantity extraction unit 14 will be described later.

The feature quantity matching unit 15 matches a feature quantity 1, which is a feature quantity extracted from the different area in the input image by the input image different area feature quantity extraction unit 14, and a feature quantity 2, which is a feature quantity extracted from the different area in the reference image, and determines whether the input image and the reference image present the same object or not. The feature quantity matching unit 15 outputs, as a different area identification image ID, an image ID corresponding to an image determined to be presenting the same object. As illustrated in FIG. 1, the feature quantity 2 may be extracted from multiple reference images in advance and may be stored to a database, or may be extracted on-the-fly from the reference image. When stored to the database, a similar object may be associated and registered. The feature quantity 1 extracted from the different area of the input image and the feature quantity 2 extracted from the different area of the reference image is the feature quantities extracted by the same processing or the feature quantities of the same type. The details of the feature quantity matching unit 15 will be described later.

Figure 2:
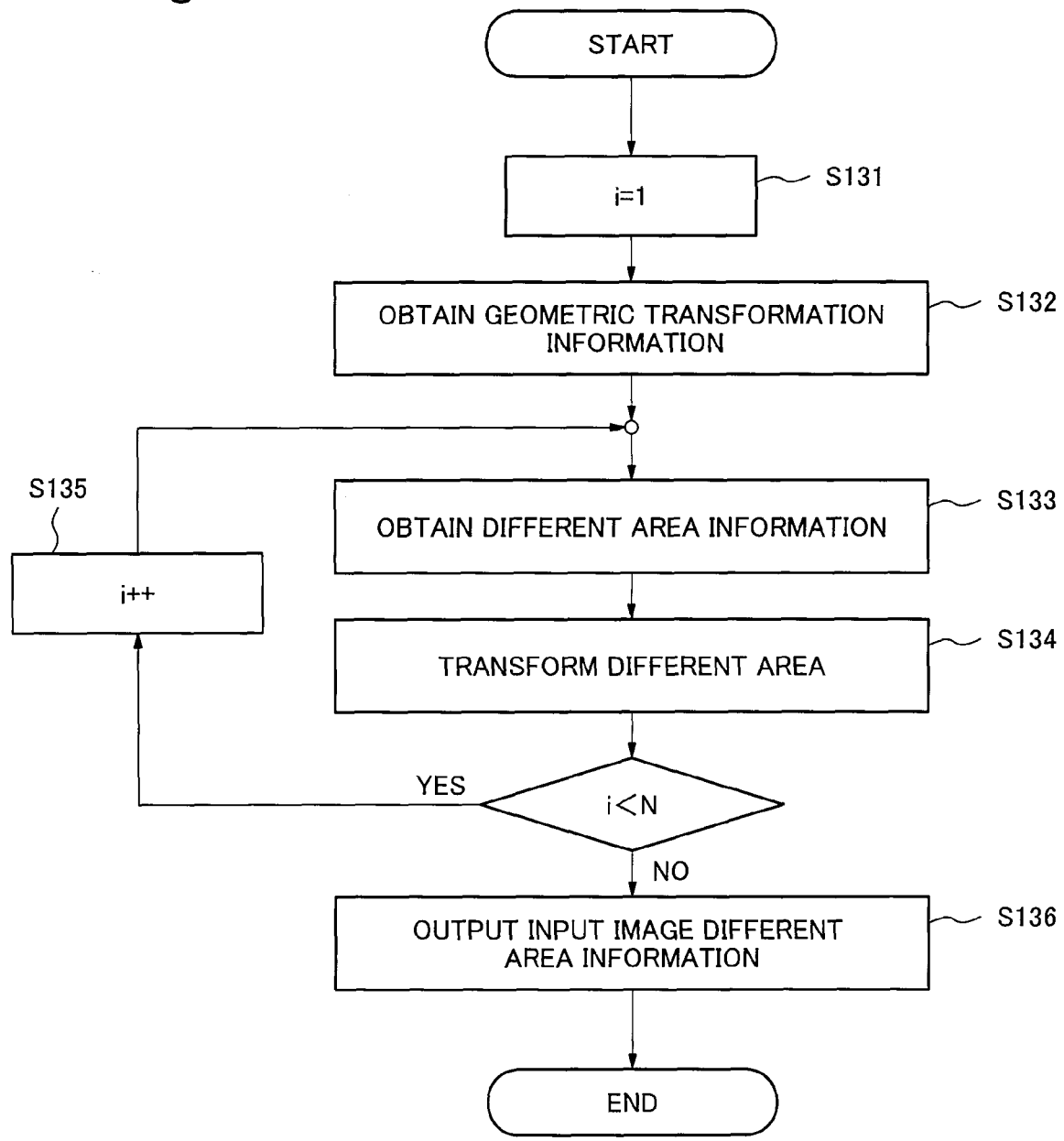
FIG. 2 is a flowchart illustrating an example of operation of an input image different area determination unit 13.

FIG. 2 is a flowchart for describing an example of operation of the input image different area determination unit 13 illustrated in FIG. 1. As illustrated in FIG. 2, the input image different area determination unit 13 initializes a variable i for controlling processing in S131. In S132, the input image different area determination unit 13 obtains the geometric transformation information. In S133, the input image different area determination unit 13 obtains the different area information of the reference image. In a case where the different area is the rectangular shape, the different area information obtained here may be coordinate value information about the reference image at the four corners, or may be information about the coordinate values of the pixel group constituting the different area in the reference image. In S134, the input image different area determination unit 13 applies the geometric transformation information obtained in S132 to the different area information obtained in S133. In this case, in a case where the different area information is coordinate value information about the four corners indicating the different area, the input image different area determination unit 13 applies the geometric transformation information to one of the four coordinate values. In a case where the different area information is coordinate value information about the pixel group constituting the different area in the reference image, the input image different area determination unit 13 applies the geometric transformation information to one of the pixels of the pixel group. At this point in time, when the variable i is less than a predetermined number N, the input image different area determination unit 13 updates the value of the variable i in S135, and continues the processing in S133 and S134 until the value of the variable i becomes equal to or more than N. It should be noted that "i++" in S135 indicates that one is added to the value of i. In a case where the different area information obtained in S133 is information about one of the areas in the reference image and is coordinate value information about the four corners of the area, then the input image different area determination unit 13 sets N to 4. In a case where the different area information is coordinate value information about the pixel group constituting the different area in the reference image, the input image different area determination unit 13 sets the value of N to the number of pixels in the pixel group constituting the different area in the reference image. In a case where the different area information obtained in S133 is a coordinate value information group about the four corners of multiple areas existing in the image such as the rectangular shape enclosing each character constituting the character string which is a portion in the object, then the input image different area determination unit 13 sets N to 4×n where the number of areas is denoted as n. Finally, in S136, the input image different area determination unit 13 outputs the input image different area information calculated in S134 and terminates the processing.

Figure 3:
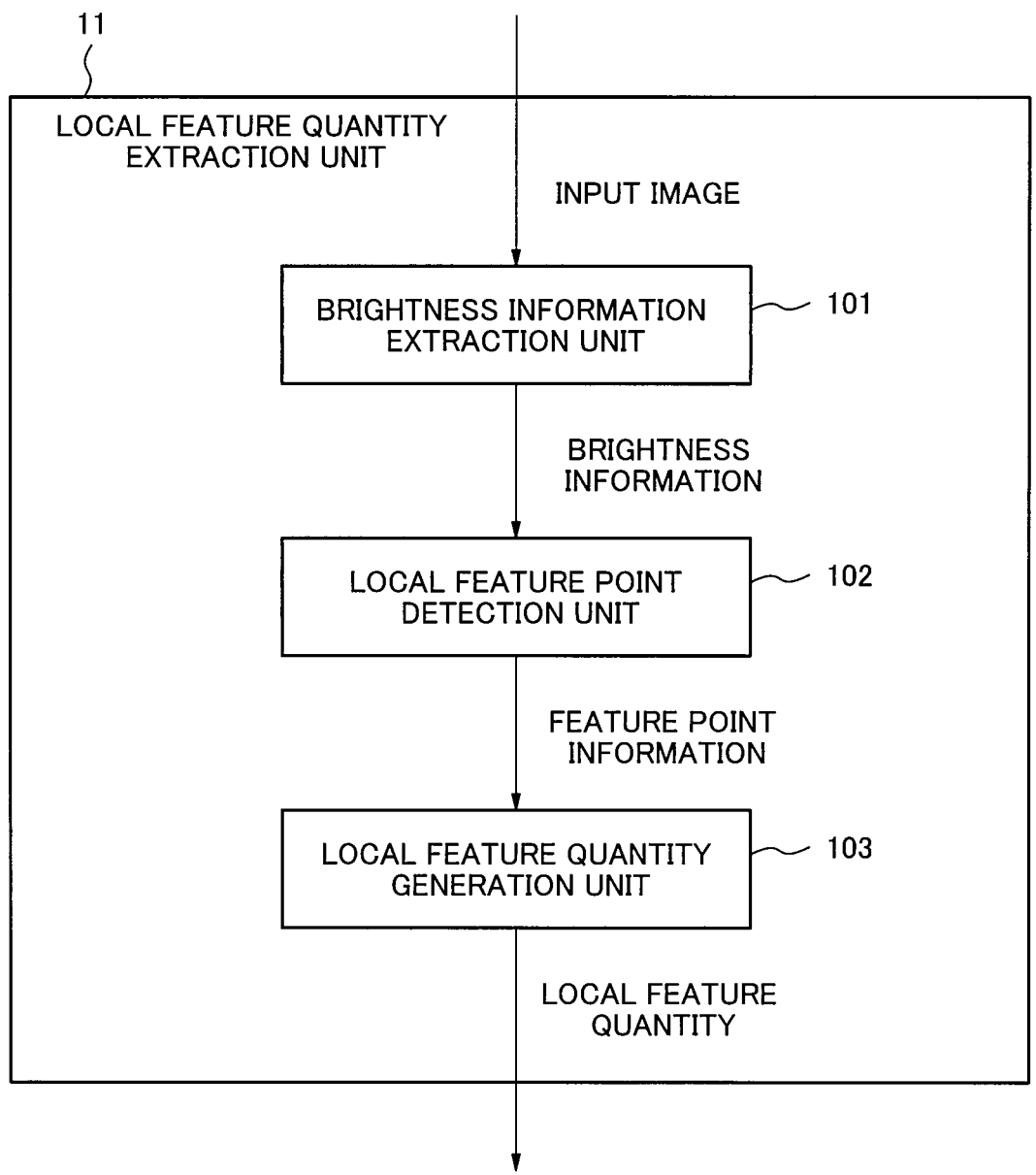
FIG. 3 is a block diagram illustrating an example of a configuration of a local feature quantity extraction unit 11.

Subsequently, the processing performed by the local feature quantity extraction unit 11 will be described in details with reference to FIG. 3. FIG. 3 is a block diagram illustrating an example of a configuration of the local feature quantity extraction unit 11. As illustrated in FIG. 3, the local feature quantity extraction unit 11 is able to be structured by using a brightness information extraction unit 101, a local feature point detection unit 102, and a local feature quantity generation unit 103.

The brightness information extraction unit 101 receives an input image, and extracts and outputs only information about the brightness from each pixel of the input image. The input image received here is an image captured by an image-capturing device such as a digital camera, a digital video camera, or a mobile telephone, or an image captured by means of a scanner and the like. The image may be a compressed image such as JPEG (Joint Photographic Experts Group) or may be a non-compressed image such as TIFF (Tagged Image File Format). The local feature point detection unit 102 detects many distinctive points (feature points) from the image, and outputs feature point information which is information about each of the feature points. In this case, for example, the feature point information indicates the coordinate position and the scale of the detected local feature point, the orientation of the feature point, the "feature point number" which is a unique ID allocated to the feature point, and the like. It should be noted that the local feature point detection unit 102 may output the feature point information as separate feature point information for each direction of orientation of each of the feature points. For example, the local feature point detection unit 102 may output the feature point information only in the direction of the most major orientation of each of the feature points, or may also output the feature point information in the direction of the second and subsequent major orientations.

When the local feature point detection unit 102 outputs the feature point information in the direction of the second and subsequent major orientations, the local feature point detection unit 102 is able to provide a feature point number which is different for the direction of the orientation of each of the feature points. When the local feature point detection unit 102 extracts the feature point information by detecting the feature points from the image, for example, the local feature point detection unit 102 can use DoG (Difference-of-Gaussian) processing. More specifically, the local feature point detection unit 102 is able to determine the position and the scale of the feature point by performing extreme value search in the scale space using DoG processing. Further, the local feature point detection unit 102 is able to calculate the orientation of each of the feature points by using the determined position and scale of the feature point and the gradient information of the peripheral area. When the local feature point detection unit 102 extracts the feature point information by detecting the feature points from the image, the local feature point detection unit 102 may use other methods such as Fast-Hessian Detector, and the like instead of DoG. The local feature point detection unit 102 may select only important feature points from among the feature points detected inside thereof, and may output only the information about the feature points as the feature point information.

The local feature quantity generation unit 103 receives the feature point information which is output from the local feature point detection unit 102, and generates (describes) the local feature quantity which is the feature quantity of the local area for each of the feature points. It should be noted that the local feature quantity generation unit 103 may output the local feature quantity in a format compressed with a lossless compression such as ZIP and LZH. In a case where the degree of importance of the feature point detected by the local feature point detection unit 102 is determined, the local feature quantity generation unit 103 can generate and output the local feature quantity in the order of the degree of importance of the feature point. The local feature quantity generation unit 103 may generate and output the local feature quantity in the order of the coordinate position of the feature point. First, the local feature quantity generation unit 103 obtains the local area where the feature quantity extraction is performed from the coordinate value, scale, and orientation of each of the detected feature points on the basis of the feature point information. In a case where there are plural pieces of feature point information in different orientations with respect for a single feature point, the local feature quantity generation unit 103 is able to obtain the local area for each of the pieces of the feature point information. Subsequently, the local feature quantity generation unit 103 rotates and normalizes the local area according to the orientation direction of the feature point, and thereafter, divides the local area into sub-areas. For example, the local area is able to be divided into 16 blocks (4×4 blocks). Subsequently, the local feature quantity generation unit 103 generates a feature vector for each of the sub-areas of the local area. For example, a gradient direction histogram is able to be used as the feature vector of the sub-area. More specifically, the local feature quantity generation unit 103 calculates the gradient direction for each pixel in each of the sub-areas, and quantizes the gradient direction into eight directions, and calculates the frequency of eight directions quantized for each of the sub-areas, thus generating the gradient direction histogram. At this occasion, the local feature quantity generation unit 103 outputs, as a local feature quantity, the feature vector constituted by the gradient direction histogram of 16 blocks×8 directions generated for each of the feature points. The local feature quantity generation unit 103 produces output so that the coordinate position information about the feature point is included in the output local feature quantity.

Figure 4:
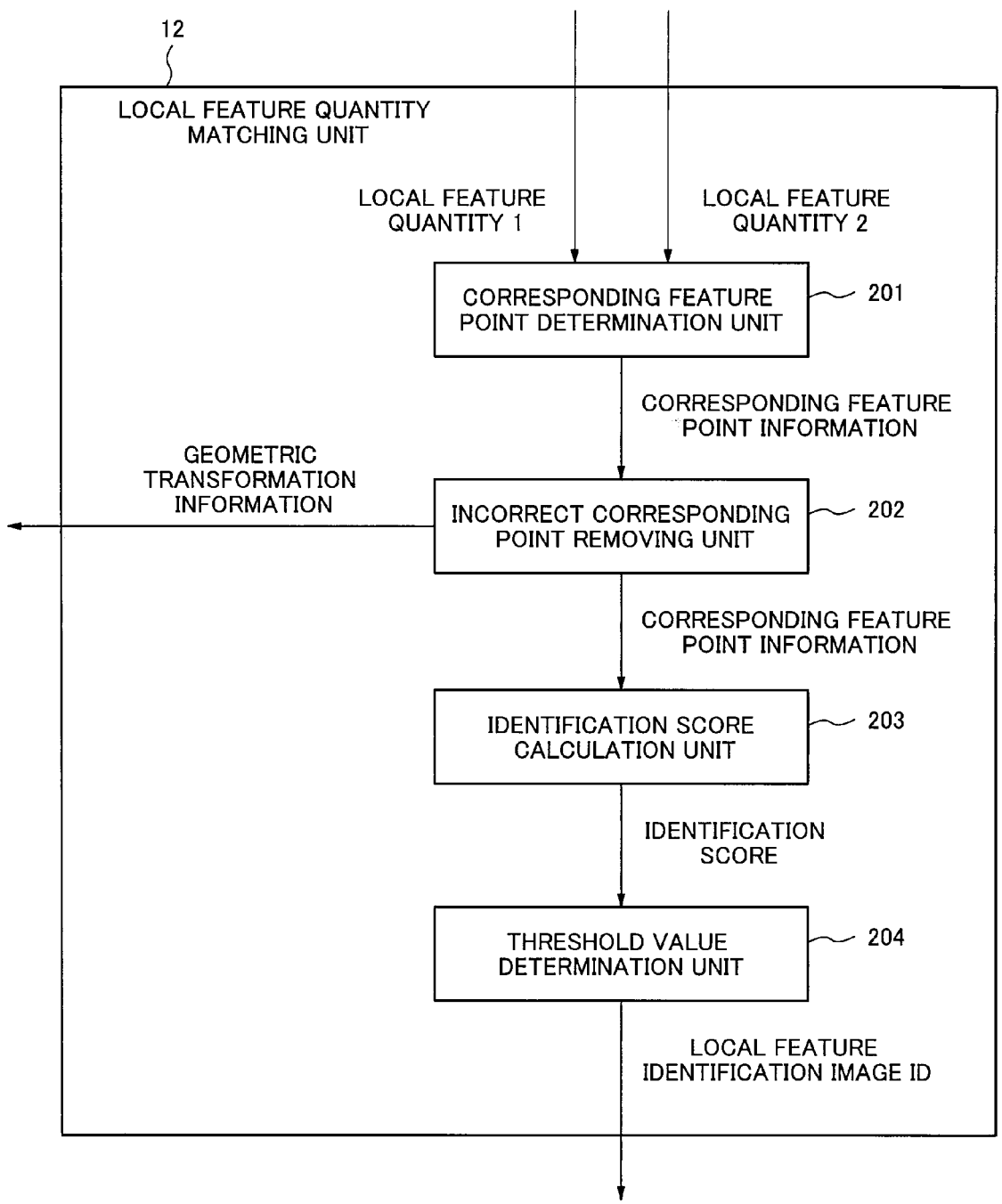
FIG. 4 is a block diagram illustrating an example of a configuration of a local feature quantity matching unit 12.

Subsequently, the processing performed by the local feature quantity matching unit 12 will be described in details with reference to FIG. 4. FIG. 4 is a block diagram illustrating an example of a configuration of the local feature quantity matching unit 12. As illustrated in FIG. 4, the local feature quantity matching unit 12 is able to be structured by using a corresponding feature point determination unit 201, an incorrect corresponding point removing unit 202, an identification score calculation unit 203, and a threshold value determination unit 204.

The corresponding feature point determination unit 201 collects a local feature quantity 1 extracted from the input image by the local feature quantity extraction unit 11 and a local feature quantity 2 extracted from the reference image, and outputs corresponding feature point information. For example, in a case where each of the local feature quantity 1 and the local feature quantity 2 is a set of feature quantities describing the gradient histogram around the local feature point, the corresponding feature point determination unit 201 performs distance calculation in the feature quantity space for all of the combinations of the feature quantities. In this case, only in a case where the smallest distance value is sufficiently smaller than the second smallest distance value, the corresponding feature point determination unit 201 determines, with regard to a combination of feature quantities of which distance value is the minimum, that the feature quantity and a local feature point serving as the basis of the feature quantity description are corresponding. Then, the corresponding feature point determination unit 201 outputs, as corresponding feature point information, position information about the local feature point corresponding to the position information about the local feature point.

The incorrect corresponding point removing unit 202 receives the corresponding feature point information from the corresponding feature point determination unit 201, and determines correctly corresponding feature points and incorrectly corresponding feature points from among these corresponding feature points. Then, the incorrect corresponding point removing unit 202 respectively outputs the determined feature point information, and also outputs the geometric transformation information used for the determination. For example, the incorrect corresponding point removing unit 202 applies a scheme such as RANSAC (RANdom SAmple Consensus) to the corresponding feature point information received from the corresponding feature point determination unit 201, and estimates the geometric transformation information for transformation from coordinates in the reference image into coordinates in the input image. The incorrect corresponding point removing unit 202 respectively applies the geometric transformation information estimated here to the feature point, in the reference image, associated with the corresponding feature point, and when the feature point in the reference image is determined to substantially match the feature point in the input image, the incorrect corresponding point removing unit 202 determines that the feature point is a correctly corresponding feature point. On the contrary, when the feature point in the reference image is determined not to match the feature point in the input image, the incorrect corresponding point removing unit 202 determines that the feature point is an incorrectly corresponding feature point.

The identification score calculation unit 203 receives the corresponding feature point information from the incorrect corresponding point removing unit 202, and outputs an identification score. The identification score indicates the degree of similarity of the (local) feature quantity. The output identification score may be derived as follows. For example, the identification score calculation unit 203 counts the number of combinations of correctly corresponding feature points from the corresponding feature point information received from the incorrect corresponding point removing unit 202. Then, the identification score calculation unit 203 may output the identification score by referring to a table for mapping the number of combinations of correctly corresponding feature points with a score between zero and one, which is prepared in advance. In a case where the number of combinations of correctly corresponding feature points is c, the identification score calculation unit 203 may calculate $m/(c+m)$ as the identification score, where the minimum corresponding number of the feature points defined in advance is denoted as m.

The threshold value determination unit 204 applies threshold value processing to the identification score which is output from the identification score calculation unit 203. In a case where the identification score is equal to or more than a threshold value, the threshold value determination unit 204 determines that the image is an image presenting the same object, and outputs the ID of the reference image as the local feature identification image ID. The threshold value used by the threshold value determination unit 204 may be a value determined and held inside in advance, or may be a value given from the outside.

Figure 5:
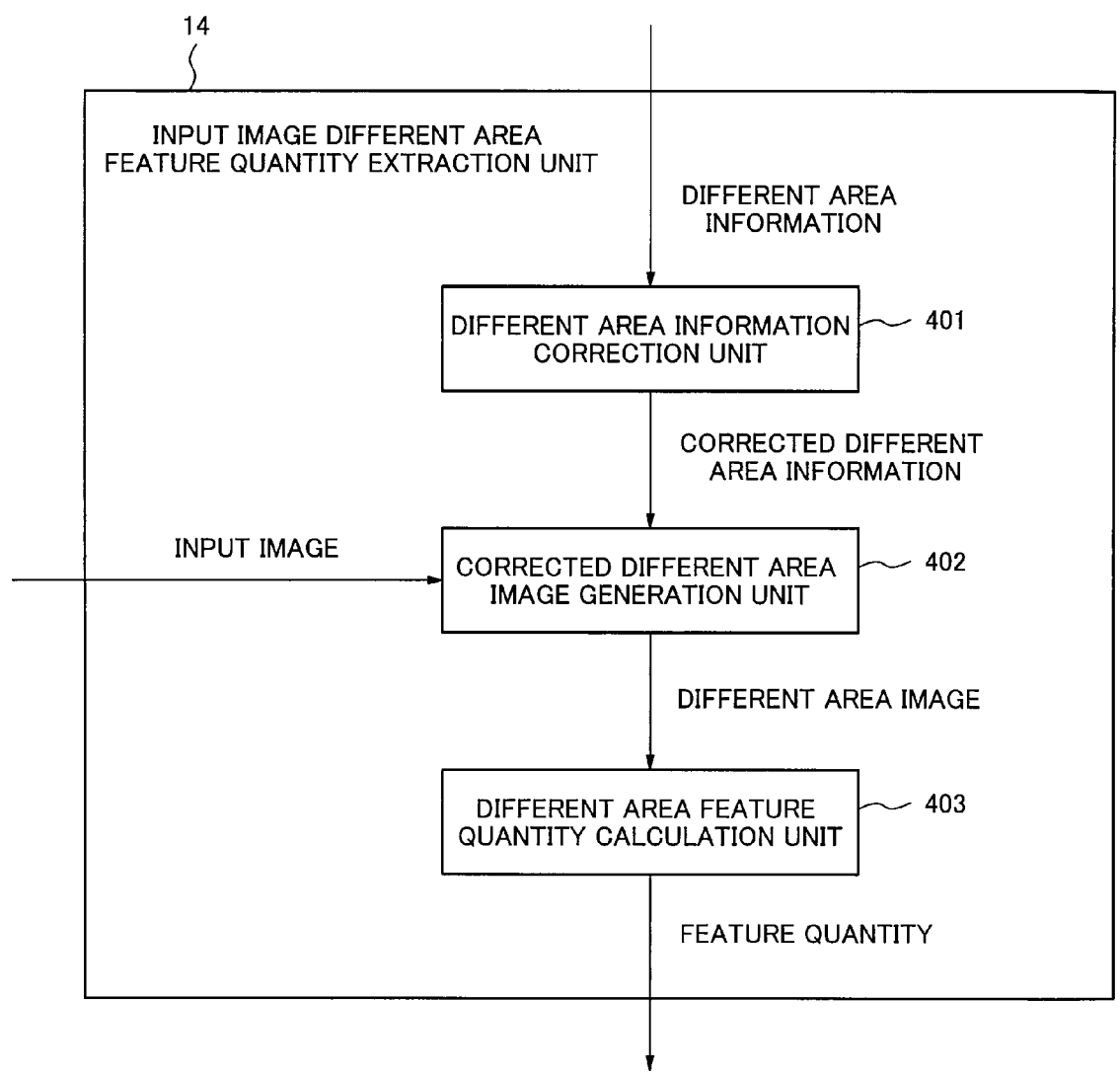
FIG. 5 is a block diagram illustrating an example of a configuration of an input image different area feature quantity extraction unit 14.
Figure 6:
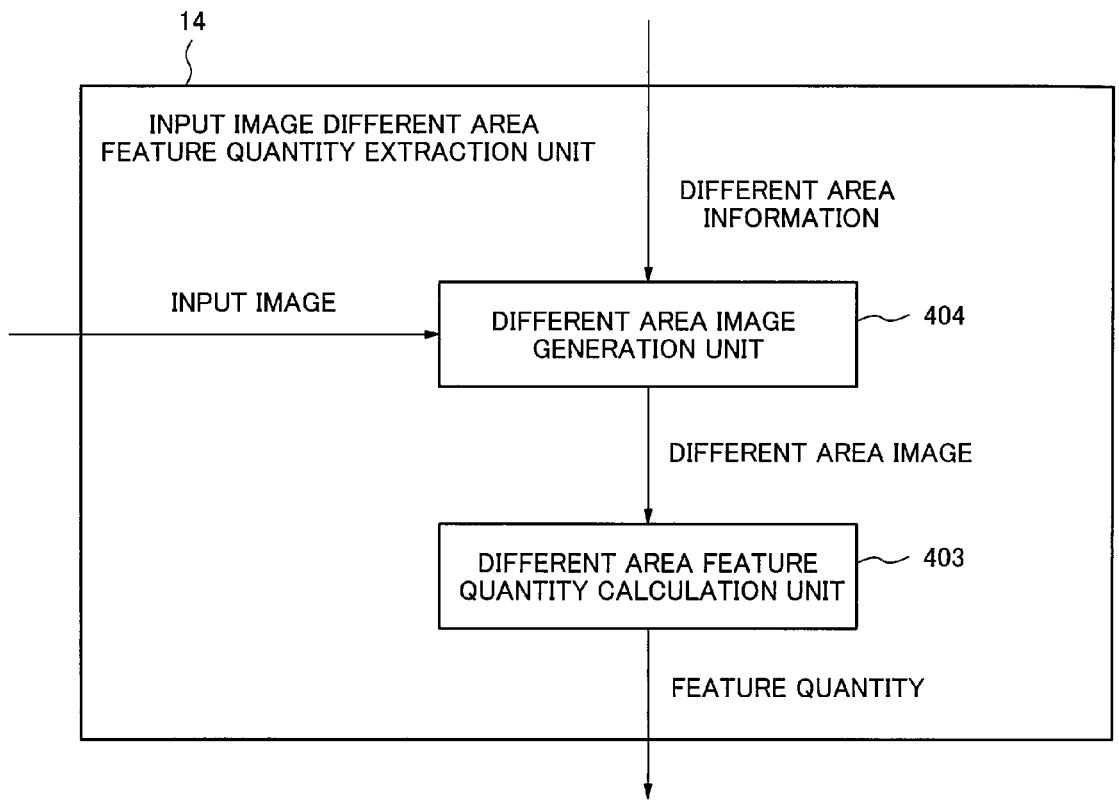
FIG. 6 is a block diagram illustrating an example of a configuration of an input image different area feature quantity extraction unit 14.

Subsequently, the input image different area feature quantity extraction unit 14 will be described in details. FIGS. 5 and 6 are block diagrams illustrating examples of configurations of the input image different area feature quantity extraction unit 14. Each of the diagrams will be hereinafter described.

As illustrated in FIG. 5, the input image different area feature quantity extraction unit 14 is able to be constituted by a different area information correction unit 401, a corrected different area image generation unit 402, and a different area feature quantity calculation unit 403.

The different area information correction unit 401 receives the input image different area information from the input image different area determination unit 13, and corrects the input image different area information so as to change the range of the input image different area. For example, the different area information correction unit 401 may adopt, as a corrected different area, an area enlarged by a preset ratio on the basis of any given point in the different area of the input image. Alternatively, the different area information correction unit 401 may adopt, as a corrected different area, an area widened by a preset number of pixels on the basis of any given point in the different area of the input image. In this case, the point used as the reference may be a barycenter point of the different area. In a case where the different area of the input image is coordinate values of the four corners of the different area in the input image obtained by respectively applying the geometric transformation information to the coordinate values of the four corners of the different area in the reference image, then the point used as the reference may be an intersection point of diagonal lines of the rectangular shape defined by the four corners. For example, in a case where, e.g., edges are concentrated at the end of the input image different area received from the input image different area determination unit 13, it is able to be predicted that the same type of information is included outside of the input image different area. In this case, in the correction of the input image different area information, the different area information correction unit 401 may shift the input image different area in a direction predicted to include the same type of information, or may enlarge the input image different area.

The corrected different area image generation unit 402 receives the input image and the corrected different area information from the different area information correction unit 401. In a case where the corrected different area information is coordinate value information about the four corners of the corrected different area in the input image, for example, the corrected different area image generation unit 402 successively reads pixels on which a straight line connecting two adjacent corners of the four corners, thus determining the pixels from which the values are read from the input image and the order of reading. Accordingly, the corrected different area image generation unit 402 generates and outputs the different area image. In a case where the corrected different area information received from the different area information correction unit 401 is information indicating coordinate values of a pixel group constituting the corrected different area in the input image, the corrected different area image generation unit 402 reads the input image in that order and outputs the image as the different area image.

The different area feature quantity calculation unit 403 extracts the feature quantity from the different area image generated by the corrected different area image generation unit 402, and outputs the feature quantity. The details of the different area feature quantity calculation unit 403 will be described later. When the object illustrated in the input image is bent, the different area of the input image calculated by the input image different area determination unit 13 may include incorrect difference. Even in such case, the input image different area feature quantity extraction unit 14 includes the configuration of FIG. 5, so that the input image different area feature quantity extraction unit 14 can extract the correct feature quantity because the input image different area feature quantity extraction unit 14 performs extraction processing of the feature quantity upon correcting the different area information.

As illustrated in FIG. 6, the input image different area feature quantity extraction unit 14 is able to be constituted by the different area image generation unit 404 and the different area feature quantity calculation unit 403. The different area image generation unit 404 of FIG. 6 is substantially the same as the corrected different area image generation unit 402 which is a constituent element of the input image different area feature quantity extraction unit 14 as illustrated in FIG. 5, but is different in that the different area image generation unit 404 of FIG. 6 receives input image different area information instead of corrected different area information. The different area feature quantity calculation unit 403 of FIG. 6 is the same as the different area feature quantity calculation unit 403 as illustrated in FIG. 5, and the detailed explanation is omitted.

FIG. 7, FIG. 8, FIG. 9, FIG. 10, FIG. 11, and FIG. 60 are block diagrams illustrating examples of configurations of the different area feature quantity calculation unit 403. Hereinafter, each of the diagrams will be described.

Figure 7:
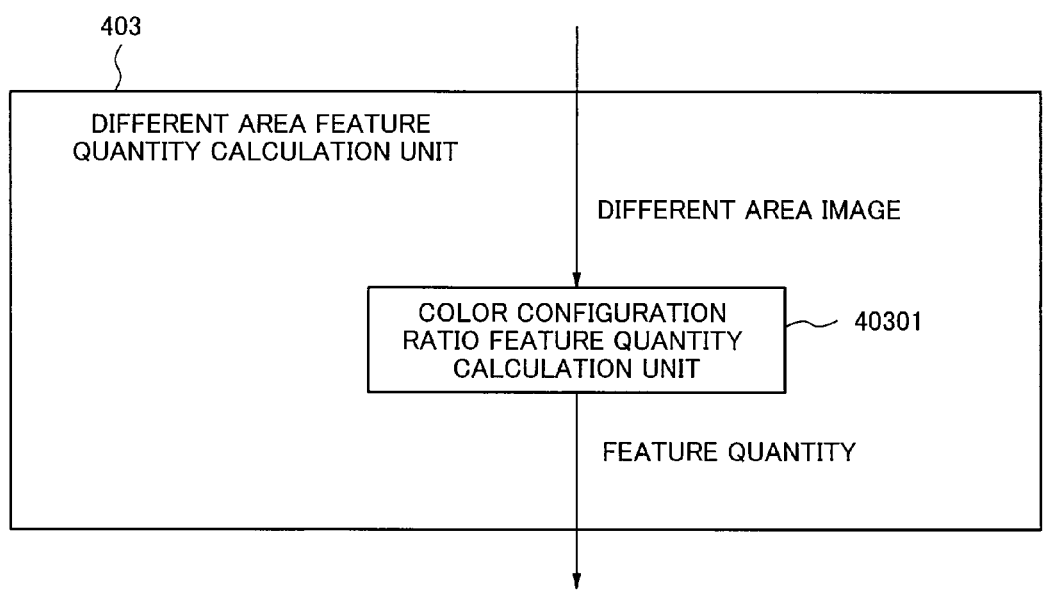
FIG. 7 is a block diagram illustrating an example of a configuration of a different area feature quantity calculation unit 403.

As illustrated in FIG. 7, the different area feature quantity calculation unit 403 is able to be constituted by a color configuration ratio feature quantity calculation unit 40301.

The color configuration ratio feature quantity calculation unit 40301 outputs, as a feature quantity, a color histogram of the different area image generated by the corrected different area image generation unit 402. For example, the feature quantity generated here may be either a histogram in RGB (Red, Green, and Blue) space, a histogram in HSV (Hue, Saturation, Value) space, or a histogram in other color spaces. The configuration of FIG. 7 of the different area feature quantity calculation unit 403 is particularly effective when there is clear difference in the colors of an object illustrated in the input image and an object illustrated in the reference image.

Figure 8:
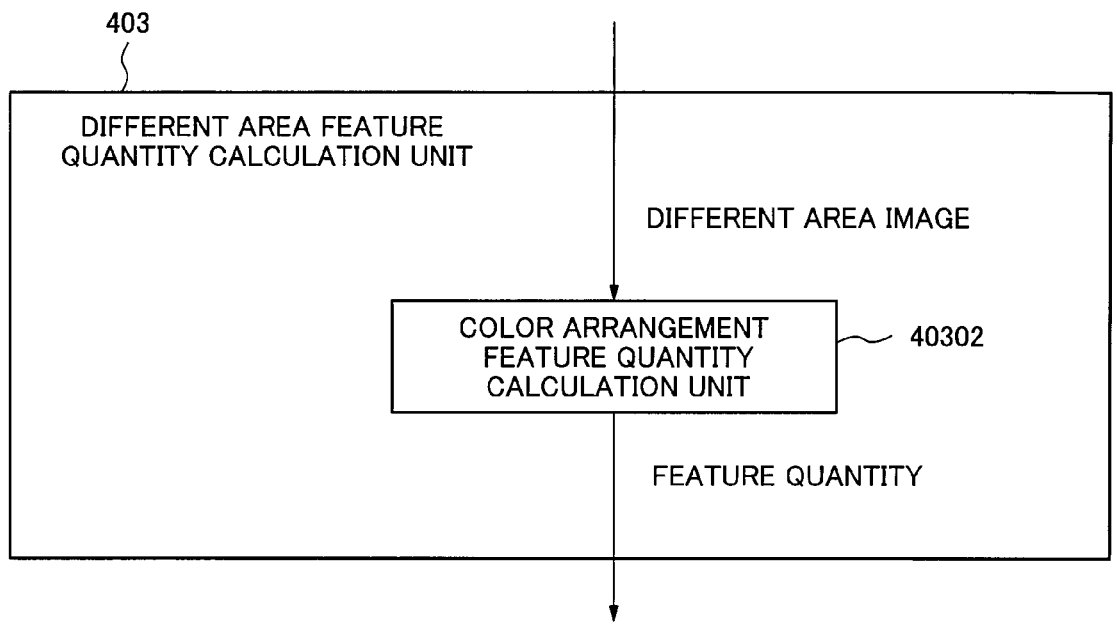
FIG. 8 is a block diagram illustrating an example of a configuration of a different area feature quantity calculation unit 403.

As illustrated in FIG. 8, the different area feature quantity calculation unit 403 is able to be constituted by a color arrangement feature quantity calculation unit 40302. The color arrangement feature quantity calculation unit 40302 outputs, as a feature quantity, information about the color layout of the different area image generated by the corrected different area image generation unit 402. The feature quantity generated here may be obtained by dividing the different area image into 8×8 sections, applying two-dimensional DCT (Discrete Cosine Transform) on the average value of the pixel values in each of the sections, and extracting a preset number of transformation coefficients from a low frequency component. Alternatively, the feature quantity generated here may be obtained by dividing the different area image into sub-blocks, and the feature quantity may be a value (RGB value and the like) indicating the average color calculated for each of the sub-blocks. Like the configuration of FIG. 7, the configuration of FIG. 8 of the different area feature quantity calculation unit 403 is particularly effective when there is clear difference in the colors of an object illustrated in the input image and an object illustrated in the reference image.

Figure 9:
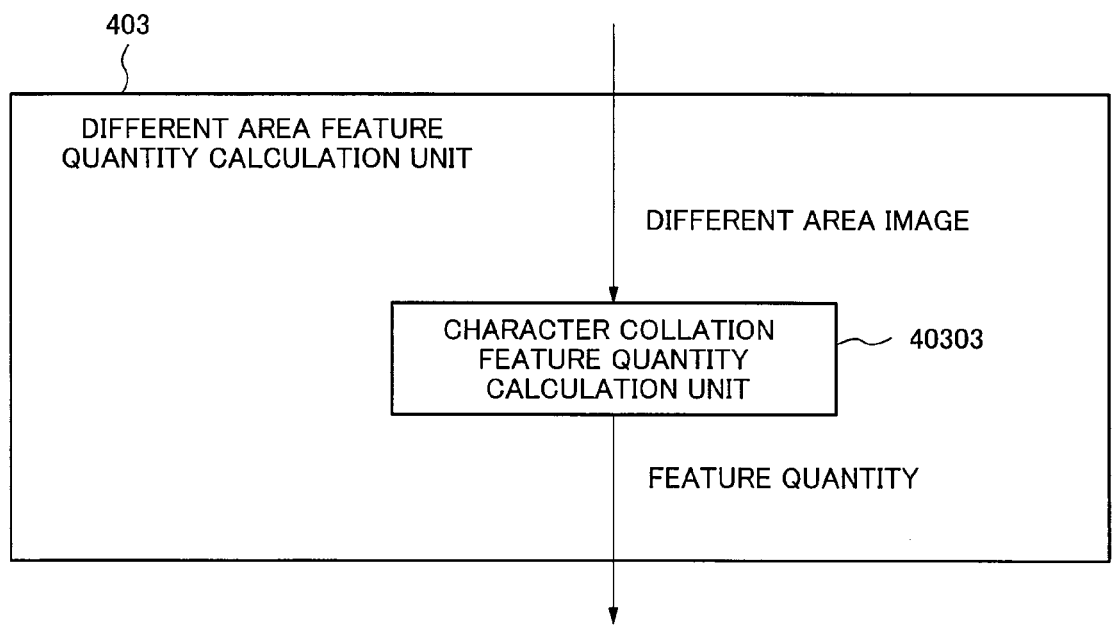
FIG. 9 is a block diagram illustrating an example of a configuration of a different area feature quantity calculation unit 403.

As illustrated in FIG. 9, the different area feature quantity calculation unit 403 is able to be constituted by a character matching feature quantity calculation unit 40303. Where the difference between the object illustrated in the input image and the object illustrated in the reference image is assumed to be a character string area in the object, this configuration is possible in a case where the different area of the input image is a coordinate value information group of the four corners of the area in the input image obtained by respectively applying the geometric transformation information to the coordinate values of the four corners in the reference image in the rectangular shape enclosing each character constituting the character string. More specifically, in this configuration, the area in the input image obtained by geometrically transforming the coordinate values of the four corners in the rectangular shape circumscribing each character which is the different area in the reference image is input into the character matching feature quantity calculation unit 40303 as the different area image. Then, the character matching feature quantity calculation unit 40303 performs feature quantity extraction from the different area image. For example, the character matching feature quantity calculation unit 40303 may divide the rectangular shape circumscribing each character into 4×4 from the different area image generated by the corrected different area image generation unit 402, and extract, as the feature quantity, the gradient histogram in eight directions structured for each divided area thereof. The configuration of FIG. 9 of the different area feature quantity calculation unit 403 is particularly effective in a case where there is a difference in only some of the characters between the object illustrated in the input image and the object illustrated in the reference image.

Figure 10:
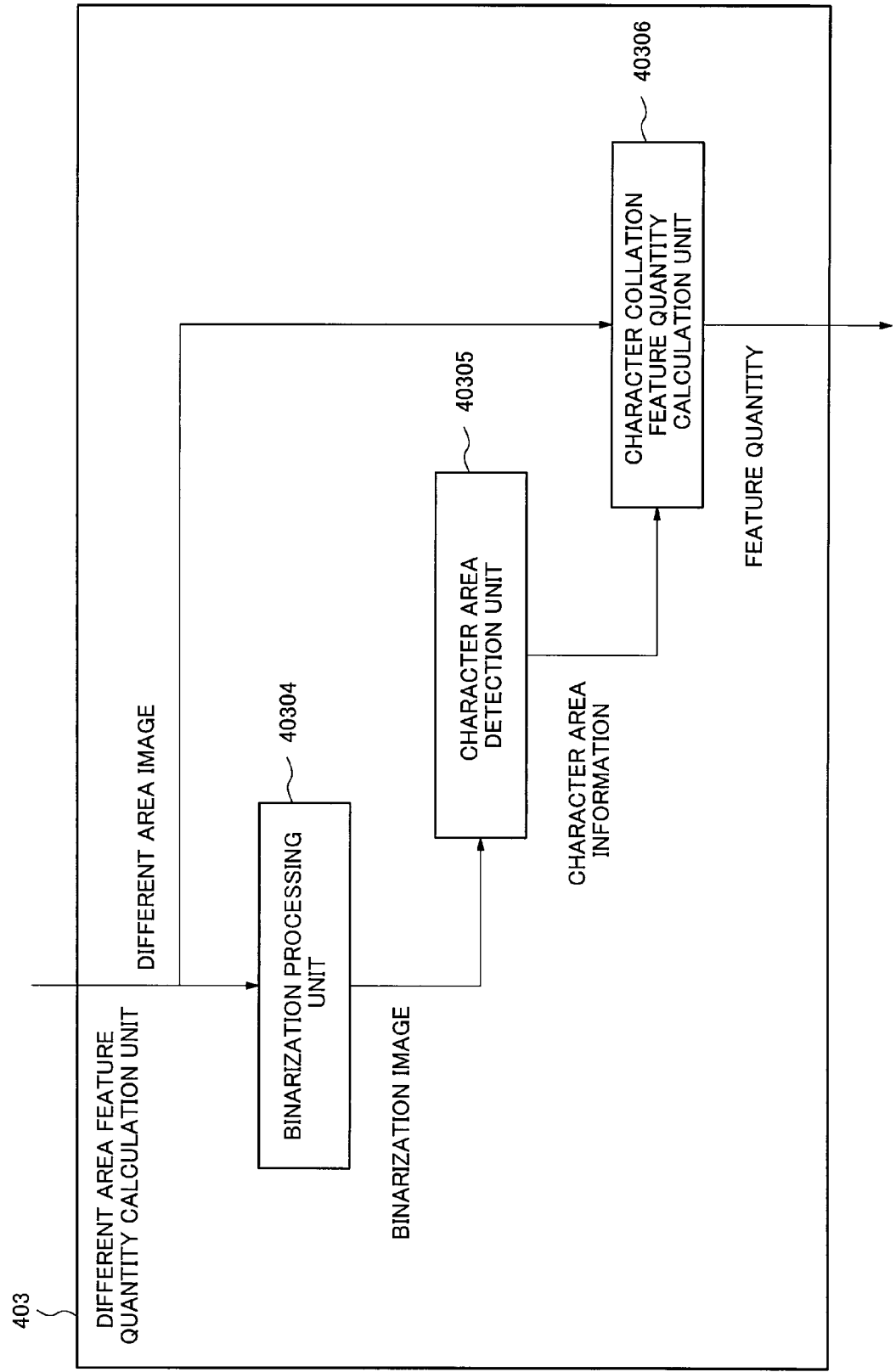
FIG. 10 is a block diagram illustrating an example of a configuration of a different area feature quantity calculation unit 403.

As illustrated in FIG. 10, the different area feature quantity calculation unit 403 is able to be constituted by a binarization processing unit 40304, a character area detection unit 40305, and a character matching feature quantity calculation unit 40306.

Where the difference between the object shown in the input image and the object shown in the reference image is assumed to be the character string area in the object, this configuration is possible in a case where the different area of the input image is coordinate value information about the four corners of the area in the input image obtained by respectively applying the geometric transformation information to each coordinate value of the four corners in the reference image in the rectangular shape enclosing the entire character string. In addition, there may be a coordinate value information group of the four corners of the area in the input image obtained by respectively applying the geometric transformation information to the coordinate values of the four corners in the reference image in the rectangular shape enclosing each character constituting the character string.

The binarization processing unit 40304 performs binarization on the different area image generated by the corrected different area image generation unit 402 on the basis of a threshold value determined in advance or on the basis of a threshold value calculated in an adaptive manner, and outputs the result of the binarization as the binarization image. An example of a method for calculating the threshold value in an adaptive manner is considered to include determination binarization for automatically calculating, as the threshold value, P where the minimum within-class dispersion of two classes divided by any given point P with regard to a distribution of pixel values of the different area image becomes the minimum and inter-class dispersion is the maximum. In a case where there is a character in the different area image generated by the corrected different area image generation unit 402, a character is often written in black or white so that the contrast from the background portion increases, and when this is taken into consideration, the binarization image which is output from the binarization processing unit 40304 outputs either an image in which the character portion is black and the background portion is white, or an image in which the character portion is white and the background portion is black. In this case, in a case where the object shown in the input image is bent, the different area of the input image calculated by the input image different area determination unit 13 may include an incorrect difference. In such case, when the determination binarization is directly performed on the area of the input image obtained by respectively applying the geometric transformation information to each coordinate value of the four corners in the reference image in the rectangular shape enclosing the entire character string, the threshold value of the binarization is not correctly set, and the character area may not be detected. However, in the configuration of FIG. 10, when the different area of the input image includes not only the coordinate value information of the four corners of the area in the input image obtained by respectively applying the geometric transformation information to coordinate values of the four corners in the reference image in the rectangular shape enclosing the entire character string but also information described below, the binarization processing unit 40304 can output more accurate binarization image. This information is a coordinate value information group of the four corners of the area in the input image obtained by respectively applying the geometric transformation information to the coordinate values of the four corners in the reference image in the rectangular shape enclosing each character constituting the character string. More specifically, first, the binarization processing unit 40304 performs the determination binarization to only the area in the input image obtained by respectively applying the geometric transformation information to the coordinate values of the four corners in the reference image in the rectangular shape enclosing each character constituting the character string which is the difference. Subsequently, the binarization processing unit 40304 uses the threshold value calculated there to perform the binarization on the area in the input image obtained by applying the geometric transformation information to the coordinate values of the four corners in the reference image in the rectangular shape enclosing the entire character string. In a case where such binarization processing is performed, the area used to first determine the threshold value becomes an area that is likely to include only the character. For this reason, the binarization that reduces influence of the incorrect difference in the different area of the input image can be realized as compares with the case where the determination binarization is directly performed on the area in input image obtained by respectively applying the geometric transformation information to each of the coordinate values of the four corners of the reference image in the rectangular shape enclosing the entire character string. Further, in a case where it is desired to selectively use only an area that is likely to include the character from the area used to determine the threshold value, only the area where the dispersion of the pixel values in the area is high may be used.

The character area detection unit 40305 receives the binarization image generated by the binarization processing unit 40304, and outputs the character area information which is information about the area where a character exists in the image. In order to detect the area where a character exists, for example, the character area detection unit 40305 uses a portion where black pixels are connecting in the binarization image as a block, and outputs, as character area information, a coordinate value information group of the four corners in the rectangular shape circumscribing each connection portion, i.e., coordinate value information about the pixel group constituting each connection portion. When the connection portion is detected, and there are many black pixels in the binarization image generated by the binarization processing unit 40304, a white character may be written on a dark background, and therefore, the white pixels and the black pixels are inverted in the binarization image, and thereafter, the above processing may be performed. In the character area information which is output here, a single connection portion is considered to correspond to substantially a single character, and therefore, the character area information represents information about the four corners in the rectangular shape circumscribing each character existing in the different area image.

The character matching feature quantity calculation unit 40306 is substantially the same as the character matching feature quantity calculation unit 40303 which is a constituent element of the different area feature quantity calculation unit 403 as illustrated in FIG. 9, but is different in that the character matching feature quantity calculation unit 40306 receives not only the different area image but also character area information. More specifically, in this configuration, the character matching feature quantity calculation unit 40306 does not perform the feature quantity extraction from the area in the input image obtained by applying the geometric transformation to the coordinate values of the four corners in the reference image in the rectangular shape circumscribing each character of the character string which is the difference.

Instead, the character matching feature quantity calculation unit 40306 detects the character area again from the area in the input image obtained by applying the geometric transformation to the coordinate values of the four corners in the reference image in the rectangular shape enclosing the entire character string of the difference, and calculates the feature quantity from the detected character area. Like the configuration of FIG. 9, the configuration of FIG. 10 of the different area feature quantity calculation unit 403 is particularly effective in a case where there is a difference only in some of the characters between the object shown in the input image and the object shown in the reference image.

Figure 11:
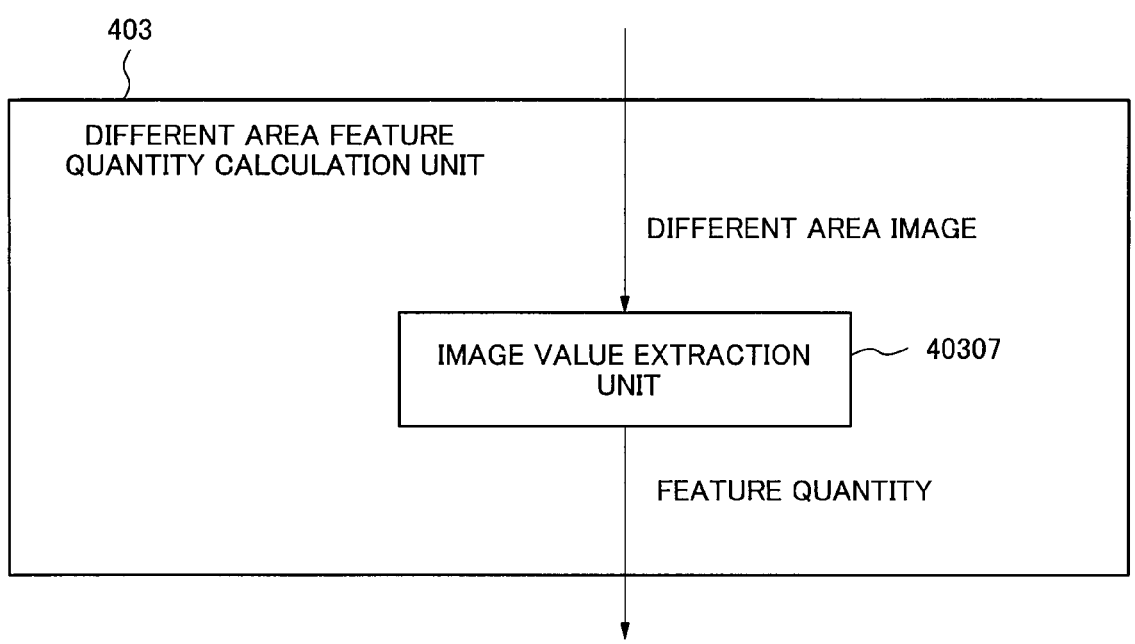
FIG. 11 is a block diagram illustrating an example of a configuration of a different area feature quantity calculation unit 403.

As illustrated in FIG. 11, the different area feature quantity calculation unit 403 is be constituted by an image value extraction unit 40307. The image value extraction unit 40307 may output, as the feature quantity, the brightness value of the different area image generated by the corrected different area image generation unit 402 as it is. Alternatively, where the average of all the brightness values of the different area image generated by the corrected different area image generation unit 402 is denoted as a, the standard deviation is denoted as s, and the brightness value of the different area image is denoted as p, the brightness value corrected to be (p−a)/s may be output as the feature quantity. As illustrated in FIG. 11, when the different area feature quantity calculation unit 403 is constituted by the image value extraction unit 40307, information about the number of pixels of the different area in the vertical and horizontal directions may be output together with the feature quantity.

Figure 60:
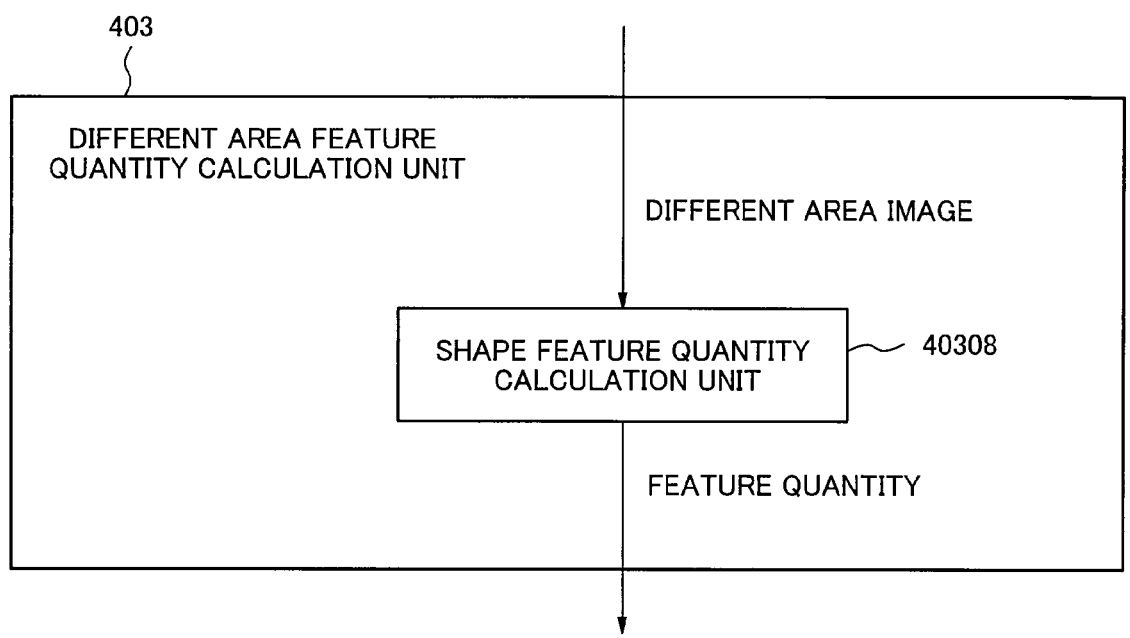
FIG. 60 is a block diagram illustrating an example of a configuration of a different area feature quantity calculation unit 403.

As illustrated in FIG. 60, the different area feature quantity calculation unit 403 is able to be constituted by a shape feature quantity calculation unit 40308. The shape feature quantity calculation unit 40308 outputs, as a feature quantity, information about the shape of the different area image generated by the corrected different area image generation unit 402. The shape feature quantity calculation unit 40308 may generate the feature quantity by performing the following processing. For example, the feature quantity may be generated by dividing the different area image generated by the corrected different area image generation unit 402 into plural sub-blocks such as 4×4 sub-blocks, structuring a gradient histogram in multiple directions for each divided area, and extracting the histogram as the feature quantity. Alternatively, the feature quantity may be generated by extracting edges from the different area image generated by the corrected different area image generation unit 402, generating an edge image in which the value of each pixel indicates the edge intensity, and extracting the edge image as the feature quantity. Still alternatively, the feature quantity may be generated by performing processing of binarization on the edge image with processing based on a preset threshold value with respect to the edge intensity, and extracting the binary image as the feature quantity.

The configuration of FIG. 60 of the different area feature quantity calculation unit 403 is particularly effective when there is a clear difference in the shapes between the object shown in the input image and the object shown in the reference image.

It should be noted that the different area feature quantity calculation unit 403 may have not only the configurations illustrated in FIG. 7, FIG. 8, FIG. 9, FIG. 10, FIG. 11, and FIG. 60, but also a configuration made by combining the configurations illustrated in FIG. 7, FIG. 8, FIG. 9, FIG. 10, FIG. 11, and FIG. 60, and is able to make and output a feature quantity combining the feature quantities calculated by each of them into a single feature quantity.

Figure 12:
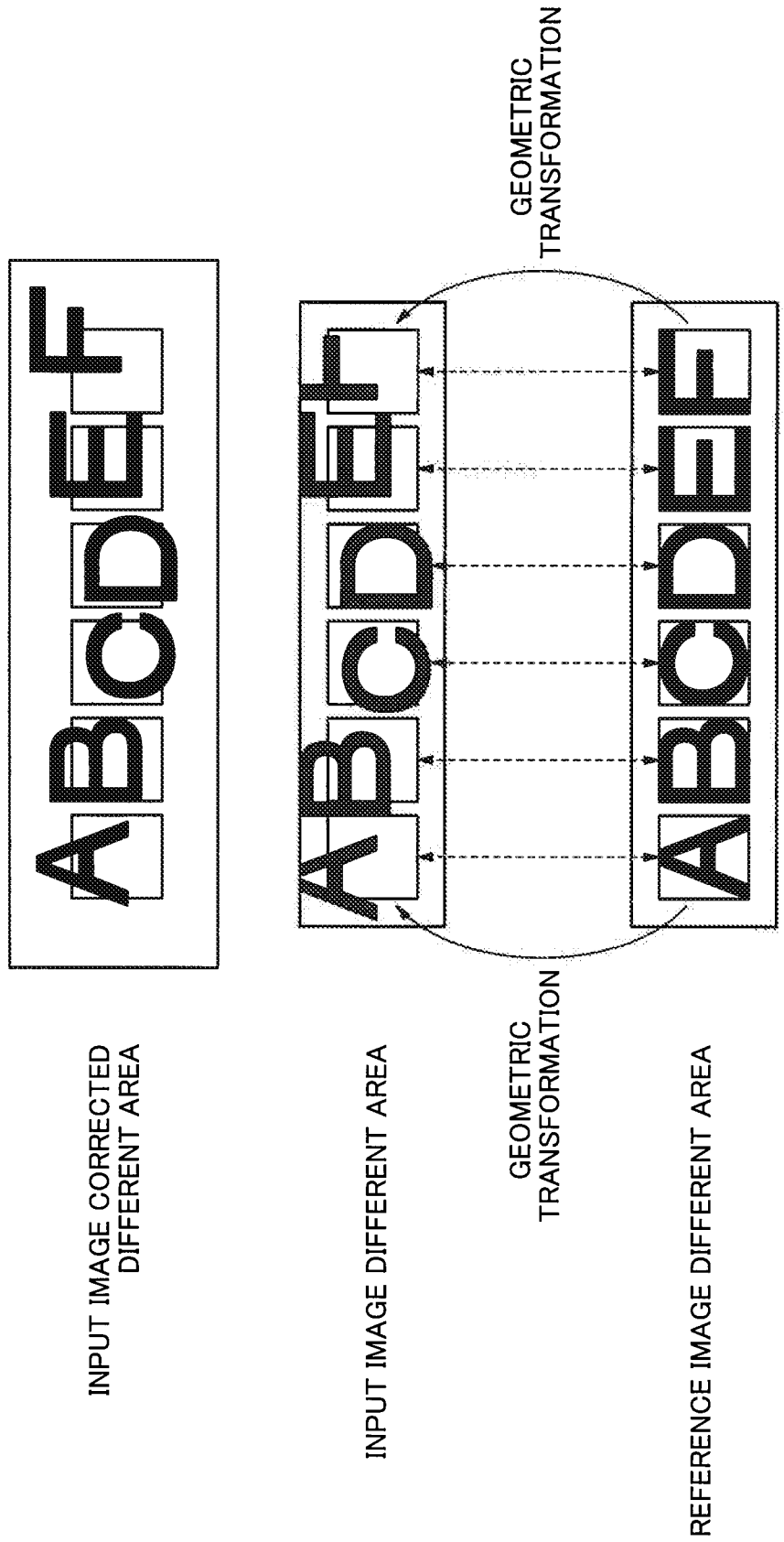
FIG. 12 is a conceptual drawing illustrating an example of an extraction target area when a character feature quantity is extracted from each of a different area of a reference image and a different area of an input image.
Figure 13:
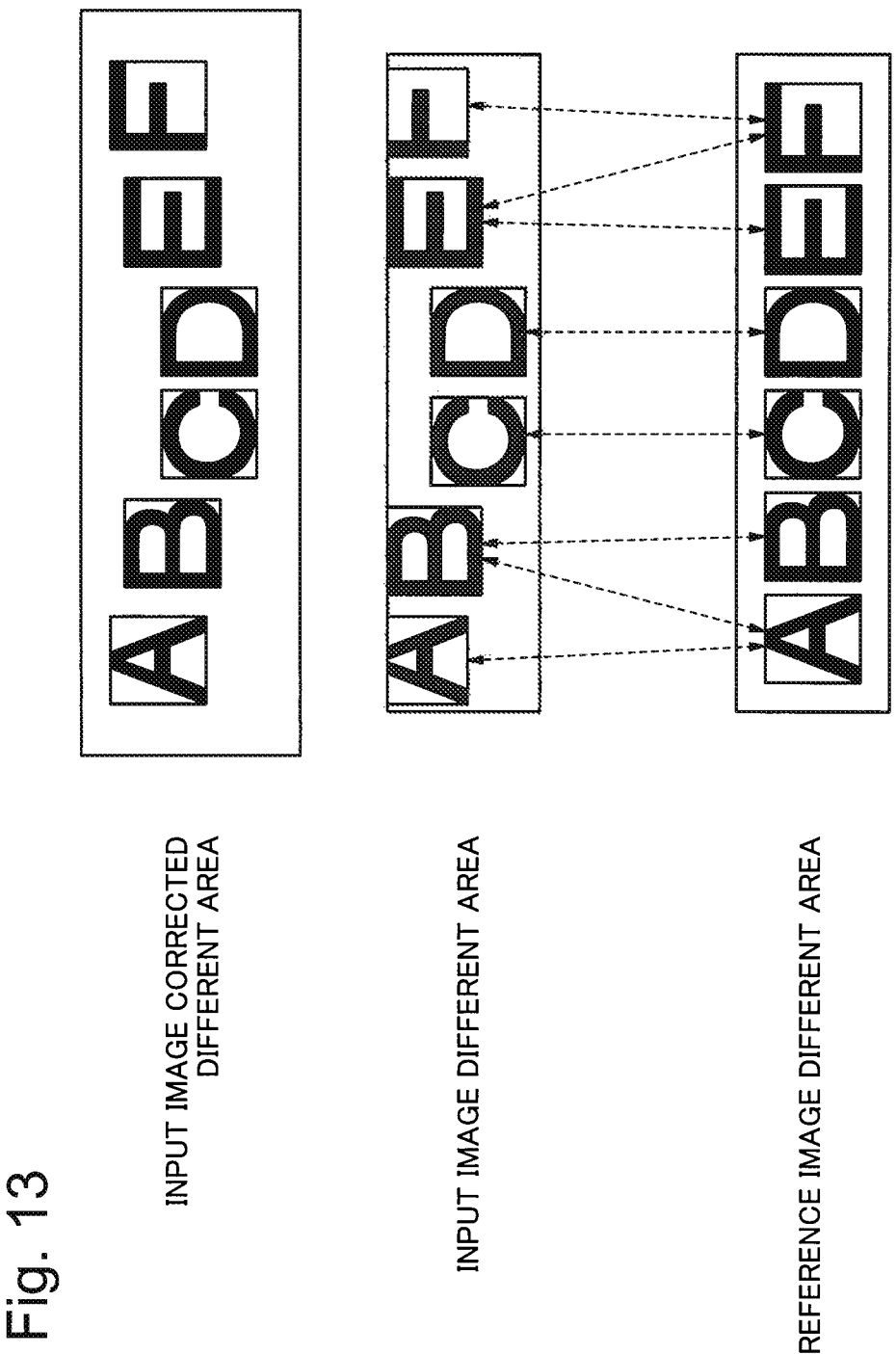
FIG. 13 is a conceptual drawing illustrating an example of an extraction target area when a character feature quantity is extracted from each of a different area of a reference image and a different area of an input image.

FIG. 12 and FIG. 13 are conceptual drawings illustrating examples of the area from which the feature quantity is extracted in a case where the different area feature quantity calculation unit 403 has the configuration of FIG. 9 and FIG. 10, respectively. As illustrated in FIG. 12, in a case where the different area of the input image is an area obtained by applying the geometric transformation to the coordinate values of the four corners in the reference image in the rectangular shape circumscribing each character constituting the character string, and when an object illustrated in the input image is bent, the area obtained by applying the geometric transformation information may include incorrect difference. At this occasion, the area from which the feature quantity is extracted is deviated from an actual character portion. On the other hand, as illustrated in FIG. 13, when the character area is detected again from the area in the input image, and the feature quantity is extracted from the detected character area, more accurate feature quantity is able to be extracted without being affected by incorrect difference due to the geometric transformation. Further, even when a character sticks out from the different area of the input image that has not yet been corrected, the feature quantity is able to be accurately extracted by performing correction with the different area information correction unit 401.

Figure 14:
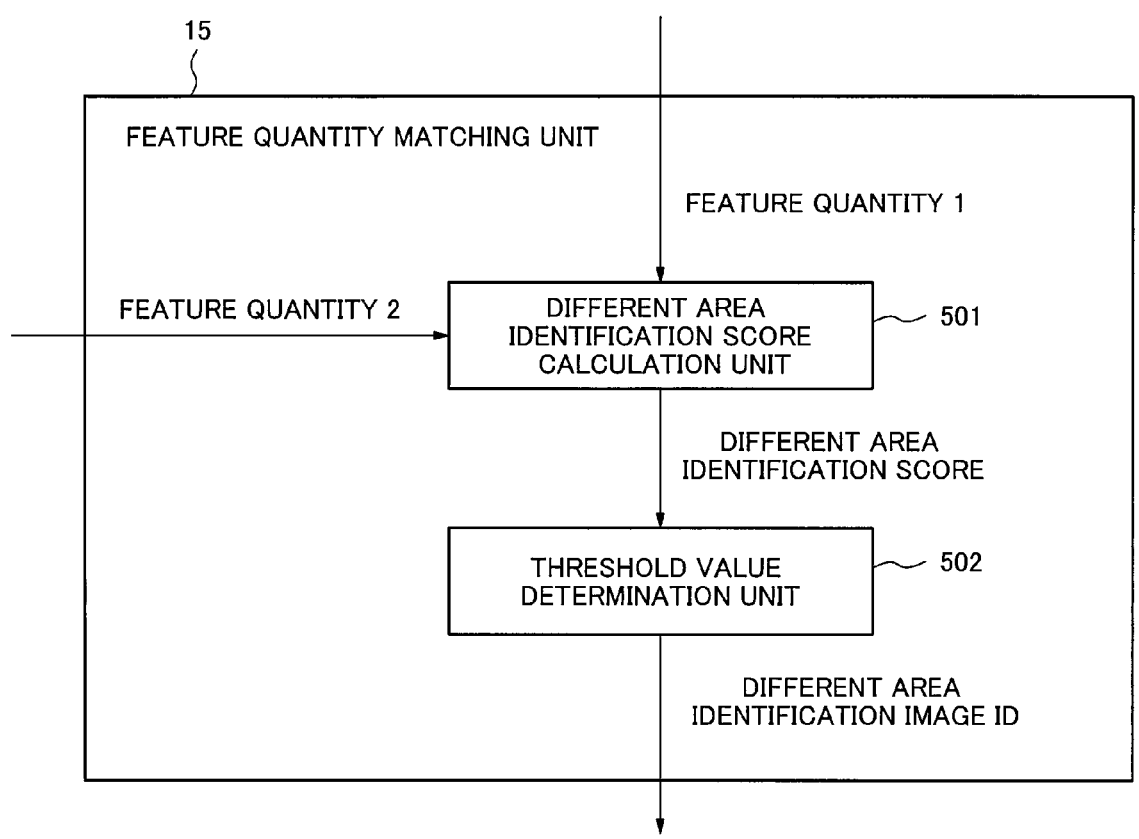
FIG. 14 is a block diagram illustrating an example of a configuration of a feature quantity matching unit 15.

Subsequently, the feature quantity matching unit 15 will be described in details. FIG. 14 is a block diagram illustrating an example of a configuration of the feature quantity matching unit 15. This diagram will be hereinafter described. As illustrated in FIG. 14, the feature quantity matching unit 15 is able to be constituted by a different area identification score calculation unit 501 and a threshold value determination unit 502.

The different area identification score calculation unit 501 respectively receives the feature quantity extracted from the different area of the input image as the feature quantity 1, and the feature quantity extracted from the different area of the reference image as the feature quantity 2. Then, the different area identification score calculation unit 501 outputs, as the different area identification score, the identification score determined from the two feature quantities. The different area identification score is such a degree that, the more greatly the feature quantity 1 and the feature quantity 2 are similar, the higher the value of the different area identification score is. For example, the different area identification score calculation unit 501 may calculate the distance between the feature quantity 1 and the feature quantity 2 on the feature quantity space, and may output the reciprocal number thereof as a different area identification score. Alternatively, in a case where the feature quantity 1 is matched with the feature quantity 2 extracted from each of multiple reference image groups, the different area identification score calculation unit 501 may output the different area identification score as follows. First, the different area identification score calculation unit 501 finds the minimum value of the distance on the feature quantity space from among all of the combinations of the feature quantities. Subsequently, the different area identification score calculation unit 501 may output, as a different area identification score, a reciprocal number of a value obtained by dividing the distance on the feature quantity space of all the combinations of the feature quantities by the minimum value. Alternatively, the different area identification score calculation unit 501 may output the different area identification score by referring to a table for mapping the distance value on the feature quantity space between the feature quantity 1 and the feature quantity 2 to a score between zero and one, which is prepared in advance. Still alternatively, in a case where the feature quantity extracted from the different area of the input image is the brightness value as illustrated in FIG. 11 or the brightness value corrected using average and standard deviation, the different area identification score calculation unit 501 may output the different area identification score as follows. The different area identification score calculation unit 501 may output the different area identification score as a score that is larger when a total summation of differences from the corresponding brightness values in the different area of the reference image, a total summation of squares of differences of the corresponding brightness values, or a total summation of absolute values of differences of the corresponding brightness values is smaller. Alternatively, the different area identification score calculation unit 501 may output the different area identification score as a score that is larger when the normalized cross-correlation of the corresponding brightness value is closer to one. In a case where the feature quantity extracted from the different area of the input image is the brightness value corrected using the brightness value as illustrated in FIG. 11 or average and standard deviation, the different area identification score calculation unit 501 may output the different area identification score as follows. First, before the brightness value of the corresponding pixel is compared as described above, the different area identification score calculation unit 501 transforms the feature quantity 1 using the Lucas-Kanade method or the like so that the position of the different area of the reference image from which the feature quantity 2 is extracted most closely matches the position of the different area of the input image from which the feature quantity 1 is extracted. Then, the different area identification score calculation unit 501 may output the different area identification score as a score that is larger when a total summation of differences from the brightness values of the corresponding pixels of the feature quantity 1 and the feature quantity 2, a total summation of squares of differences of the brightness values, or a total summation of absolute values of differences of the brightness values is smaller. Alternatively, in a case where the feature quantity extracted from the different area of the input image is the shape feature quantity as illustrated in FIG. 60, i.e., an edge image in which the value of each pixel indicates the edge intensity, or an image obtained by making the edge image into binary in the threshold value processing on the edge intensity, the different area identification score calculation unit 501 may output the different area identification score as follows. First, the different area identification score calculation unit 501 uses the feature quantity 2 as a template which is the feature quantity extracted from the different area of the reference image, and searches, while changing the scale, the direction, and the position thereof, the area where the image pattern is most similar in the feature quantity 1. Then, the different area identification score calculation unit 501 may output, as the different area identification score, the ratio of the number of pixels having matching patterns with respect to the number of pixels of the template at that occasion. At this occasion, a total summation of absolute values of differences of the edge intensities of the corresponding pixels, a total summation of squares of differences of the edge intensities of the corresponding pixels, or the like may be used as a scale for measuring the degree of matching of the pattern, or other scales may be used. In a case where the feature quantity extracted from the different area of the input image is the shape feature quantity as illustrated in FIG. 60, i.e., an edge image in which the value of each pixel indicates the edge intensity, or an image obtained by making the edge image into binary in the threshold value processing on the edge intensity, the following processing may be performed. More specifically, the different area identification score calculation unit 501 may not use all of the feature quantities 2 which are the feature quantities extracted from the different area of the reference image. Instead, the different area identification score calculation unit 501 may use some of the feature quantities 2. For example, the different area identification score calculation unit 501 may use only the edges corresponding to the contour by, e.g., taking the continuity of the edge into consideration. More specifically, the different area identification score calculation unit 501 may search the position that most appropriately fits for the feature quantity 1 according to a method such as Generalized Hough Transform from the edges corresponding to the contour in the feature quantity 2. Alternatively, the different area identification score calculation unit 501 may search the position that most precisely overlaps the feature quantity 1 while changing the scale, the direction, and the position of the edge corresponding to the contour, or may perform search according to another method. At this occasion, for example, the different area identification score calculation unit 501 may output, as the different area identification score, the ratio of the maximum value of the number of votes with respect to the total number of votes. Alternatively, in a case where the feature quantity extracted from the different area of the input image is FIG. 9 or FIG. 10, the different area identification score calculation unit 501 may calculate the degree of similarity for each of the corresponding rectangular shapes, and may output the degrees of calculated similarities as the different area identification scores. In a case where the feature quantity extracted from the different area of the input image is FIG. 9 and FIG. 10, the examples of the corresponding rectangular shapes are illustrated by arrows of dotted lines in FIG. 12 and FIG. 13, respectively. In the case of FIG. 9, the area of each of characters in the reference image and the area in the input image obtained by applying the geometric transformation to the coordinate position of each of the characters are the corresponding rectangular shape. In the case of FIG. 10, the coordinate position of each of characters in the reference image and the coordinate position of each of the characters in the input image are compared, and characters of which coordinate positions are close are the corresponding rectangular shapes.

The threshold value determination unit 502 performs the threshold value processing on the different area identification score which is output from the different area identification score calculation unit 501. In a case where the different area identification score is equal to or more than a threshold value, the threshold value determination unit 502 determines that the image is an image showing the same object, and outputs the ID of the reference image as the different area identification image ID. The threshold value used by the threshold value determination unit 502 may be a value determined and held inside in advance, or may be a value given from the outside. Alternatively, in a case where the different area identification score which is output from the different area identification score calculation unit 501 is the degree of similarity of the feature quantity extracted from each of the multiple rectangular shape areas in the reference image and the feature quantity extracted from each of the areas in the input image corresponding to each rectangular shape area, the threshold value determination unit 502 may perform processing as follows. More specifically, the threshold value determination unit 502 may calculate the ratio of the number of corresponding areas where the degree of similarity is equal to or more than a threshold value with respect to the number of corresponding areas, and may output, as the different area identification image ID, the ID of the reference image of which ratio is equal to or more than the threshold value. Alternatively, in a case where the difference of the highest different area identification score that is output from the different area identification score calculation unit 501 and the second highest different area identification score is equal to or more than the threshold value, the threshold value determination unit 502 may output the ID of the reference image having the highest different area identification score as the different area identification image ID. Alternatively, in a case where the ratio of the second highest different area identification score with respect to the highest different area identification score which is output from the different area identification score calculation unit 501 is equal to or less than a threshold value, the threshold value determination unit 502 may output, as the different area identification image ID, the ID of the reference image having the highest different area identification score. Alternatively, first, the threshold value determination unit 502 performs the threshold value processing on the different area identification scores which are output from the different area identification score calculation unit 501, and narrows down the different area identification scores to those equal to or more than the threshold value. Thereafter, in a case where the highest different area identification score and the second highest different area identification score are sufficiently different, the threshold value determination unit 502 may output, as the different area identification image ID, the ID of the reference image having the highest different area identification score. Alternatively, in a case where the feature quantity received from the input image different area feature quantity extraction unit 14 is a feature quantity made by combining a plurality of feature quantities, the threshold value determination unit 502 may perform processing as follows. More specifically, first, the threshold value determination unit 502 performs different area identification score calculation and threshold value determination on any given feature quantity. The threshold value determination unit 502 may perform matching in a stepwise manner, e.g., the different area identification score calculation and the threshold value determination are performed on another feature quantity in the reference image corresponding to the ID which is output as a result.

Figure 15:
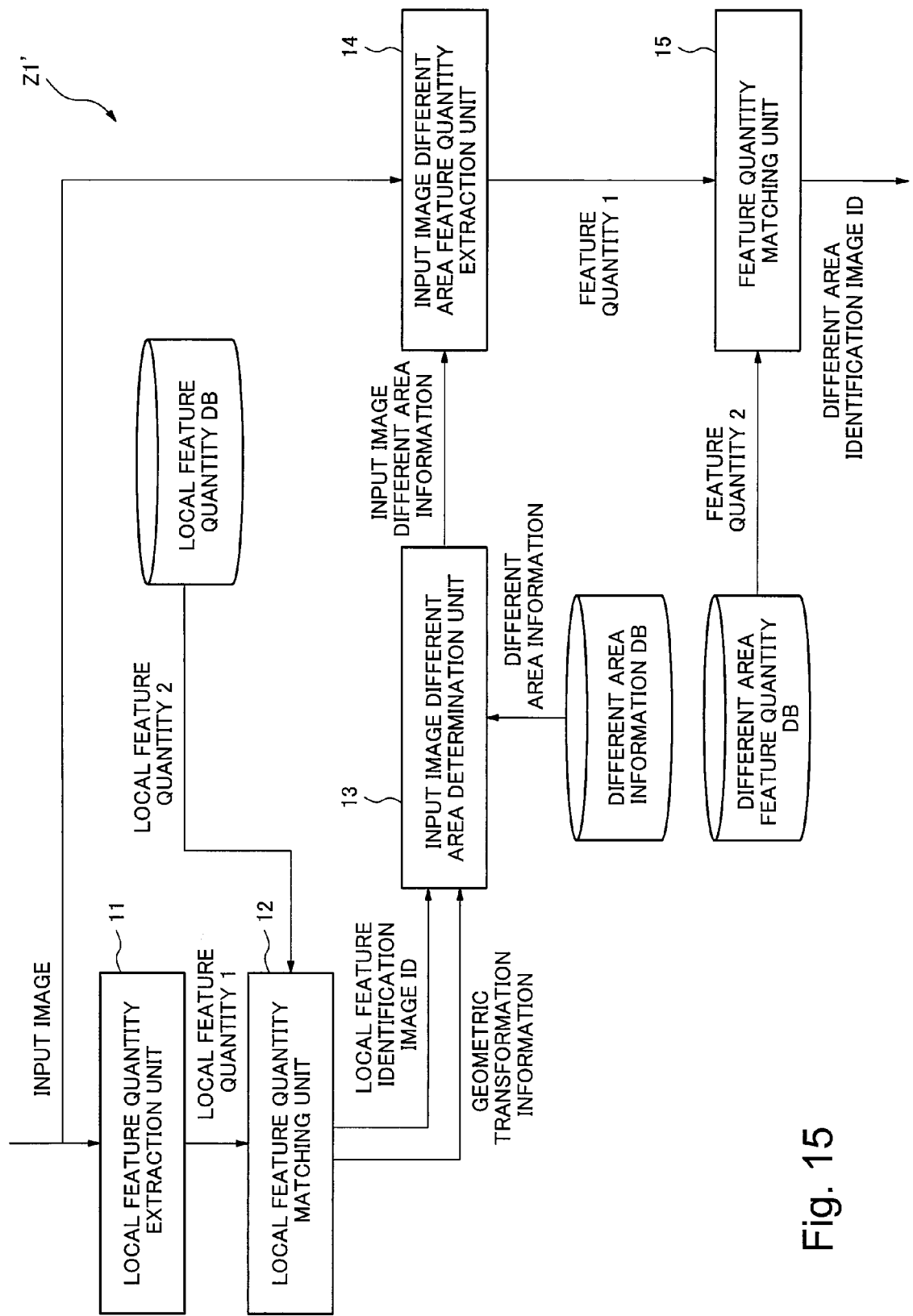
FIG. 15 is a block diagram illustrating an example of a configuration of an object identification device according to a first exemplary embodiment.

FIG. 15 is one of examples of realizations of the object identification device according to the first exemplary embodiment of present invention. An object identification device Z1' of FIG. 15 is substantially the same as FIG. 1, and is different in that the object identification device Z1' is provided with a different area information DB which is a database storing only the different area information. In a case where the local feature quantity 2 is not stored as the database, and is extracted from the reference image on-the-fly, the object identification device according to the first exemplary embodiment of the present invention is able to be realized with the configuration of FIG. 15.

Figure 16:
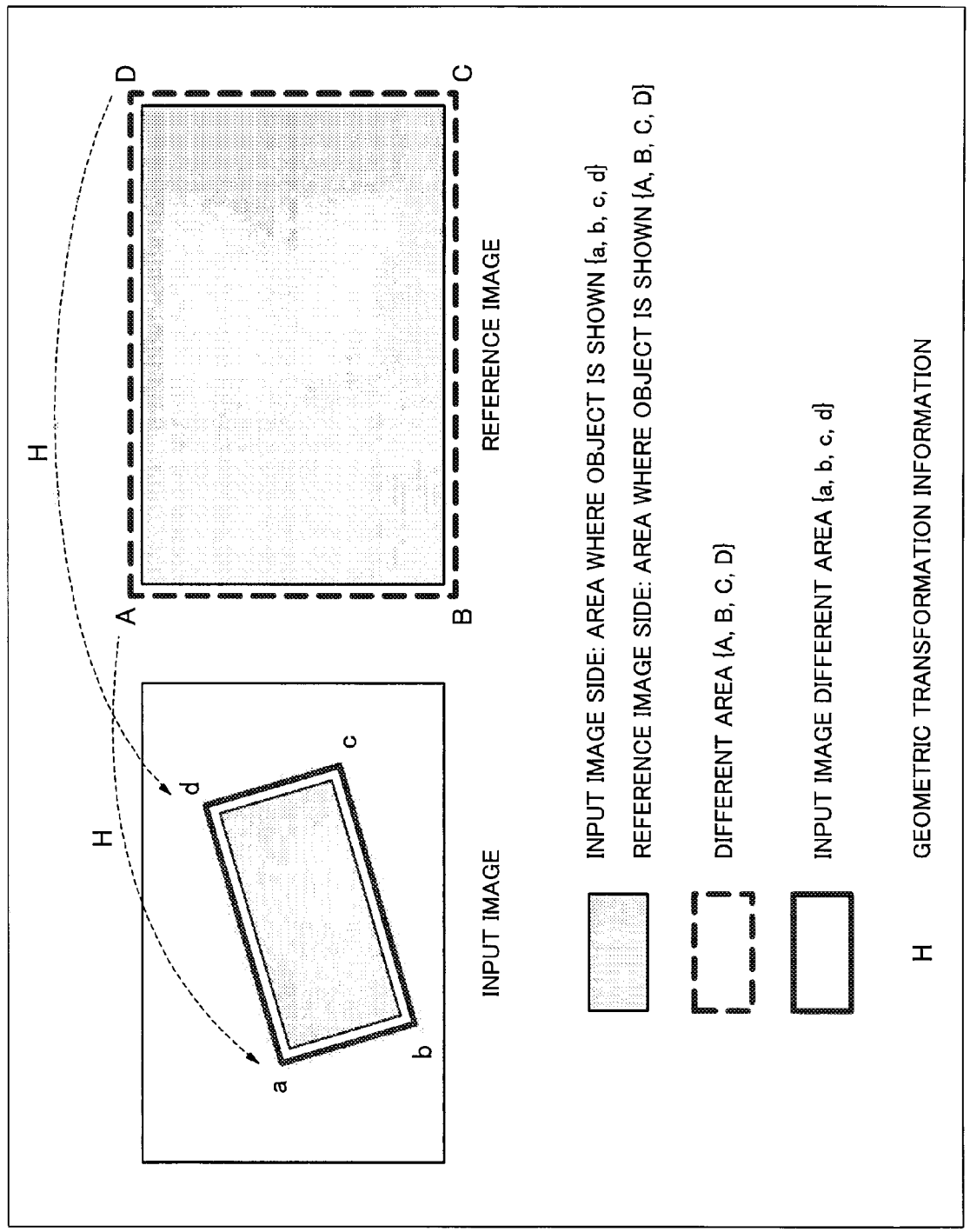
FIG. 16 is a conceptual drawing illustrating a relationship of a different area in a reference image and an input image different area in an input image.

FIG. 16, FIG. 17, FIG. 18, and FIG. 19 are conceptual drawings each illustrating a pattern considered to be a relationship of a different area in a reference image and an input image different area in an input image FIG. 16 illustrates a case where an object is displayed on the entire reference image, and the different area is the entire reference image. This corresponds to a case where, e.g., characters, patterns, and the like engraved in the object are substantially the same but the color of the object is different, which is often seen on, e.g., packages of snacks of the same brand but of different flavors.

Figure 17:
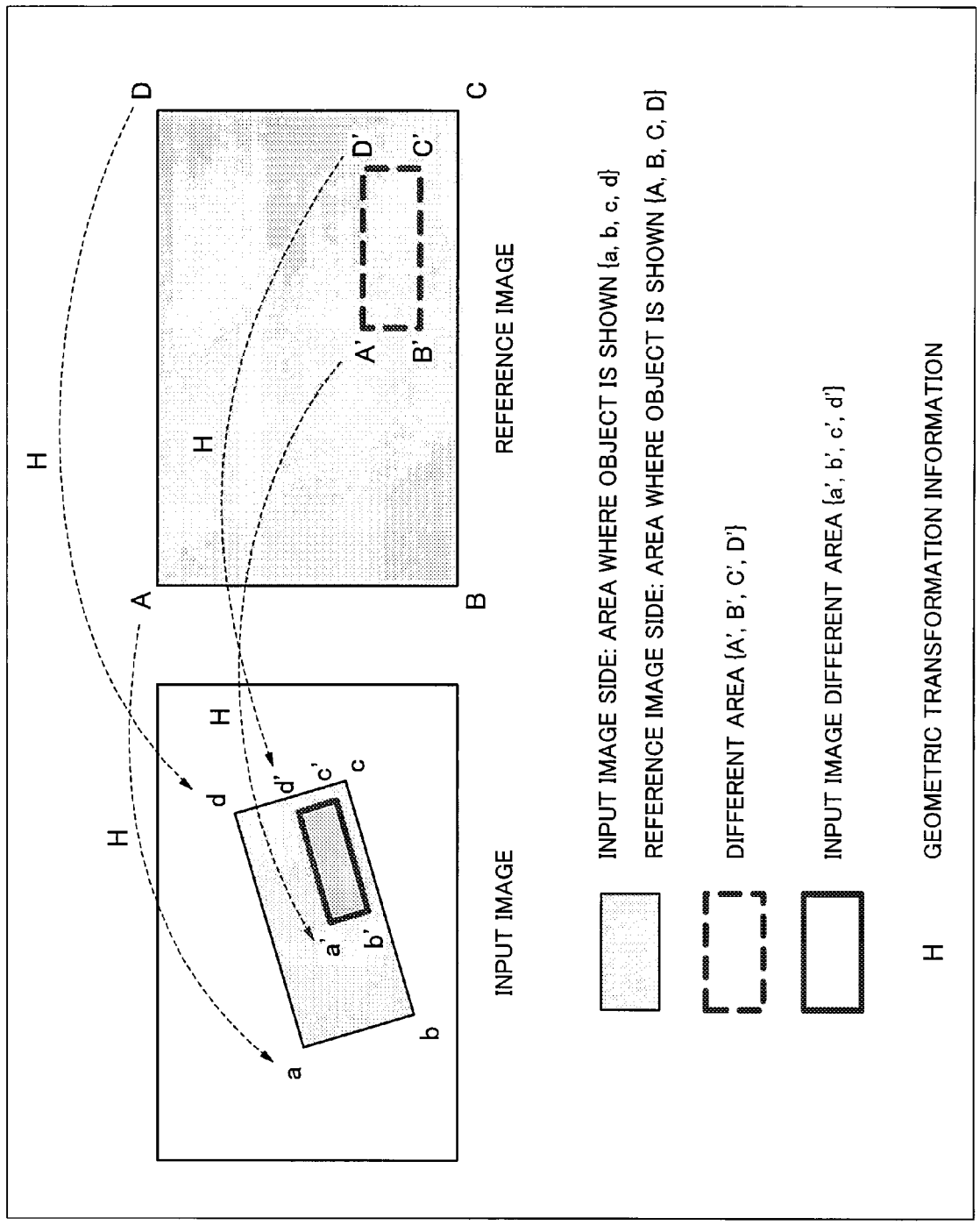
FIG. 17 is a conceptual drawing illustrating a relationship of a different area in a reference image and an input image different area in an input image.

FIG. 17 illustrates a case where an object is displayed on the entire reference image, and the different area is a portion of the reference image. This corresponds to a case where the objects are substantially the same, but colors, characters, and patterns are different only in a part of the object, which is often seen on, e.g., the spines of books and the like which are of the same series but of different volumes.

Figure 18:
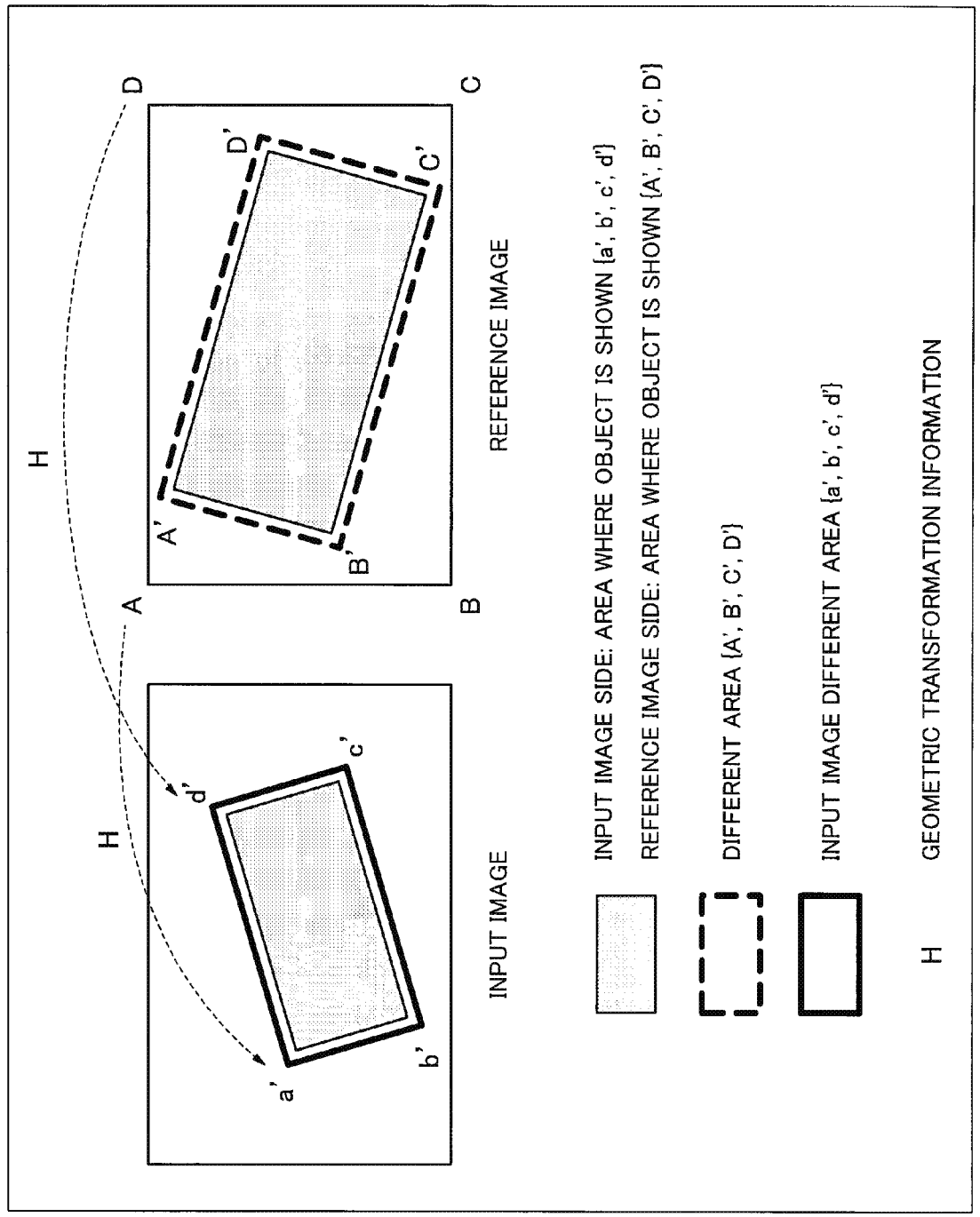
FIG. 18 is a conceptual drawing illustrating a relationship of a different area in a reference image and an input image different area in an input image.
Figure 19:
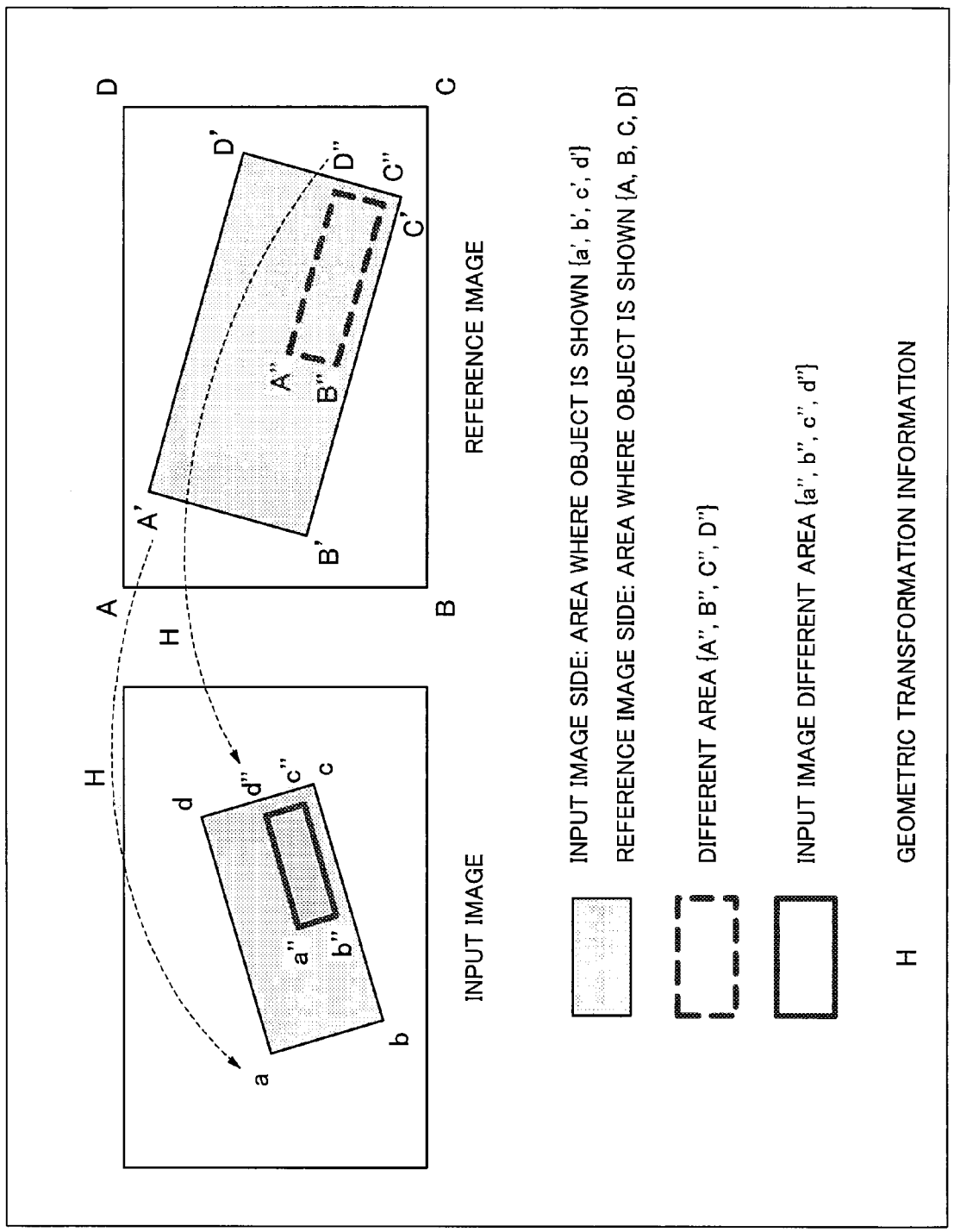
FIG. 19 is a conceptual drawing illustrating a relationship of a different area in a reference image and an input image different area in an input image.

FIG. 18 and FIG. 19 are substantially the same as FIG. 16 and FIG. 17, but are different in that the reference image is shown not on the entire image but on a part of the image. In any of these patterns, the object identification device Z1' according to the first exemplary embodiment of the present invention has information about the different area registered in the database in advance. As each of the registered different area in the reference image, a different area in the input image determined by using the geometric transformation information and the different area information, and further an area obtained by correcting the different area in the input image, only the minimum necessary areas involving difference is able to be extracted from the reference image and the input image. For this reason, not only in the case where the different area is the entire object but also in the case where the different area is only a part of the object, the object shown in the image is able to be accuracy identified. Therefore, the identification error, which was the problem associated with a conventional case where only a local feature quantity is used, is able to be suppressed.

As described above, the object identification devices Z1 and Z1' according to the first exemplary embodiment of the present invention is able to reduce the identification error of the reference image showing an object that has only a slight difference from an object shown in the input image. The reason for this is as follows. The different area in the input image is determined by transforming the different area in the reference image on the basis of the geometric transformation information between the input image and the reference image calculated when the local feature quantity is calculated. Then, the feature quantity extracted from the different area of the input image and the feature quantity extracted from the different area of the reference image are matched, so that small difference, which is not able to be identified by performing only the matching based on a conventional local feature quantity, is able to be distinguished, and only an image showing the same object is able to be identified.

Second Exemplary Embodiment

The second exemplary embodiment according to the present invention will be described with reference to drawings.

Figure 20:
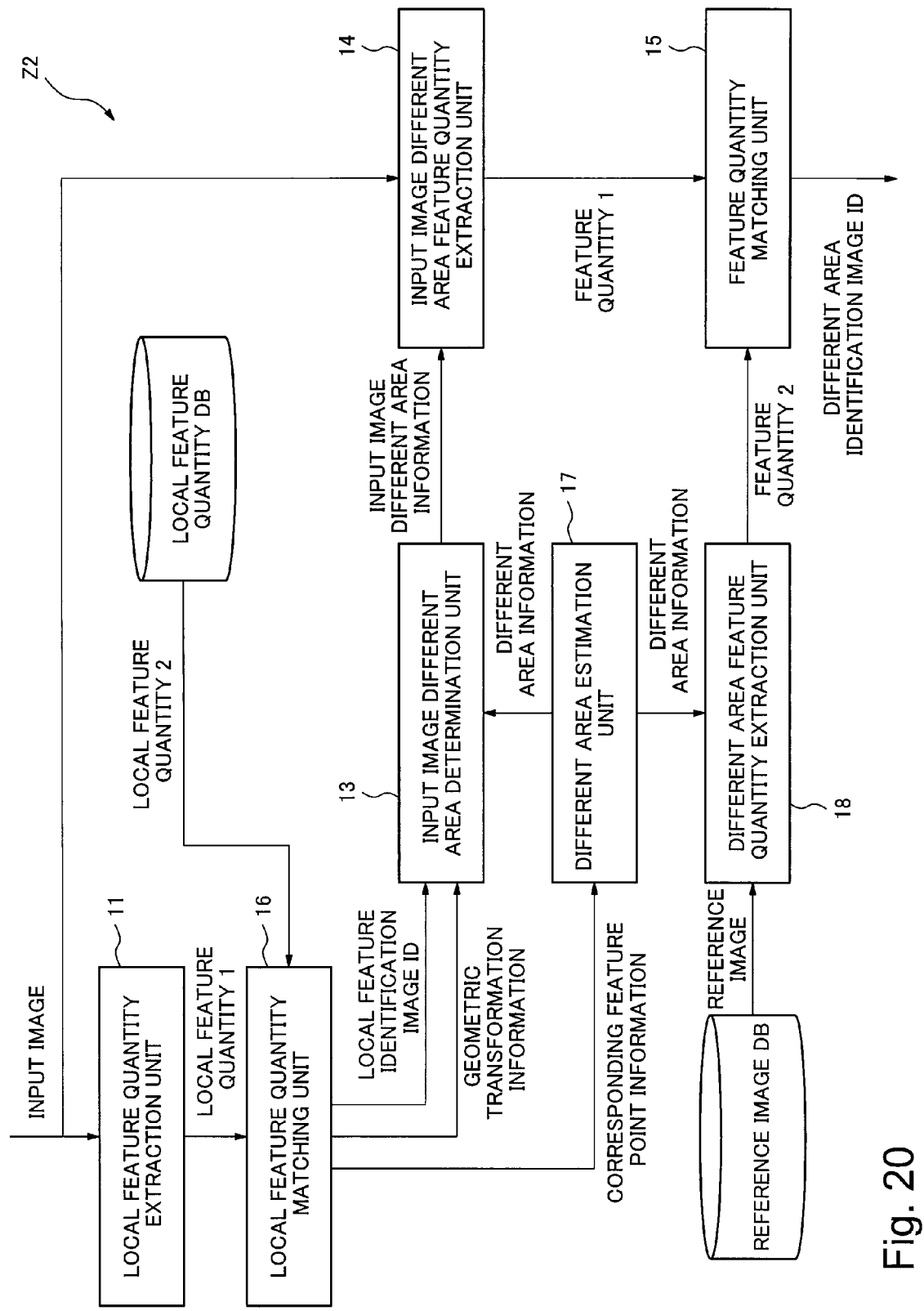
FIG. 20 is a block diagram illustrating an example of a configuration of an object identification device according to a second exemplary embodiment.

FIG. 20 is a block diagram illustrating a configuration of an object identification device according to the second exemplary embodiment of the present invention. As illustrated in FIG. 20, an object identification device Z2 according to the second exemplary embodiment includes the local feature quantity extraction unit 11, a local feature quantity matching unit 16, the input image different area determination unit 13, the input image different area feature quantity extraction unit 14, a different area estimation unit 17, a different area feature quantity extraction unit 18, and the feature quantity matching unit 15. As described above, the object identification device Z2 according to the second exemplary embodiment is different in that the local feature quantity matching unit 12 of the object identification device according to the first exemplary embodiment is replaced with the local feature quantity matching unit 16, and the different area information DB which is a database storing the different area information is replaced with the different area estimation unit 17 and the different area feature quantity extraction unit 18. The details of the local feature quantity matching unit 16, the different area estimation unit 17, and the different area feature quantity extraction unit 18 will be described later. The other constituent elements are the same as those of the first exemplary embodiment. These constituent elements are denoted with the same reference numerals, and detailed explanation thereabout is omitted.

Figure 21:
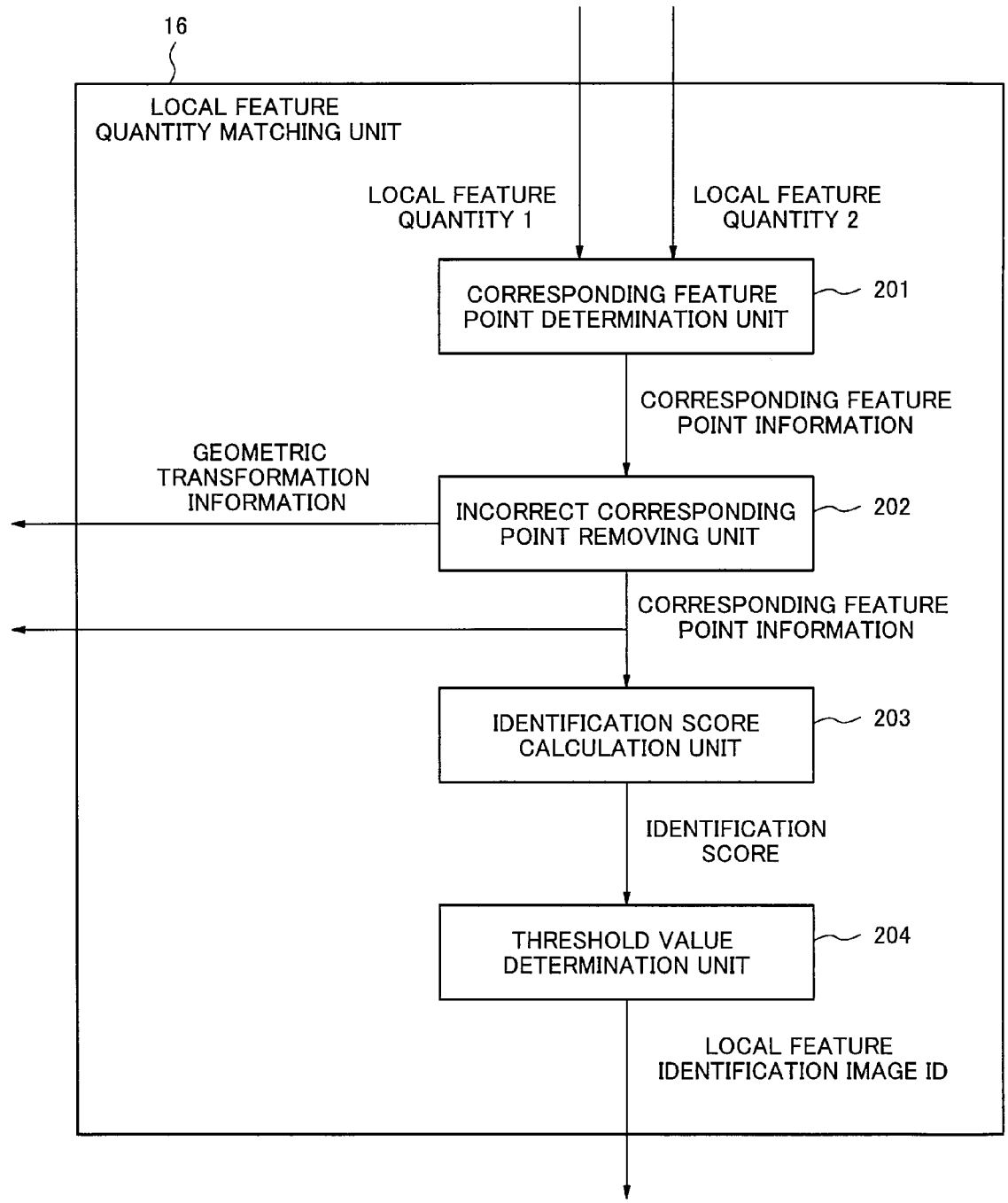
FIG. 21 is a block diagram illustrating an example of a configuration of a local feature quantity matching unit 16.

FIG. 21 is a block diagram illustrating an example of a configuration of the local feature quantity matching unit 16. This diagram will be hereinafter described. As illustrated in FIG. 21, the local feature quantity matching unit 16 is able to be constituted by the corresponding feature point determination unit 201, the incorrect corresponding point removing unit 202, the identification score calculation unit 203, and the threshold value determination unit 204. Those are the same as the constituent elements of the local feature quantity matching unit 12 as illustrated in FIG. 4, but are different in that, in addition to the geometric transformation information which is output from the incorrect corresponding point removing unit 202 and the local feature identification image ID which is output from the threshold value determination unit 204, the corresponding feature point information which is output from the incorrect corresponding point removing unit 202 is output from the local feature quantity matching unit 16. As described above, the corresponding feature point information is information including information indicating whether the feature points are correctly corresponding or incorrectly corresponding between the reference image and the input image.

Figure 22:
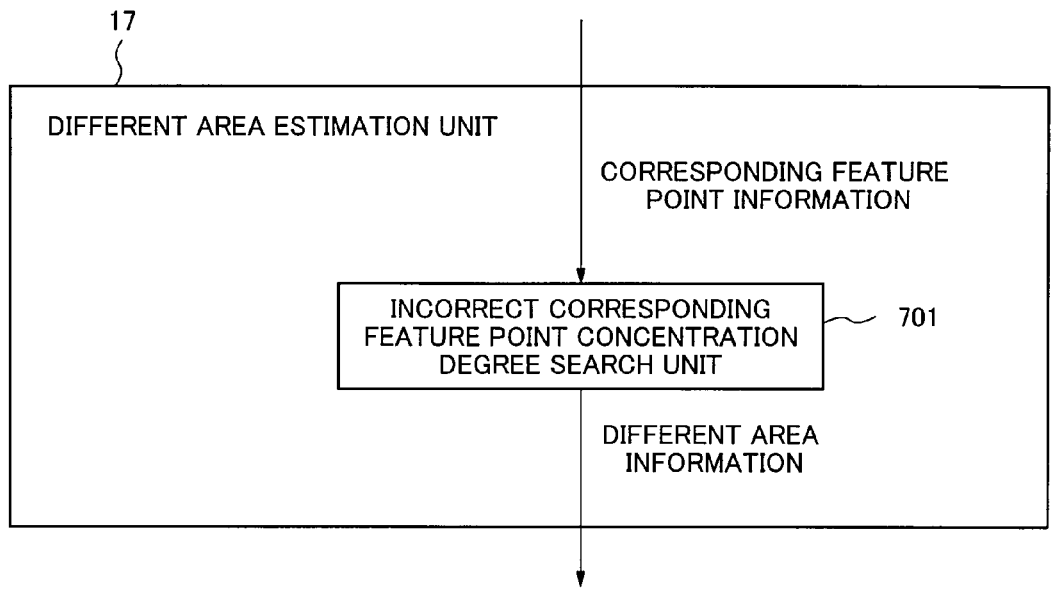
FIG. 22 is a block diagram illustrating an example of a configuration of a different area estimation unit 17.

FIG. 22 is a block diagram illustrating a configuration of the different area estimation unit 17. This diagram will be hereinafter described. As illustrated in FIG. 22, the different area estimation unit 17 is able to be constituted by only an incorrect corresponding feature point concentration degree search unit 701.

The incorrect corresponding feature point concentration degree search unit 701 receives corresponding feature point information from the local feature quantity matching unit 16, and outputs different area information which is information about a different area in the reference image. In the corresponding feature point information received from the local feature quantity matching unit 16, correctly corresponding feature points and incorrectly corresponding feature points are determined. For this reason, the different area in the reference image is able to be estimated by searching an area where incorrectly corresponding feature points are concentrated from the image. The search of the area where the incorrectly corresponding feature points are concentrated may be done according to, for example, the following method, or may be other methods. In the method, a rectangular shape window having a preset size is set, and the rectangular shape window is moved in the different image, and when the number of incorrectly corresponding feature points is equal to or more than a preset number within the rectangular shape window, the area of the rectangular shape window is adopted as the different area.

Figure 23:
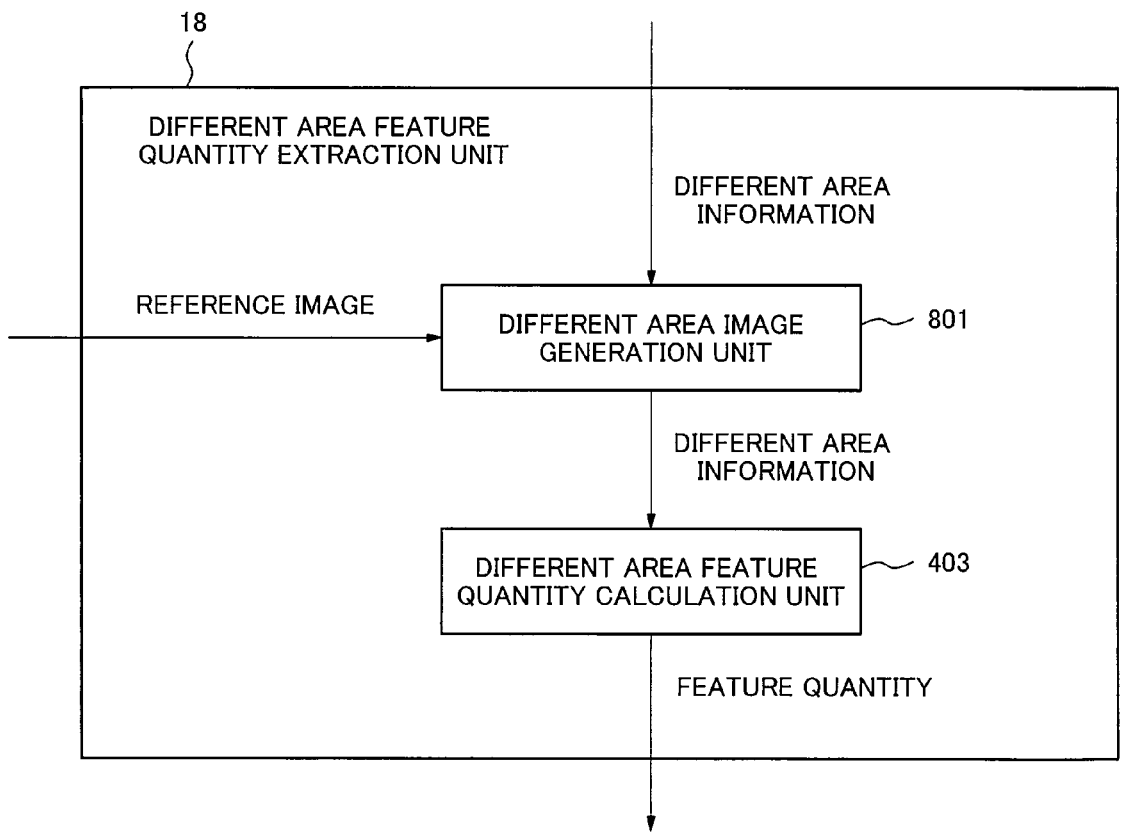
FIG. 23 is a block diagram illustrating an example of a configuration of a different area feature quantity extraction unit 18.

FIG. 23 is a block diagram illustrating an example of a configuration of the different area feature quantity extraction unit 18. This diagram will be hereinafter described. As illustrated in FIG. 23, the different area feature quantity extraction unit 18 is able to be constituted by a different area image generation unit 801 and the different area feature quantity calculation unit 403.

The different area image generation unit 801 is substantially the same as the different area image generation unit 404 which is a constituent element of the input image different area feature quantity extraction unit 14 illustrated in FIG. 6, but is different in the following features. The different area image generation unit 801 is different in that the different area image generation unit 801 receives the reference image instead of the input image and receives the different area information instead of the input image different area information, and that the different area image generation unit 801 outputs the different area image generated from the reference image on the basis of the different area information instead of the different area image generated from the input image on the basis of the input image different area information. The different area feature quantity calculation unit 403 is the same as the different area feature quantity calculation unit 403 which is a constituent element of the input image different area feature quantity extraction unit 14 as illustrated in FIG. 5 and FIG. 6, and detailed description there about is omitted. The feature quantity calculated by the different area feature quantity calculation unit 403 in FIG. 5, FIG. 6, and FIG. 23 is the feature quantity calculated in the same processing.

The object identification device Z2 according to the second exemplary embodiment of the present invention is able to estimate the different area in the reference image even when the different area in the reference image is not registered to the database in advance. Therefore, the object identification device Z2 is particularly effective when information about the different area is not able to be registered in advance, e.g., when only a product having a scratch somewhere is distinguished from many products by an inspection system using object identification. The estimation of the different area in the reference image performed by the object identification device Z2 according to the second exemplary embodiment of the present invention is possible even when the different area is the entire object or when the different area is a part of the object. Therefore, the object identification device Z2 according to the second exemplary embodiment of the present invention is effective for any of the cases of FIG. 16, FIG. 17, FIG. 18, and FIG. 19.

Third Exemplary Embodiment

The third exemplary embodiment of the present invention will be described with reference to drawings.

Figure 24:
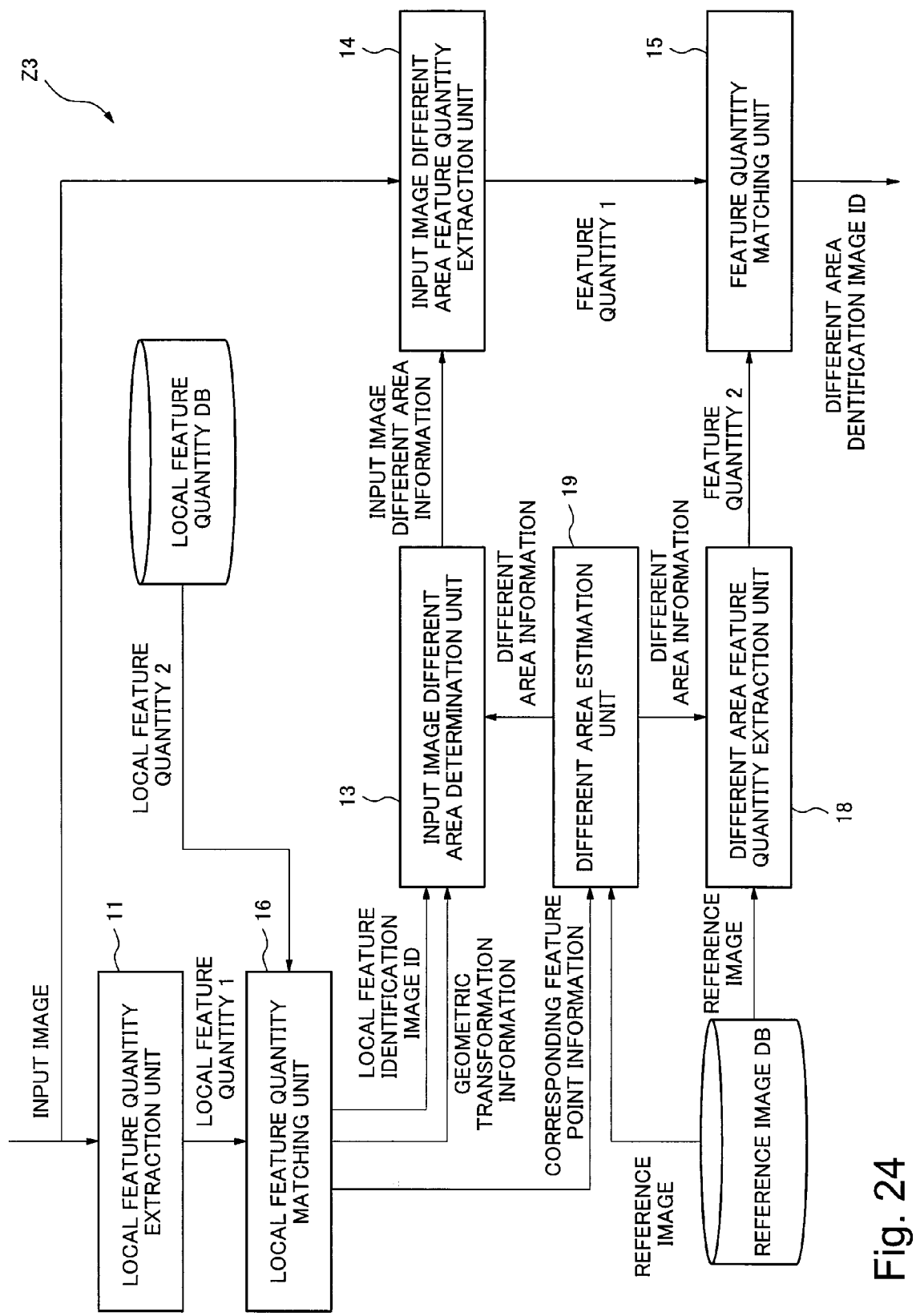
FIG. 24 is a block diagram illustrating an example of a configuration of an object identification device according to a third exemplary embodiment.

FIG. 24 is a block diagram illustrating a configuration of an object identification device according to the third exemplary embodiment of the present invention. As illustrated in FIG. 24, an object identification device Z3 according to the third exemplary embodiment includes the local feature quantity extraction unit 11, the local feature quantity matching unit 16, the input image different area determination unit 13, the input image different area feature quantity extraction unit 14, the feature quantity matching unit 15, a different area estimation unit 19, and the different area feature quantity extraction unit 18. As described above, the object identification device Z3 according to the third exemplary embodiment is different in that the different area estimation unit 17 of the object identification device Z2 according to the second exemplary embodiment is replaced with the different area estimation unit 19. The details of the different area estimation unit 19 will be described later. The other constituent elements are the same as those of the second exemplary embodiment. These constituent elements are denoted with the same reference numerals, and detailed explanation thereabout is omitted.

Figure 25:
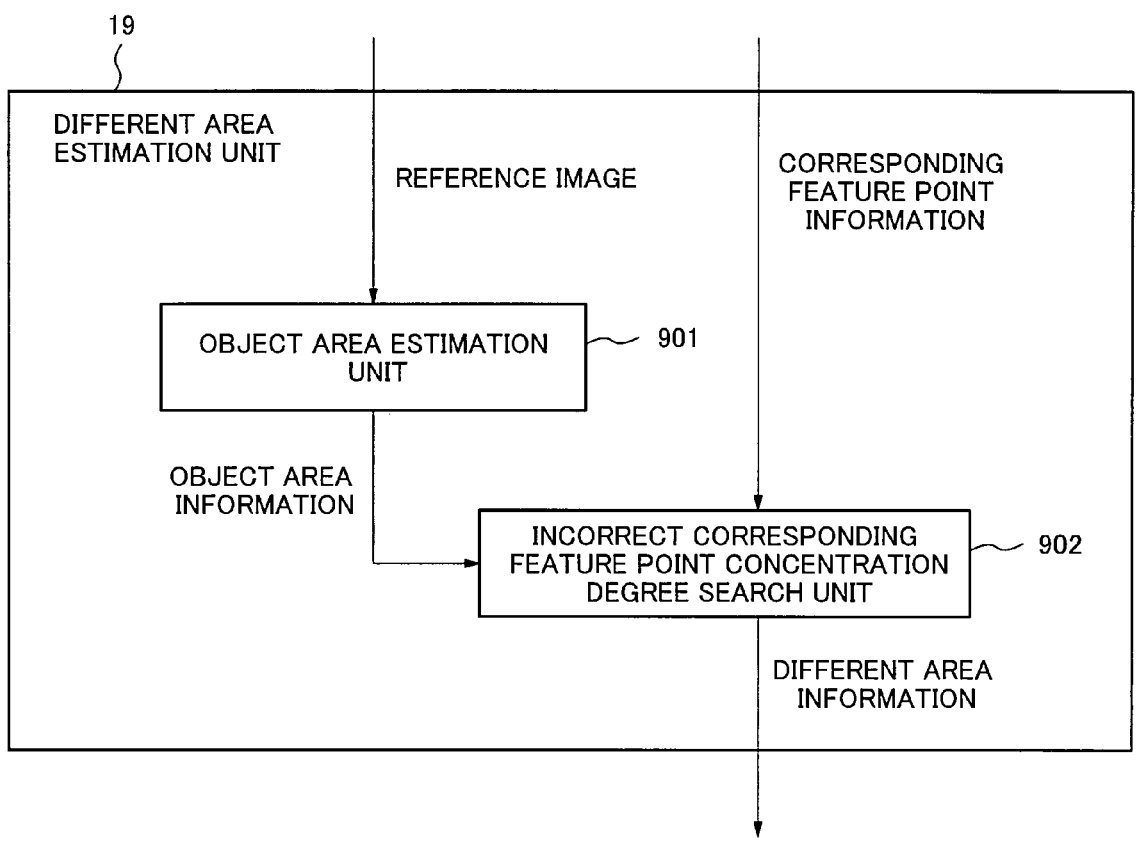
FIG. 25 is a block diagram illustrating an example of a configuration of a different area estimation unit 19.

FIG. 25 is a block diagram illustrating an example of a configuration of the different area estimation unit 19. This diagram will be hereinafter described. As illustrated in FIG. 25, the different area estimation unit 19 is able to be constituted by an object area estimation unit 901 and an incorrect corresponding feature point concentration degree search unit 902.

The object area estimation unit 901 receives a reference image corresponding to the local feature identification image ID which is output from the local feature quantity matching unit 16, or a reference image group related to the local feature identification image ID, and outputs object area information which is information representing an area where an object exists in the reference image. The reference image received here may be stored to a database in advance as illustrated in FIG. 24, or may not be stored. The processing performed by the object area estimation unit 901 may be based on, for example, a method of roughly estimating the object area by analyzing edge intensities in the reference image, or a method of learning an image pattern of the background area in advance and roughly estimating the object area as an area other than the background. The incorrect corresponding feature point concentration degree search unit 902 is similar to the incorrect corresponding feature point concentration degree search unit 701 which is a constituent element of the different area estimation unit 17 illustrated in FIG. 22, but is different in that the incorrect corresponding feature point concentration degree search unit 902 receives not only the corresponding feature point information received from the local feature quantity matching unit 16 but also the object area information which is output from the object area estimation unit 901. The incorrect corresponding feature point concentration degree search unit 902 focuses on only points existing inside of the object area from among the corresponding feature points, and searches an area where incorrectly corresponding feature points are concentrated, so that the incorrect corresponding feature point concentration degree search unit 902 is able to estimate the different area in the reference image without being affected by the incorrectly corresponding feature points that appear from areas other than the object.

Since the range where the incorrect corresponding feature point concentration degree search unit 902 searches areas in which the incorrectly corresponding feature points are concentrated in the reference image, the incorrect corresponding feature point concentration degree search unit 902 is able to perform higher speed processing compared with the incorrect corresponding feature point concentration degree search unit 701 of which search range is the entire reference image.

Like the second exemplary embodiment, the object identification device Z3 according to the third exemplary embodiment of the present invention is able to estimate the different area in the reference image even when the different area in the reference image is not registered to the database in advance. Therefore, the object identification device Z3 is particularly effective when information about the different area is not able to be registered in advance, e.g., when only a product having a scratch somewhere is distinguished from many products by an inspection system using object identification. The estimation of the different area in the reference image performed by the object identification device Z3 according to the third exemplary embodiment of the present invention is possible even when the different area is the entire object and when the different area is a part of the object, and the different area is able to be estimated with a high degree of accuracy without being affected by the incorrectly corresponding feature points that appear from areas other than the object, and therefore, the estimation of the different area in the reference image performed by the object identification device Z3 according to the third exemplary embodiment of the present invention is particularly effective in the cases of FIG. 18 and FIG. 19.

Fourth Exemplary Embodiment

The fourth exemplary embodiment of the present invention will be described with reference to drawings.

Figure 26:
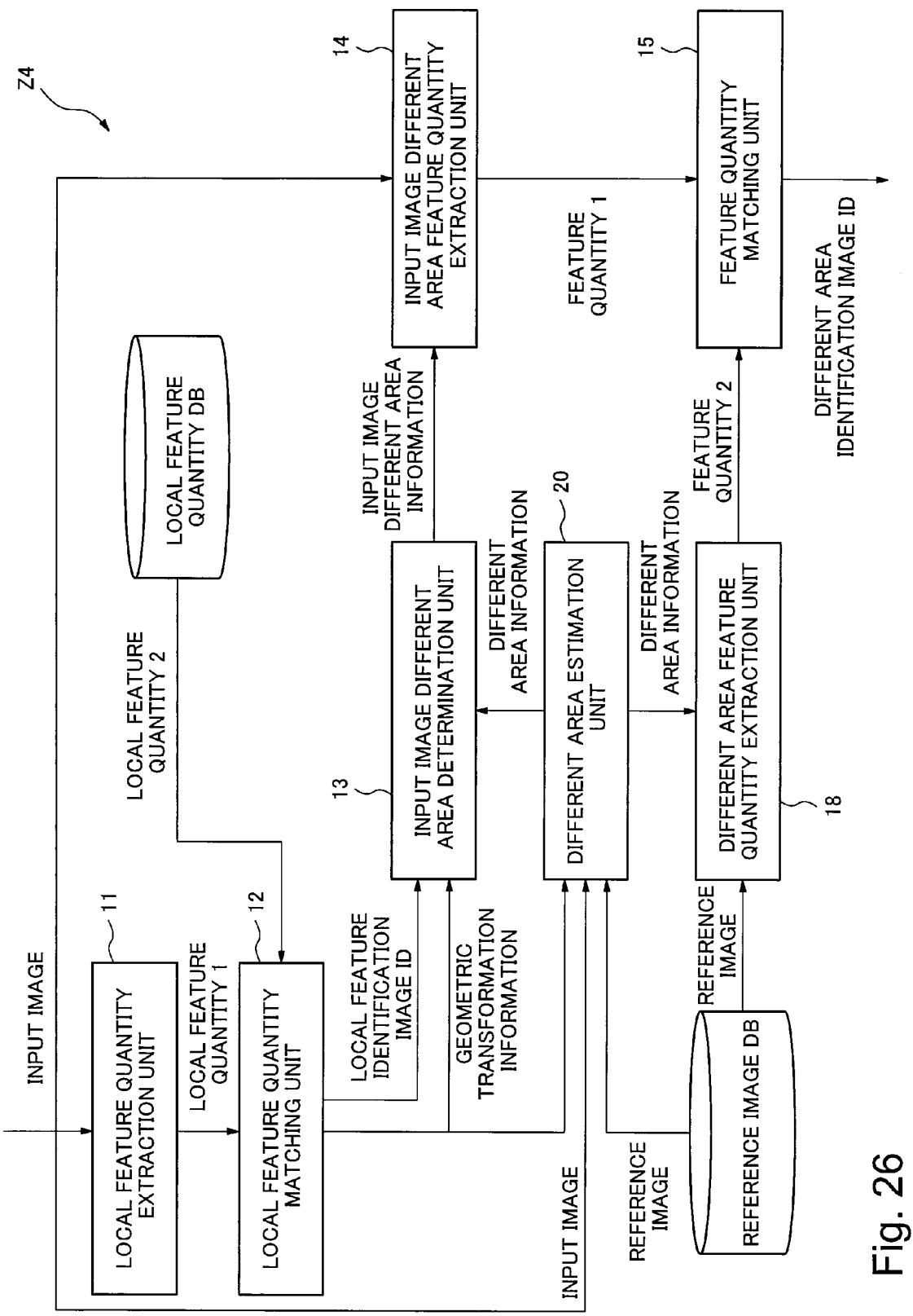
FIG. 26 is a block diagram illustrating an example of a configuration of an object identification device according to a fourth exemplary embodiment.

FIG. 26 is a block diagram illustrating a configuration of an object identification device according to the fourth exemplary embodiment of the present invention. As illustrated in FIG. 26, an object identification device Z4 according to the fourth exemplary embodiment includes the local feature quantity extraction unit 11, the local feature quantity matching unit 12, the input image different area determination unit 13, the input image different area feature quantity extraction unit 14, the feature quantity matching unit 15, a different area estimation unit 20, and the different area feature quantity extraction unit 18.

As described above, the object identification device Z4 according to the fourth exemplary embodiment is different in that the local feature quantity matching unit 16 and the different area estimation unit 19 of the object identification device Z3 according to the third exemplary embodiment are replaced with the local feature quantity matching unit 12 and the different area estimation unit 20. The local feature quantity matching unit 12 is the same as the local feature quantity matching unit 12 of the object identification device Z1 and Z1' according to the first exemplary embodiment, and detailed description thereabout is omitted. The details of the different area estimation unit 20 will be described later. The other constituent elements are the same as those of the third exemplary embodiment. These constituent elements are denoted with the same reference numerals, and detailed explanation thereabout is omitted.

Figure 27:
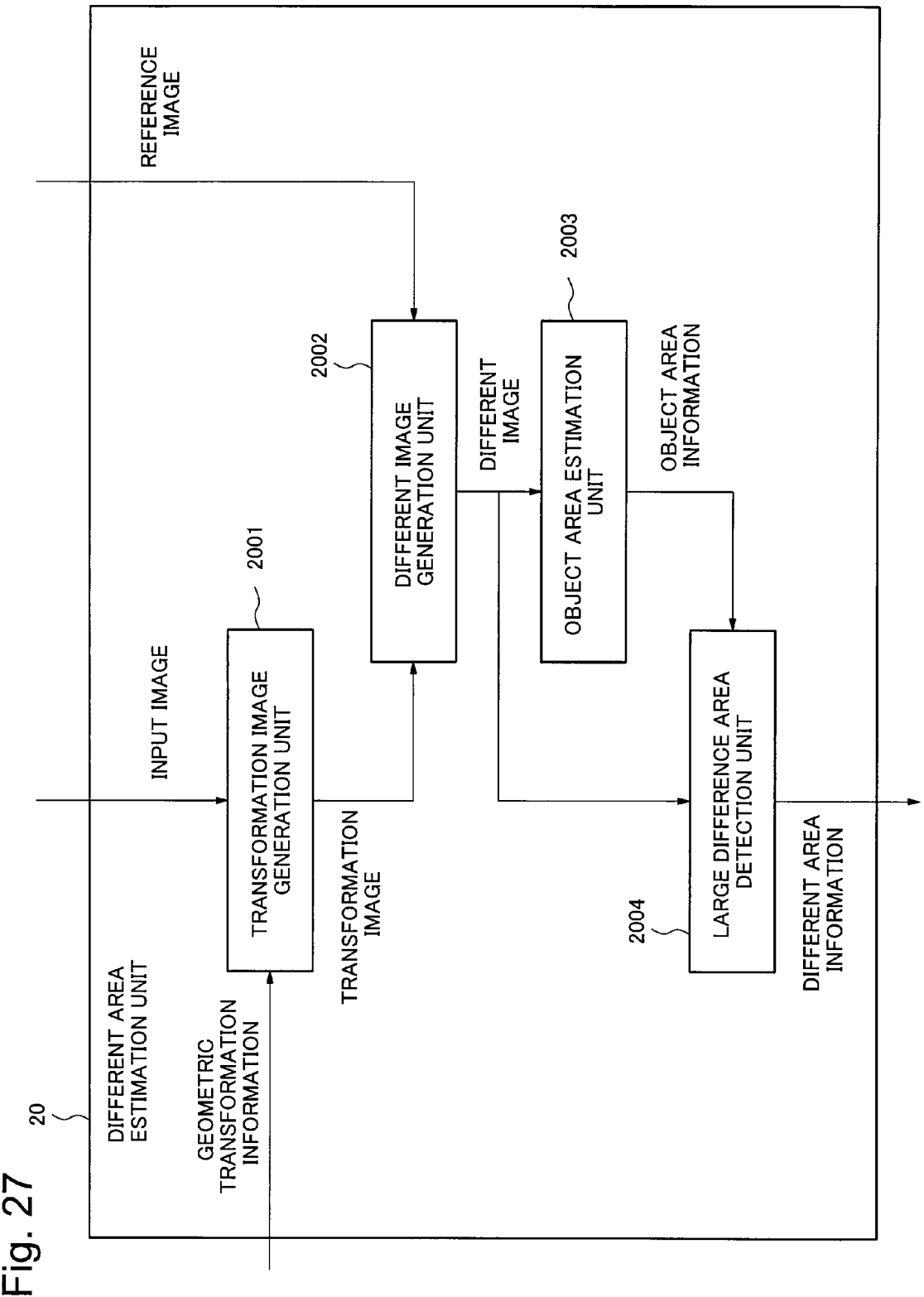
FIG. 27 is a block diagram illustrating an example of a configuration of a different area estimation unit 20.

FIG. 27 is a block diagram illustrating an example of a configuration of the different area estimation unit 20. This diagram will be hereinafter described. As illustrated in FIG. 27, the different area estimation unit 20 is able to be constituted by a transformation image generation unit 2001, a different image generation unit 2002, an object area estimation unit 2003, and a large difference area detection unit 2004.

The transformation image generation unit 2001 receives an input image and geometric transformation information which is output from the local feature quantity matching unit 12, and outputs a transformation image. For example, the transformation image generation unit 2001 applies geometric transformation information to each of the pixels of the input image, and projecting each of the pixels of the input image onto the image having the same size as the reference image, thus generating the transformation image. At this occasion, in the image onto which the pixels are projected, the pixel values of the pixels onto which the pixels in the input image are not projected are filled with zero and the like by the transformation image generation unit 2001, so that the transformation image is generated. In a case where the geometric transformation information which is output from the local feature quantity matching unit 12 is information of transformation from coordinates in the reference image into coordinates in the input image, the geometric transformation information applied by this transformation image generation unit 2001 needs to be information of performing inverse transformation thereto. More specifically, in a case where the geometric transformation information which is output from the local feature quantity matching unit 12 is a 3×3 matrix of transformation from coordinates in the reference image into coordinates in the input image, the inverse matrix thereof is used as the geometric transformation information applied by the transformation image generation unit 2001.

The different image generation unit 2002 receives the reference image corresponding to the local feature identification image ID which is output from the local feature quantity matching unit 12 or the reference image group related to the local feature identification image ID, and the transformation image which is output from the transformation image generation unit 2001, and outputs, as a different image, an image made by calculating a difference between the reference image and the transformation image. When the different image generation unit 2002 calculates the difference between the reference image and the transformation image, for example, the different image generation unit 2002 may calculate the difference after correcting the brightness of one of the images so that the average values of the brightness of both of the images are the same. The reference image received here may be stored to a database in advance as illustrated in FIG. 26, or may not be stored.

The object area estimation unit 2003 receives the different image from the different image generation unit 2002, and estimates and outputs the object area information. The object area information which is output here is able to be estimated by, for example, searching an area in which the difference value is small in the different image from the image. This is because the area in which the difference value is small in the different image is considered to be an area where the same object in both of the reference image and the transformation image is likely to be shown. In the estimation of the object area, for example, a rectangular shape window having a predetermined size is set, and the rectangular shape window is moved in the different image, and when the number of pixels of which pixel values are small is equal to or more than a predetermined number within the rectangular shape window, the area of the rectangular shape window is adopted as the object area. Alternatively, the estimation of the object area may be done according to other methods.

The large difference area detection unit 2004 receives the different image which is output from the different image generation unit 2002 and the object area information which is output from the object area estimation unit 2003, and outputs the different area information. The large difference area detection unit 2004 determines that a portion where the difference value is large in the object area in the different image is likely to be a portion where there is a difference in the object illustrated in the reference image and the transformation image, and searches the portion where the difference value is large from the image, and outputs the area information as the different area information. In the search of a portion where the different value is large, i.e., the search of the different area, for example, a rectangular shape window having a preset size is set, and the rectangular shape window is moved in the object area in the different image, and when the number of pixels of which pixel values are large is equal to or more than a preset number within the rectangular shape window, the area of the rectangular shape window is adopted as the different area. Alternatively, the search of a portion where the different value is large, i.e., the search of the different area, may be done according to other methods.

As described above, in the fourth exemplary embodiment of the present invention, the different area estimation unit 20 uses the input image, the reference image, and the geometric transformation information to estimate the different area in the reference image. Like the second or third exemplary embodiment, the object identification device Z4 according to the fourth exemplary embodiment of the present invention is able to estimate the different area in the reference image even when the different area in the reference image is not registered to the database in advance. Therefore, the object identification device Z4 is effective when information about the different area is not able to be registered in advance, e.g., when only a product having a scratch somewhere is distinguished from many products by an inspection system using object identification. The estimation of the different area in the reference image performed according to the fourth exemplary embodiment of the present invention is possible even when the different area is the entire object and when the different area is a part of the object, and, like the third exemplary embodiment, after the object area is first estimated so that influence of the background is eliminated, the different area is estimated again, and this enables estimating the different area with a high degree of accuracy, and therefore, the estimation of the different area in the reference image performed according to the fourth exemplary embodiment of the present invention is particularly effective in the cases of FIG. 18 and FIG. 19.

Fifth Exemplary Embodiment

The fifth exemplary embodiment of the present invention will be described with reference to drawings.

Figure 28:
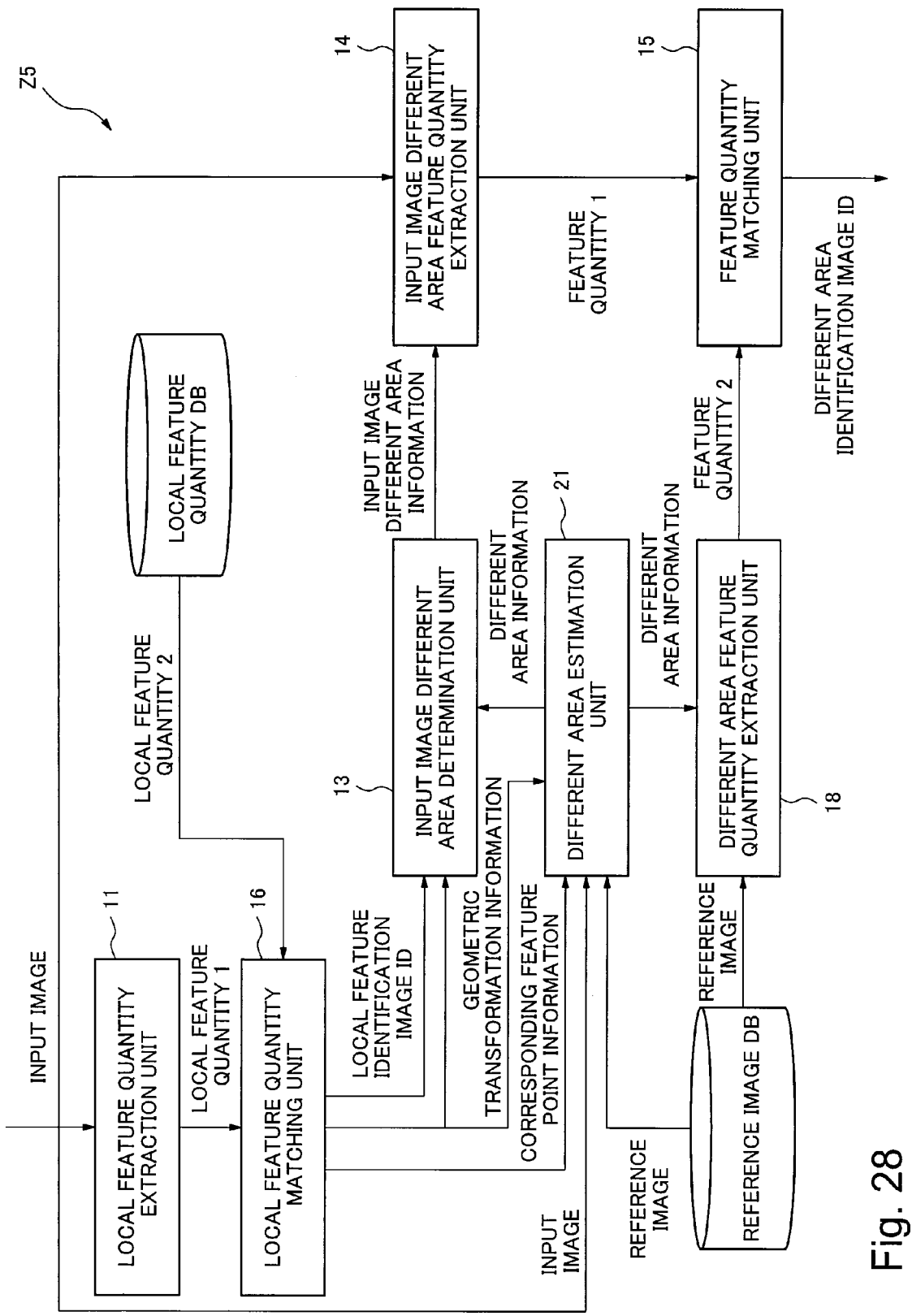
FIG. 28 is a block diagram illustrating an example of a configuration of an object identification device according to a fifth exemplary embodiment.

FIG. 28 is a block diagram illustrating a configuration of an object identification device according to the fifth exemplary embodiment of the present invention. As illustrated in FIG. 28, an object identification device Z5 according to the fifth exemplary embodiment includes the local feature quantity extraction unit 11, the local feature quantity matching unit 16, the input image different area determination unit 13, the input image different area feature quantity extraction unit 14, the feature quantity matching unit 15, a different area estimation unit 21, and the different area feature quantity extraction unit 18.

As described above, the object identification device Z5 according to the fifth exemplary embodiment has a configuration in which the object identification device Z3 according to the third exemplary embodiment and the object identification device Z4 according to the fourth exemplary embodiment are mixed. When the object identification device Z5 is compared with the object identification device Z3 according to the third exemplary embodiment, the object identification device Z5 is different in that the different area estimation unit 19 is replaced with the different area estimation unit 21. The details of the different area estimation unit 21 will be described later. The other constituent elements are the same as those of the third exemplary embodiment. These constituent elements are denoted with the same reference numerals, and detailed explanation thereabout is omitted.

FIG. 29, FIG. 30, FIG. 31, and FIG. 32 are block diagrams illustrating examples of configurations of the different area estimation unit 21. Each of the diagrams will be hereinafter described.

Figure 29:
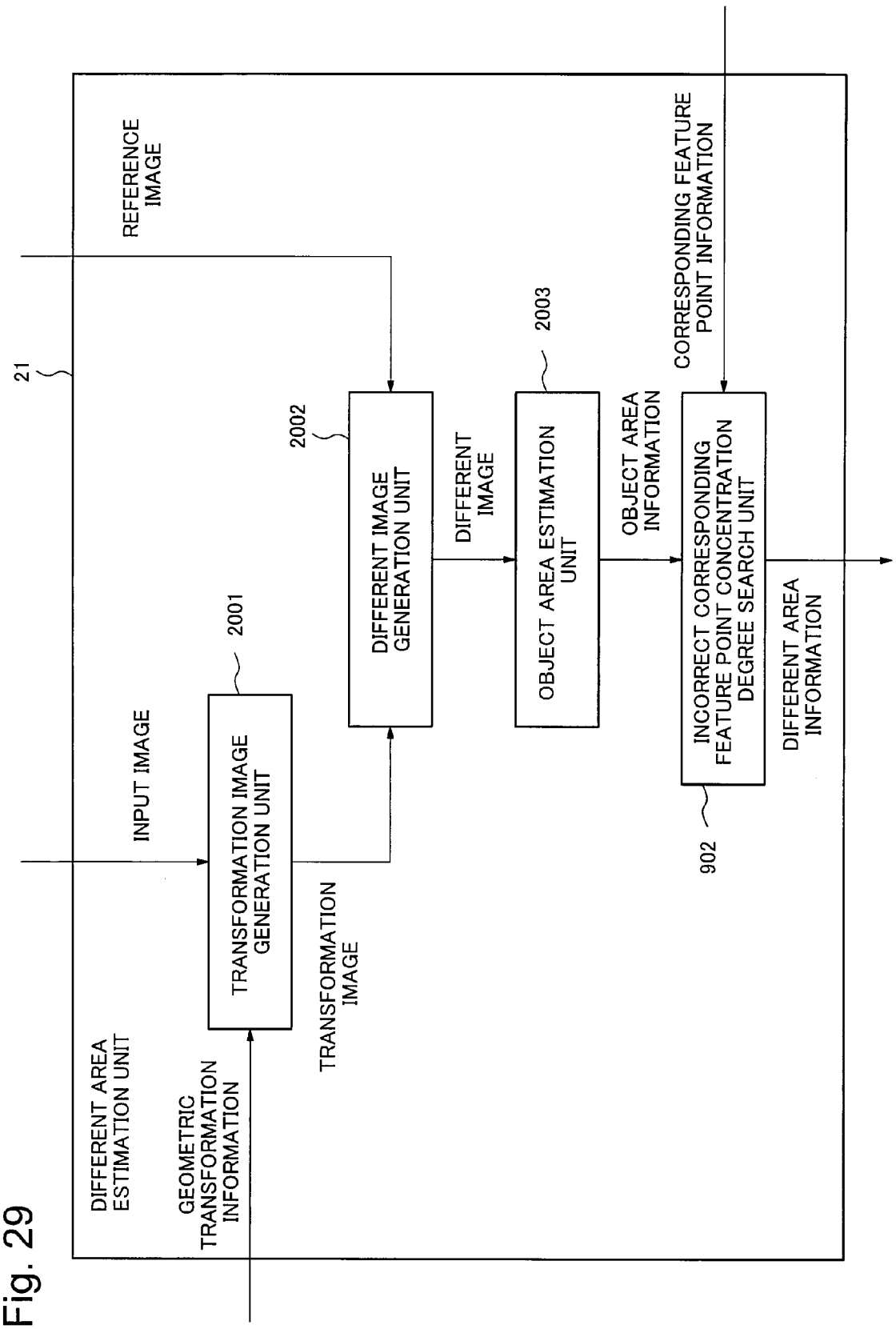
FIG. 29 is a block diagram illustrating an example of a configuration of a different area estimation unit 21.

As illustrated in FIG. 29, the different area estimation unit 21 is able to be constituted by the transformation image generation unit 2001, the different image generation unit 2002, the object area estimation unit 2003, and the incorrect corresponding feature point concentration degree search unit 902. The transformation image generation unit 2001, the different image generation unit 2002, and the object area estimation unit 2003 of FIG. 29 are the same as the transformation image generation unit 2001, the different image generation unit 2002, and the object area estimation unit 2003 which are constituent elements of the different area estimation unit 20 illustrated in FIG. 27, and detailed explanation thereabout is omitted. The incorrect corresponding feature point concentration degree search unit 902 of FIG. 29 is the same as the incorrect corresponding feature point concentration degree search unit 902 which is a constituent element of the different area estimation unit 19 illustrated in FIG. 25, and detailed explanation thereabout is omitted. More specifically, the different area estimation unit 21 estimates the different area by searching an area where incorrect corresponding feature points are concentrated from an object area estimated by using a difference between the reference image and the input image transformed, instead of searching an area where incorrect corresponding feature points are concentrated from an object area estimated by using only the reference image just like the different area estimation unit 19.

Figure 30:
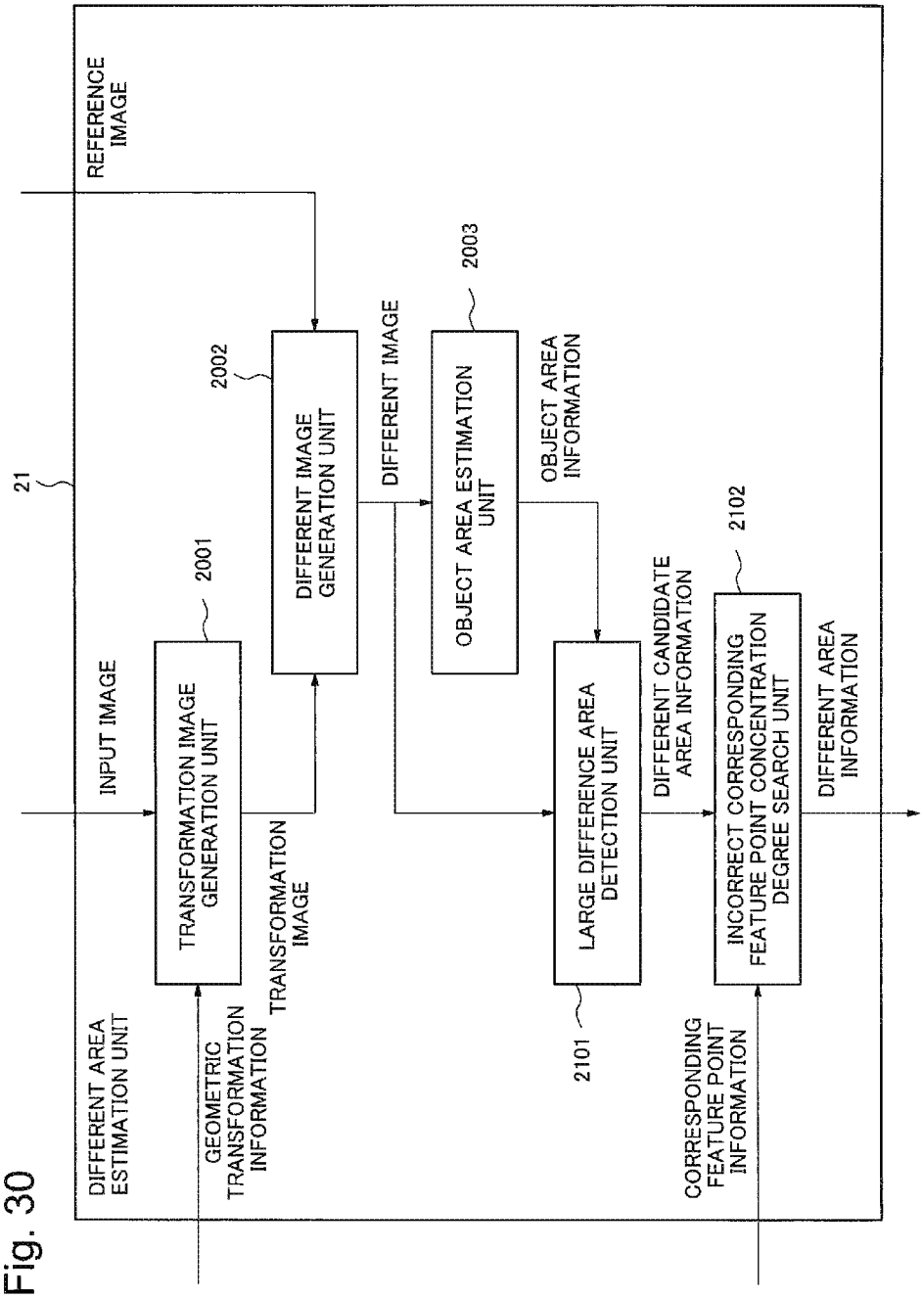
FIG. 30 is a block diagram illustrating an example of a configuration of a different area estimation unit 21.

As illustrated in FIG. 30, the different area estimation unit 21 is able to be constituted by the transformation image generation unit 2001, the different image generation unit 2002, the object area estimation unit 2003, a large difference area detection unit 2101, and an incorrect corresponding feature point concentration degree search unit 2102.

The transformation image generation unit 2001, the different image generation unit 2002, and the object area estimation unit 2003 of FIG. 30 are the same as the transformation image generation unit 2001, the different image generation unit 2002, and the object area estimation unit 2003 which are constituent elements of the different area estimation unit 20 illustrated in FIG. 27, and detailed explanation thereabout is omitted. The large difference area detection unit 2101 of FIG. 30 is substantially the same as the large difference area detection unit 2004 which is the constituent element of the different area estimation unit 20 illustrated in FIG. 27, but the large difference area detection unit 2101 of FIG. 30 is different in that the large difference area detection unit 2101 of FIG. 30 outputs different candidate area information instead of the different area information.

The different candidate area information which is output from the large difference area detection unit 2101 may be the same as the different area information which is output from the large difference area detection unit 2004, or may be area information which is grasped as an area slightly larger than the different area information. The incorrect corresponding feature point concentration degree search unit 2102 of FIG. 30 is similar to the incorrect corresponding feature point concentration degree search unit 902 which is the constituent element of the different area estimation unit 19 illustrated in FIG. 25, but is different in that the incorrect corresponding feature point concentration degree search unit 2102 of FIG. 30 receives the different candidate area information instead of the object area information.

The different area information which is output from the incorrect corresponding feature point concentration degree search unit 2102 is obtained by further narrowing down the different area, by the incorrect corresponding feature point concentration degree search unit 2102, from the different candidate areas estimated from the four combination including the transformation image generation unit 2001, the different image generation unit 2002, the object area estimation unit 2003, and the large difference area detection unit 2101. Therefore, highly reliable different area information is output.

Figure 31:
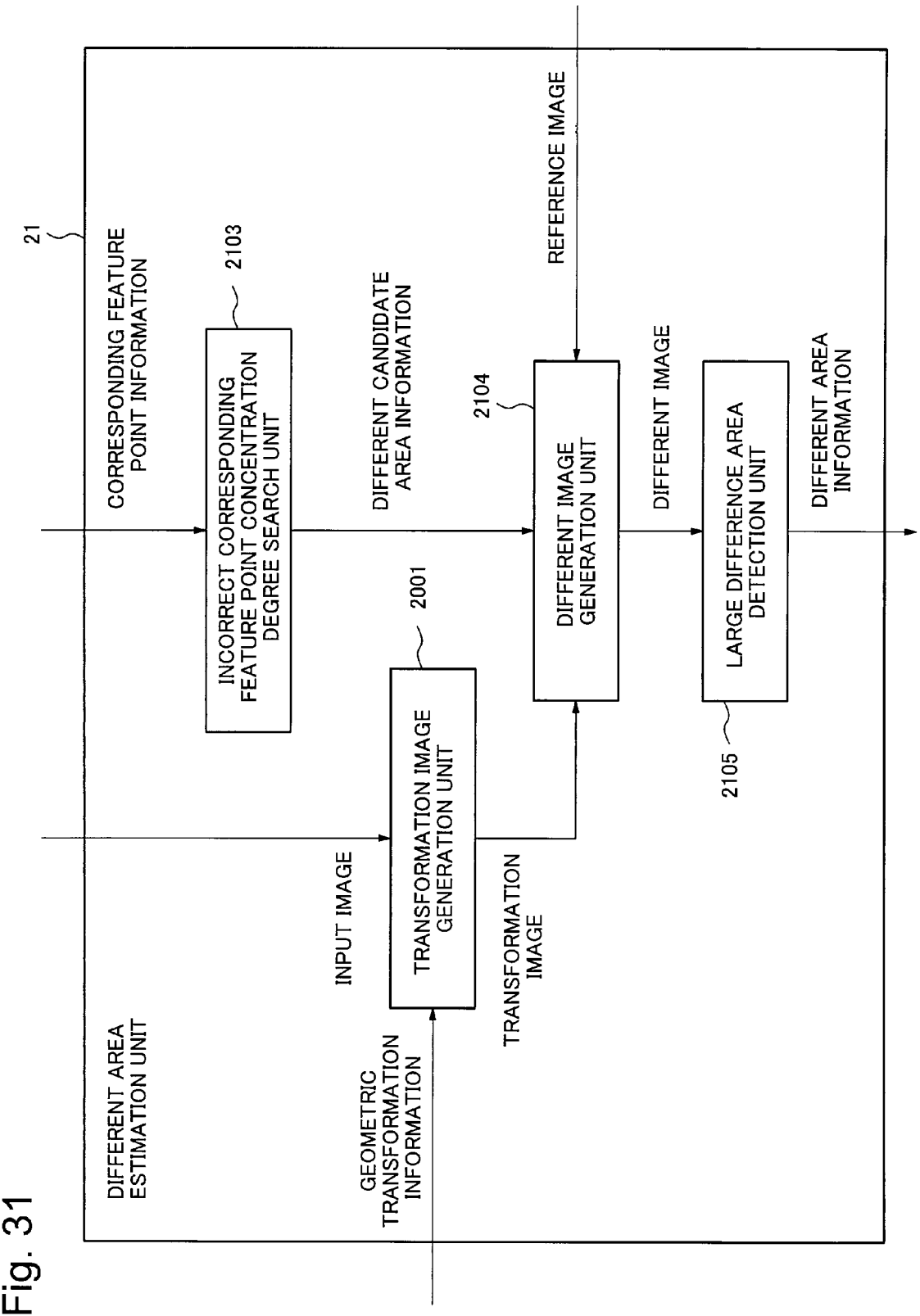
FIG. 31 is a block diagram illustrating an example of a configuration of a different area estimation unit 21.

As illustrated in FIG. 31, the different area estimation unit 21 is able to be constituted by the transformation image generation unit 2001, an incorrect corresponding feature point concentration degree search unit 2103, a different image generation unit 2104, and a large difference area detection unit 2105.

The transformation image generation unit 2001 of FIG. 31 is the same as the transformation image generation unit 2001 which is the constituent element of the different area estimation unit 20 illustrated in FIG. 27, and detailed explanation thereabout is omitted. The incorrect corresponding feature point concentration degree search unit 2103 of FIG. 31 is substantially the same as the incorrect corresponding feature point concentration degree search unit 701 which is a constituent element of the different area estimation unit 17 illustrated in FIG. 22, but the incorrect corresponding feature point concentration degree search unit 2103 of FIG. 31 is different in that the incorrect corresponding feature point concentration degree search unit 2103 of FIG. 31 outputs different candidate area information instead of the different area information. The different candidate area information which is output from the incorrect corresponding feature point concentration degree search unit 2103 may be the same as the different area information which is output from the incorrect corresponding feature point concentration degree search unit 701, but may be area information which is grasped as an area slightly larger than the different area information. The different image generation unit 2104 of FIG. 31 is similar to the different image generation unit 2002 which is a constituent element of the different area estimation unit 20 illustrated in FIG. 27, but the different image generation unit 2104 of FIG. 31 is different in that the different image generation unit 2104 of FIG. 31 receives not only the reference image and the transformation image but also the different candidate area information. The different image generation unit 2104 outputs, as the different image, an image of an area indicated by the different candidate area information from the different image generated by calculating the difference between the reference image and the transformation image. The large difference area detection unit 2105 of FIG. 31 is similar to the large difference area detection unit 2004 which is a constituent element of the different area estimation unit 20 illustrated in FIG. 27, but the large difference area detection unit 2105 of FIG. 31 is different in that the large difference area detection unit 2105 of FIG. 31 receives the different image only. The different image which is input into the large difference area detection unit 2105 is the different image which is output with regard to only the area already estimated as the different candidate area by the incorrect corresponding feature point concentration degree search unit 2103, and therefore, at this stage, it is already an image of the entire object area or an area indicating a part of the object area. The different area information which is output from the large difference area detection unit 2105 is obtained by further narrowing down the different area, by the large difference area detection unit 2105, from the different candidate areas estimated by the incorrect corresponding feature point concentration degree search unit 2103. Therefore, highly reliable different area information is output.

Figure 32:
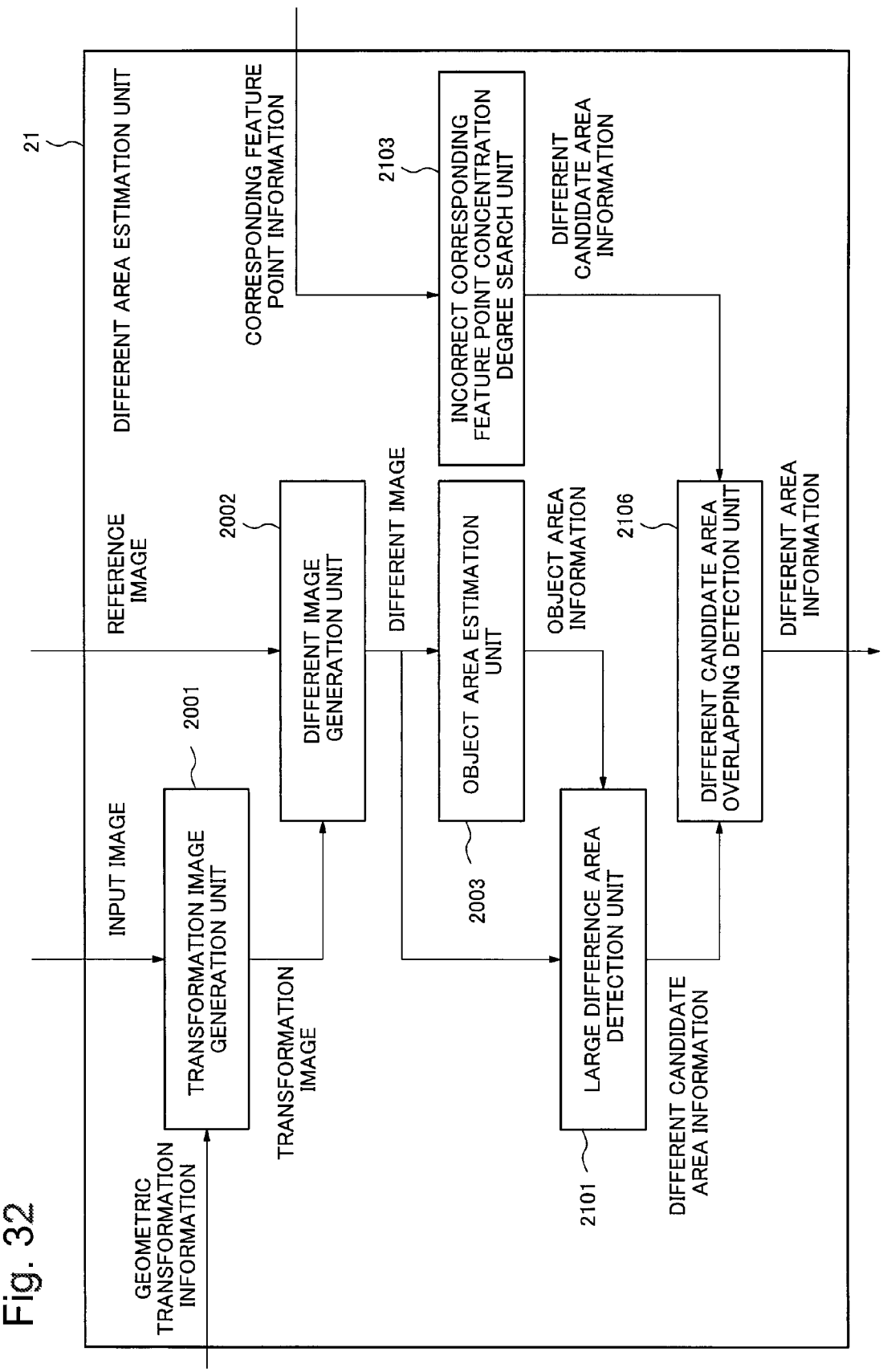
FIG. 32 is a block diagram illustrating an example of a configuration of a different area estimation unit 21.

As illustrated in FIG. 32, the different area estimation unit 21 is able to be constituted by the transformation image generation unit 2001, the different image generation unit 2002, the object area estimation unit 2003, the large difference area detection unit 2101, the incorrect corresponding feature point concentration degree search unit 2103, and a different candidate area overlapping detection unit 2106. The transformation image generation unit 2001, the different image generation unit 2002, and the object area estimation unit 2003 of FIG. 32 are the same as the transformation image generation unit 2001, the different image generation unit 2002, and the object area estimation unit 2003 of the different area estimation unit 20 illustrated in FIG. 27, and detailed explanation thereabout is omitted. The large difference area detection unit 2101 of FIG. 32 is the same as the large difference area detection unit 2101 of FIG. 30, and detailed explanation thereabout is omitted. The incorrect corresponding feature point concentration degree search unit 2103 of FIG. 32 is the same as the incorrect corresponding feature point concentration degree search unit 2103 of FIG. 31, and detailed explanation thereabout is omitted. The different candidate area overlapping detection unit 2106 of FIG. 32 receives the different candidate area information which is output from the large difference area detection unit 2101 and the different candidate area information which is output from the incorrect corresponding feature point concentration degree search unit 2103, and determines that an area where the two different candidate areas are overlapping each other is the different area, and outputs the different area information. The different candidate area overlapping detection unit 2106 outputs information about an area determined to be the different candidate area by both of the large difference area detection unit 2101 and the incorrect corresponding feature point concentration degree search unit 2103, so that the different candidate area overlapping detection unit 2106 outputs highly reliable different area information.

As described above, in the fifth exemplary embodiment of the present invention, the different area estimation unit 21 uses the input image, the reference image, the geometric transformation information, and the corresponding feature point information to estimate the different area in the reference image. Like the second, third, and fourth exemplary embodiments, the object identification device Z5 according to the fifth exemplary embodiment of the present invention is able to estimate the different area in the reference image even when the different area in the reference image is not registered to the database in advance. Therefore, the object identification device Z5 is effective when information about the different area is not able to be registered in advance, e.g., when only a product having a scratch somewhere is distinguished from many products by an inspection system using object identification. In addition, in the fifth exemplary embodiment of the present invention, the estimation of the different area in the reference image performed according to the fifth exemplary embodiment is possible even when the different area is the entire object and when the different area is a part of the object, and as compared with the second exemplary embodiment and the like, a more highly reliable different area is able to be obtained, and therefore, highly accurate identification is able to be realized. In the fifth exemplary embodiment of the present invention, when the different area estimation unit 21 has the configuration illustrated in FIG. 31 or FIG. 32, an object area estimation unit may be added before the incorrect corresponding feature point concentration degree search unit 2103. In this case, the different candidate area is estimated by performing incorrect corresponding feature point concentration degree search from the estimated object area. At this occasion, like the third and fourth exemplary embodiments, the different area is able to be estimated again after eliminating influence of the background, and therefore, the object identification device Z5 according to the fifth exemplary embodiment is particularly effective in the cases of FIG. 18 and FIG. 19.

Sixth Exemplary Embodiment

The sixth exemplary embodiment of the present invention will be described with reference to drawings.

Figure 33:
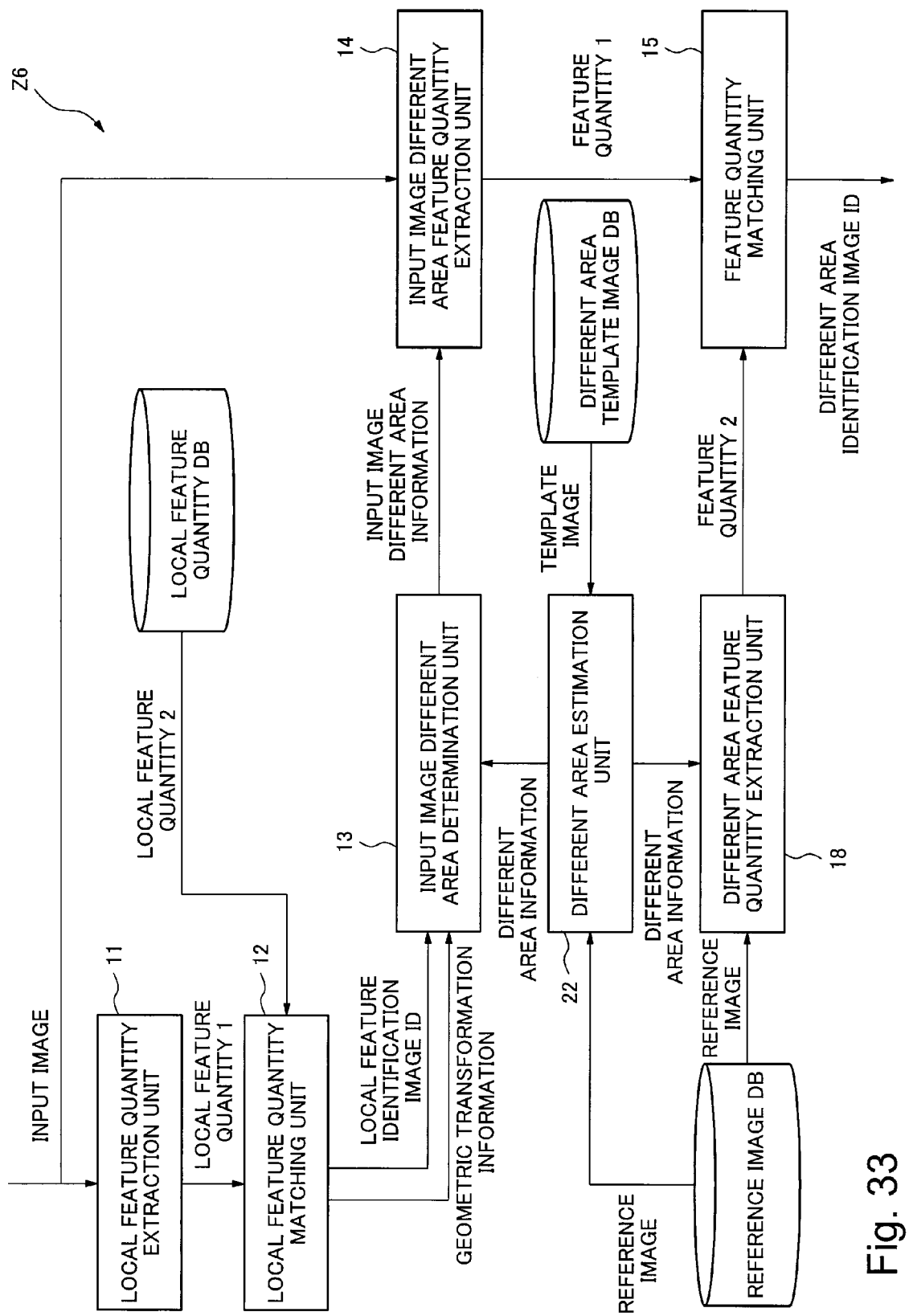
FIG. 33 is a block diagram illustrating an example of a configuration of an object identification device according to a sixth exemplary embodiment.

FIG. 33 is a block diagram illustrating a configuration of an object identification device according to the sixth exemplary embodiment of the present invention. As illustrated in FIG. 33, an object identification device Z6 according to the sixth exemplary embodiment includes the local feature quantity extraction unit 11, the local feature quantity matching unit 12, the input image different area determination unit 13, the input image different area feature quantity extraction unit 14, the feature quantity matching unit 15, a different area estimation unit 22, and the different area feature quantity extraction unit 18. As described above, the object identification device according to the sixth exemplary embodiment is different in that the different area estimation unit 20 of the object identification device Z4 according to the fourth exemplary embodiment is replaced with the different area estimation unit 22. The details of the different area estimation unit 22 will be described later. The other constituent elements are the same as those of the fourth exemplary embodiment. These constituent elements are denoted with the same reference numerals, and detailed explanation thereabout is omitted.

Figure 34:
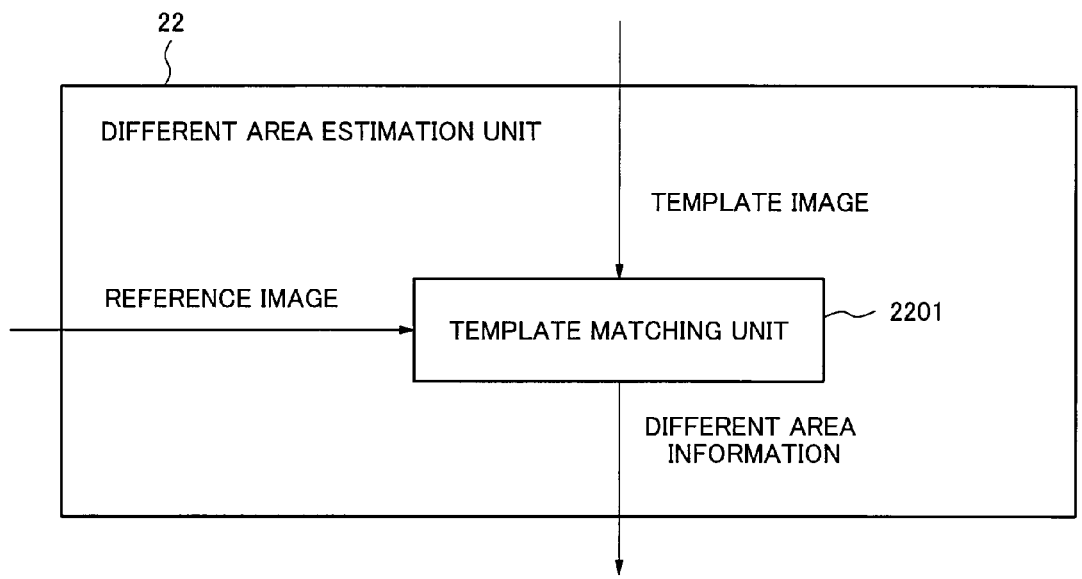
FIG. 34 is a block diagram illustrating an example of a configuration of a different area estimation unit 22.
Figure 35:
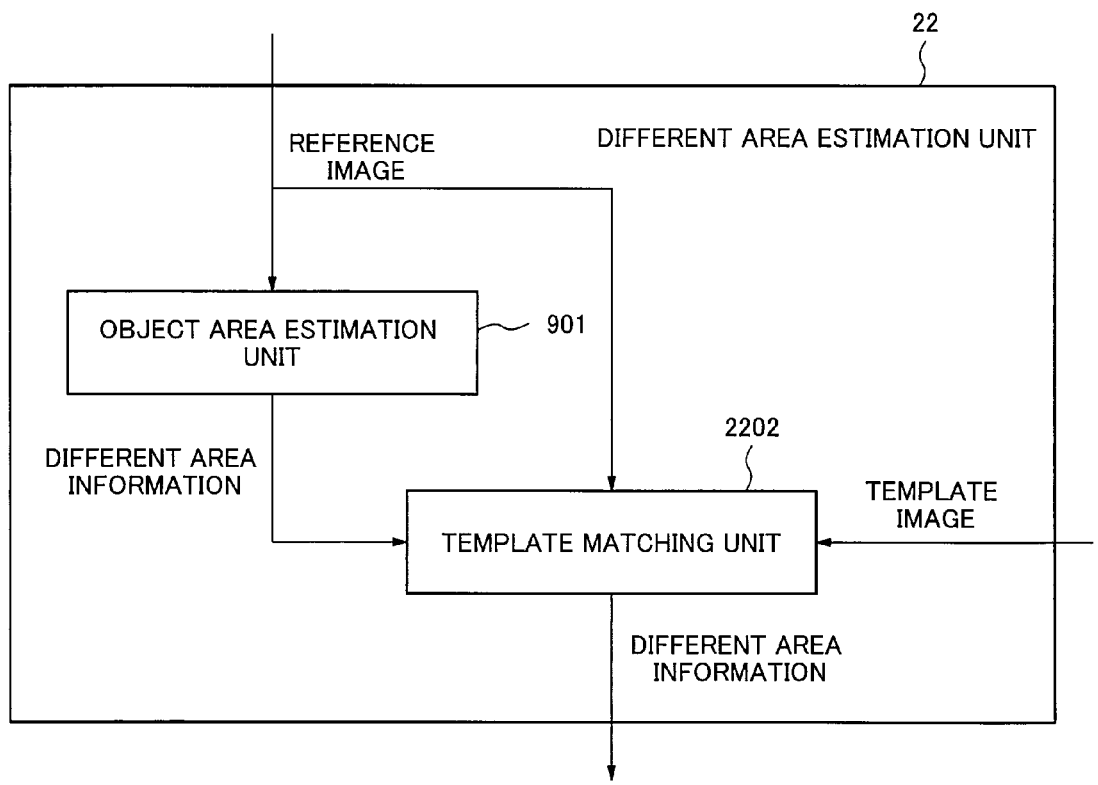
FIG. 35 is a block diagram illustrating an example of a configuration of a different area estimation unit 22.

FIG. 34 and FIG. 35 are block diagrams illustrating examples of configurations of the different area estimation unit 22. Each of the diagrams will be hereinafter described.

As illustrated in FIG. 34, the different area estimation unit 22 is able to be constituted by a template matching unit 2201. The template matching unit 2201 receives the reference image corresponding to the local feature identification image ID which is output from the local feature quantity matching unit 12, or the reference image group related to the local feature identification image ID. Further, the template matching unit 2201 also receives a template image of the different area of the reference image corresponding to the local feature identification image ID which is output from the local feature quantity matching unit 12, or a template image group related to the local feature identification image ID, and outputs the different area information. This template image is an image pattern that can be typically seen around the different area. The different area in the reference image is able to be estimated by performing template matching processing of searching an area that is most similar to the template image while moving the template image in the reference image. The template image may be stored to a database in advance as illustrated in FIG. 33, or may not be stored.

As illustrated in FIG. 35, the different area estimation unit 22 is able to be constituted also by the object area estimation unit 901 and a template matching unit 2202. The object area estimation unit 901 of FIG. 35 is the same as the object area estimation unit 901 which is a constituent element of the different area estimation unit 19 illustrated in FIG. 25, and detailed explanation thereabout is omitted. The template matching unit 2202 is similar to the template matching unit 2201 which is a constituent element of the different area estimation unit 22 illustrated in FIG. 34, but the template matching unit 2202 is different in that the template matching unit 2202 receives not only the reference image corresponding to the local feature identification image ID which is output from the local feature quantity matching unit 12 and the template image of the reference image corresponding to the local feature identification image ID which is output from the local feature quantity matching unit 12 but also the object area information which is output from the object area estimation unit 901. The template matching unit 2202 is able to estimate the different area in the reference image by performing template matching using a template image only in the object area in the reference image. Since the range in which the template matching unit 2202 moves the template image in the reference image is limited, the template matching unit 2202 is able to perform high-speed processing comparing with the template matching unit 2201 where the range in which the template image is moved is the entire reference image.

As described above, in the sixth exemplary embodiment of the present invention, the different area estimation unit 22 estimates the different area in the reference image by using the reference image and the template image indicating the image pattern which is seen around the different area. Like the second to fifth exemplary embodiments, the object identification device Z6 according to the sixth exemplary embodiment of the present invention does not require the different area in the reference image to be registered to a database in advance. When the image pattern typically seen in the different area is given in advance, the object identification device Z6 is able to estimate the different area by using the image pattern as the template image. For example, when only a particular mail is to be identified from among a plurality of mail images in which envelopes are the same but only the recipient names are different, the area in which the recipient name is described is able to be defined as an image pattern in which layout of character strings such as a zip code, an address, and a recipient name is somewhat fixed. For this reason, the object identification device Z6 is effective in such case. The estimation of the different area in the reference image performed according to the sixth exemplary embodiment of the present invention is possible even when the different area is the entire object and when the different area is a part of the object, and like the third to fifth exemplary embodiments, after the object area is first estimated so that influence of the background is eliminated, the different area is able to be estimated again in the case where the configuration of the different area estimation unit 22 is FIG. 35. Therefore, the object identification device Z6 is able to estimate the different area with a high degree of accuracy, and therefore, the object identification device Z6 is particularly effective in the cases of FIG. 18 and FIG. 19.

Seventh Exemplary Embodiment

The seventh exemplary embodiment of the present invention will be described with reference to drawings.

Figure 36:
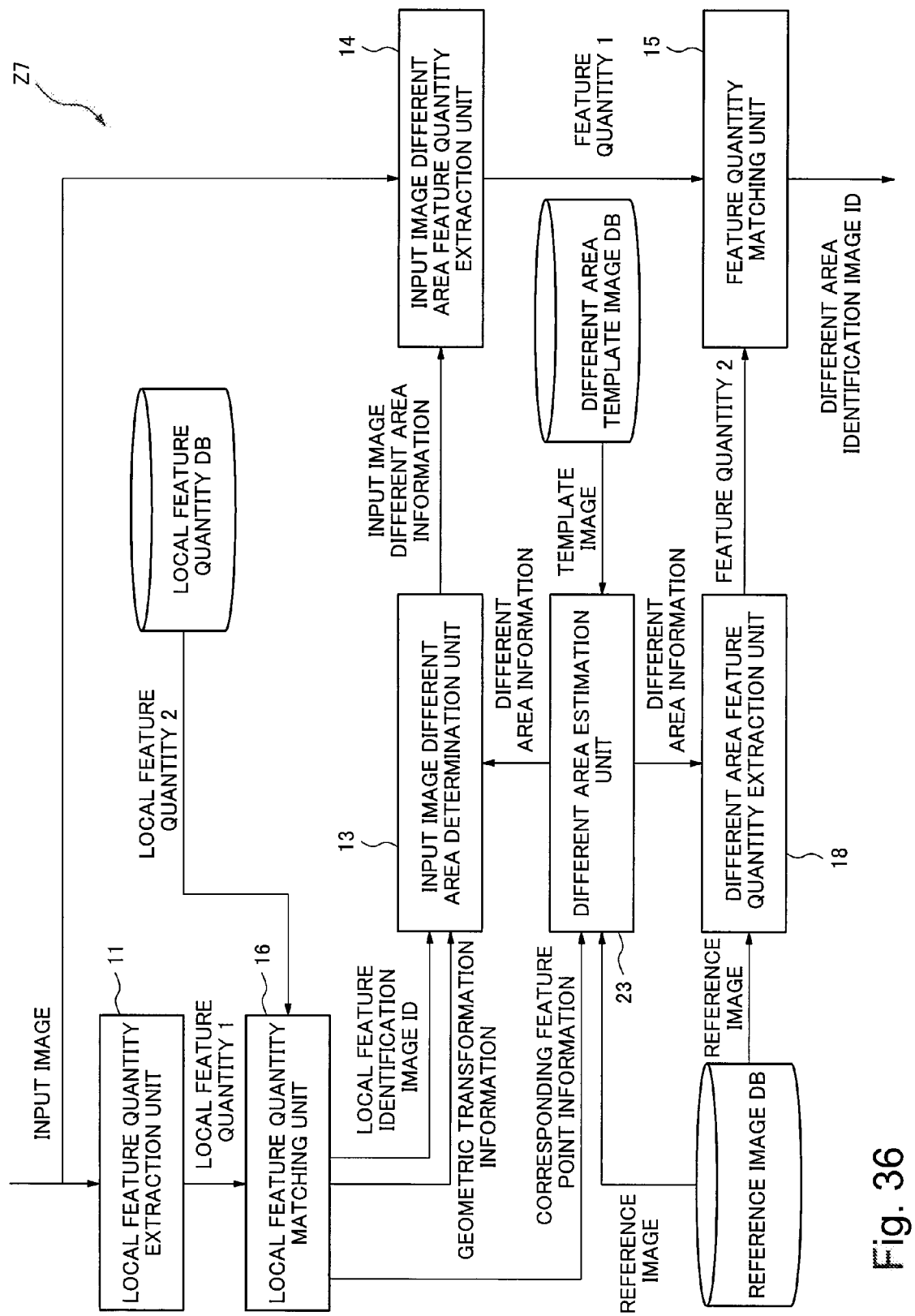
FIG. 36 is a block diagram illustrating an example of a configuration of an object identification device according to a seventh exemplary embodiment.

FIG. 36 is a block diagram illustrating a configuration of an object identification device according to the seventh exemplary embodiment of the present invention. As illustrated in FIG. 36, an object identification device Z7 according to the seventh exemplary embodiment includes the local feature quantity extraction unit 11, the local feature quantity matching unit 16, the input image different area determination unit 13, the input image different area feature quantity extraction unit 14, the feature quantity matching unit 15, a different area estimation unit 23, and the different area feature quantity extraction unit 18. As described above, the object identification device Z7 according to the seventh exemplary embodiment has a configuration in which the object identification device Z2 according to the second exemplary embodiment and the object identification device Z6 according to the sixth exemplary embodiment is mixed. When the object identification device Z7 is compared with the object identification device Z2 according to the second exemplary embodiment, the object identification device Z7 is different in that the different area estimation unit 17 is replaced with the different area estimation unit 23. The details of the different area estimation unit 23 will be described later. The other constituent elements are the same as those of the second exemplary embodiment. These constituent elements are denoted with the same reference numerals, and detailed explanation thereabout is omitted.

Figure 37:
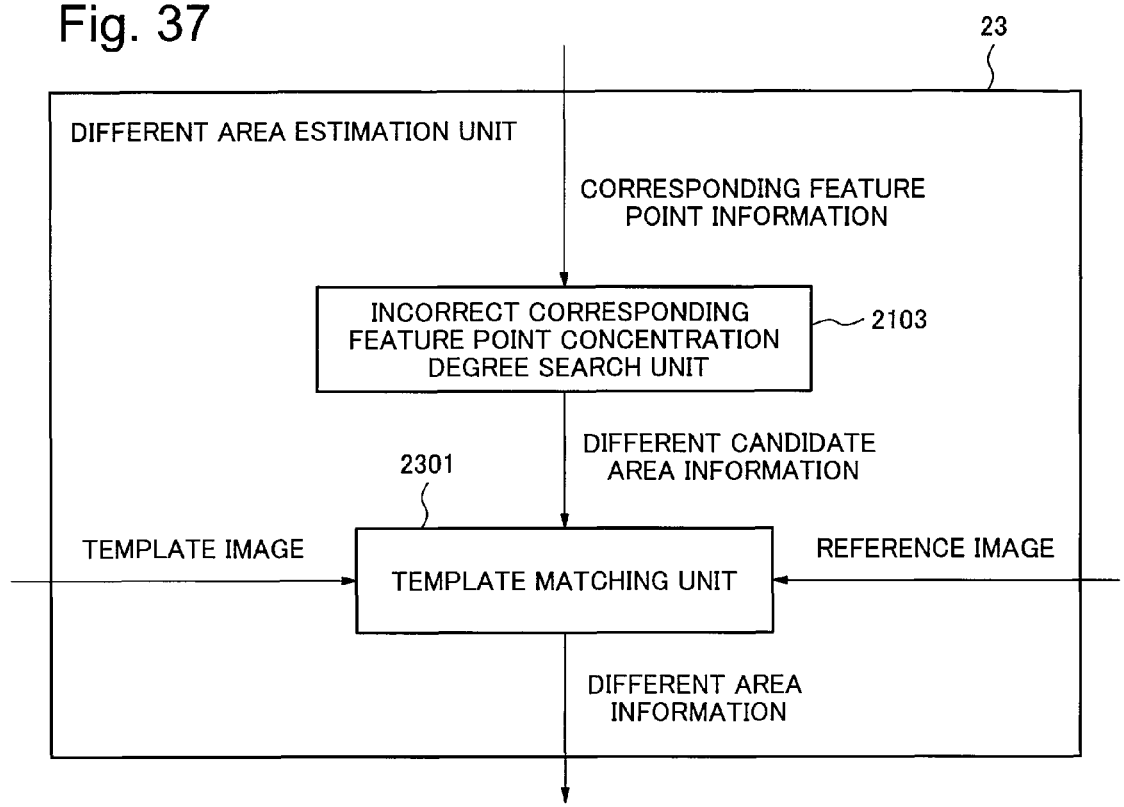
FIG. 37 is a block diagram illustrating an example of a configuration of a different area estimation unit 23.
Figure 38:
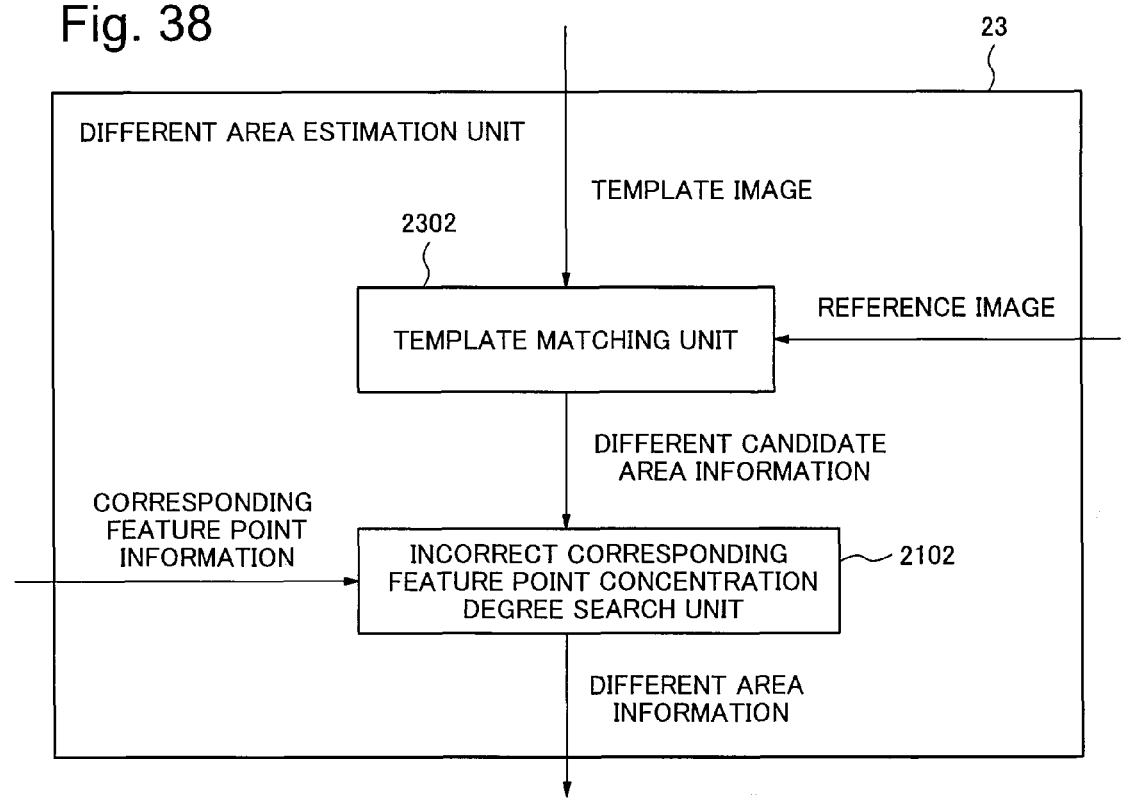
FIG. 38 is a block diagram illustrating an example of a configuration of a different area estimation unit 23.
Figure 39:
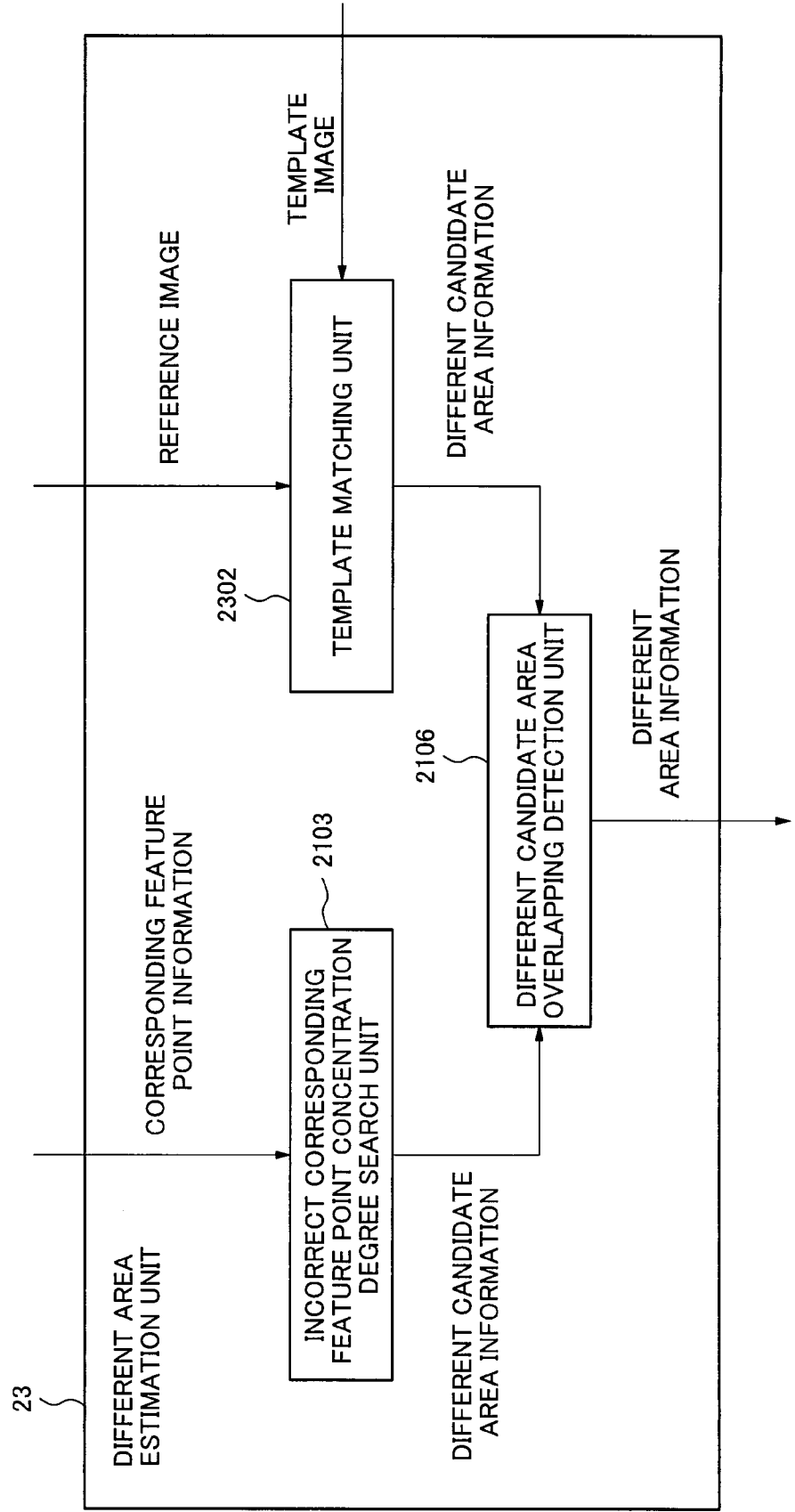
FIG. 39 is a block diagram illustrating an example of a configuration of a different area estimation unit 23.

FIG. 37, FIG. 38, and FIG. 39 are block diagrams illustrating examples of configurations of the different area estimation unit 23. Each of the diagrams will be hereinafter described.

As illustrated in FIG. 37, the different area estimation unit 23 is able to be constituted by the incorrect corresponding feature point concentration degree search unit 2103 and a template matching unit 2301. The incorrect corresponding feature point concentration degree search unit 2103 of FIG. 37 is the same as the incorrect corresponding feature point concentration degree search unit 2103 which is a constituent element of the different area estimation unit 21 illustrated in FIG. 31, and detailed explanation thereabout is omitted. The template matching unit 2301 of FIG. 37 is similar to the template matching unit 2202 which is a constituent element of the different area estimation unit 22 illustrated in FIG. 35, but the template matching unit 2301 of FIG. 37 is different in that the template matching unit 2301 of FIG. 37 receives different candidate area information instead of the object area information. More specifically, the template matching unit 2301 of FIG. 37 estimates the different area in the reference image by performing template matching using a template image with regard to only the different candidate area, in the reference image, estimated by the incorrect corresponding feature point concentration degree search unit 2103. The template matching unit 2301 further narrows down the different area, by using the template matching, from the different candidate area estimated by the incorrect corresponding feature point concentration degree search unit 2103, so that the template matching unit 2301 outputs highly reliable different area information.

As illustrated in FIG. 38, the different area estimation unit 23 is able to be constituted also by a template matching unit 2302 and the incorrect corresponding feature point concentration degree search unit 2102. The template matching unit 2302 of FIG. 38 is substantially the same as the template matching unit 2201 which is a constituent element of the different area estimation unit 22 illustrated in FIG. 34, but the template matching unit 2302 of FIG. 38 is different in that the template matching unit 2302 of FIG. 38 outputs different candidate area information instead of the different area information. The different candidate area information which is output from the template matching unit 2302 may be the same as the different area information which is output from the template matching unit 2201, or may be area information which is grasped as an area slightly larger than the different area information. The incorrect corresponding feature point concentration degree search unit 2102 of FIG. 38 is the same as the incorrect corresponding feature point concentration degree search unit 2102 which is a constituent element of the different area estimation unit 21 illustrated in FIG. 30, and detailed explanation thereabout is omitted. More specifically, the incorrect corresponding feature point concentration degree search unit 2102 of FIG. 38 focuses on only points existing inside of the different candidate area, in the reference image, estimated by the template matching unit 2302 from among the corresponding feature points, and searches an area where incorrectly corresponding feature points are concentrated, and estimates the different area. The incorrect corresponding feature point concentration degree search unit 2102 further narrow down the different area from the different candidate area estimated by the template matching unit 2302, so that the incorrect corresponding feature point concentration degree search unit 2102 outputs highly reliable different area information.

As illustrated in FIG. 39, the different area estimation unit 23 is able to be constituted also by the incorrect corresponding feature point concentration degree search unit 2103, the template matching unit 2302, and the different candidate area overlapping detection unit 2106. The incorrect corresponding feature point concentration degree search unit 2103 of FIG. 39 is the same as the incorrect corresponding feature point concentration degree search unit 2103 which is a constituent element of the different area estimation unit 21 illustrated in FIG. 31, and detailed explanation thereabout is omitted. The template matching unit 2302 of FIG. 39 is the same as the template matching unit 2302 which is a constituent element of the different area estimation unit 23 illustrated in FIG. 38, and detailed explanation thereabout is omitted. The different candidate area overlapping detection unit 2106 is the same as the different candidate area overlapping detection unit 2106 which is a constituent element of the different area estimation unit 21 illustrated in FIG. 32, and detailed explanation thereabout is omitted. In the configuration of FIG. 39, the different candidate area overlapping detection unit 2106 outputs information about the area determined to be the different candidate area by both of the incorrect corresponding feature point concentration degree search unit 2103 and the template matching unit 2302, so that the different candidate area overlapping detection unit 2106 outputs highly reliable different area information.

As described above, in the seventh exemplary embodiment of the present invention, the different area estimation unit 23 uses the reference image, the template image, and the corresponding feature point information to estimate the different area in the reference image. Like the second to sixth exemplary embodiments, the object identification device Z7 according to the seventh exemplary embodiment of the present invention does not require the different area in the reference image to be registered to a database in advance. Like the sixth exemplary embodiment, when the image pattern typically seen in the different area is given in advance, the object identification device Z7 is able to estimate the different area by using the image pattern as the template image. For example, when only a particular mail is to be identified from among a plurality of mail images in which envelopes are the same but only the recipient names are different, the area in which the recipient name is described is able to be defined as an image pattern in which layout of character strings such as a zip code, an address, and a recipient name is somewhat fixed. For this reason, the object identification device Z7 is effective in such case. The estimation of the different area in the reference image performed according to the seventh exemplary embodiment of the present invention is possible even when the different area is the entire object and when the different area is a part of the object, and like the fifth exemplary embodiment, a more highly reliable different area is able to be obtained compared with the second exemplary embodiment and the like, and therefore, highly accurate identification can be realized. It should be noted that the seventh exemplary embodiment of the present invention described hereinabove is the case of the configuration in which the object identification device Z2 according to the second exemplary embodiment and the object identification device Z6 according to the sixth exemplary embodiment are mixed. In this case, the configuration of FIG. 36 may also be grasped as the configuration in which the object identification device Z3 according to the third exemplary embodiment and the object identification device Z6 according to the sixth exemplary embodiment are mixed. More specifically, when the different area estimation unit 23 has the configuration illustrated in FIG. 37, FIG. 38, or FIG. 39, an object area estimation unit may be added before the incorrect corresponding feature point concentration degree search unit 2103 and the template matching unit 2302. In this configuration, the different area is estimated from the object area after eliminating influence of the background, and therefore, this configuration is particularly effective in the cases of FIG. 18 and FIG. 19.

Eighth Exemplary Embodiment

The eighth exemplary embodiment of the present invention will be described with reference to drawings.

Figure 40:
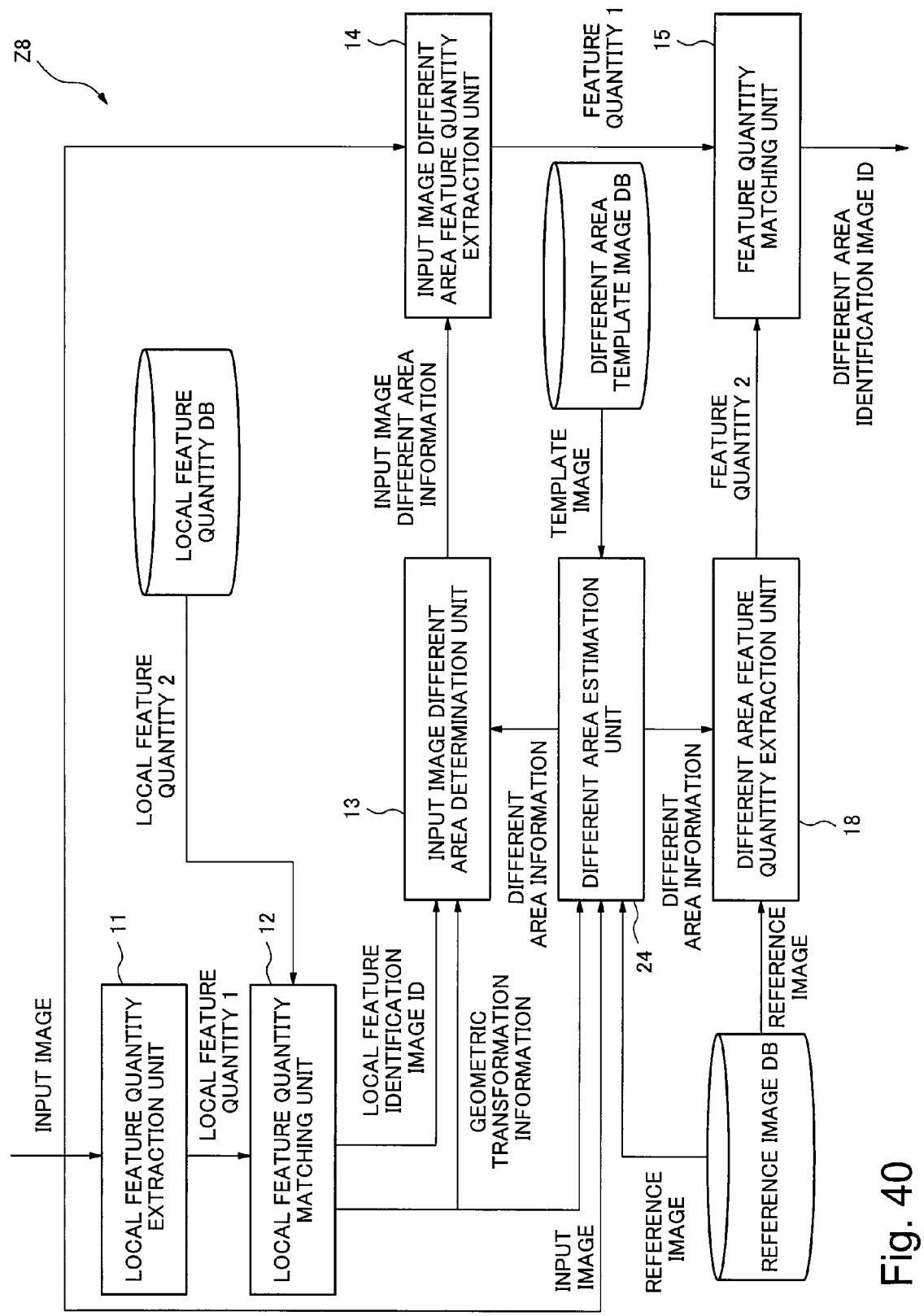
FIG. 40 is a block diagram illustrating an example of a configuration of an object identification device according to an eighth exemplary embodiment.

FIG. 40 is a block diagram illustrating a configuration of an object identification device according to the eighth exemplary embodiment of the present invention. As illustrated in FIG. 40, an object identification device Z8 according to the eighth exemplary embodiment includes the local feature quantity extraction unit 11, a local feature quantity matching unit 12, the input image different area determination unit 13, the input image different area feature quantity extraction unit 14, the feature quantity matching unit 15, a different area estimation unit 24, and the different area feature quantity extraction unit 18. As described above, the object identification device Z8 according to the eighth exemplary embodiment has a configuration in which the object identification device according to the fourth exemplary embodiment and the object identification device according to the sixth exemplary embodiment are mixed. When the object identification device Z8 is compared with the object identification device Z4 according to the fourth exemplary embodiment, the object identification device Z8 is different in that the different area estimation unit 20 is replaced with the different area estimation unit 24. The details of the different area estimation unit 24 will be described later. The other constituent elements are the same as those of the second exemplary embodiment. These constituent elements are denoted with the same reference numerals, and detailed explanation thereabout is omitted.

Figure 41:
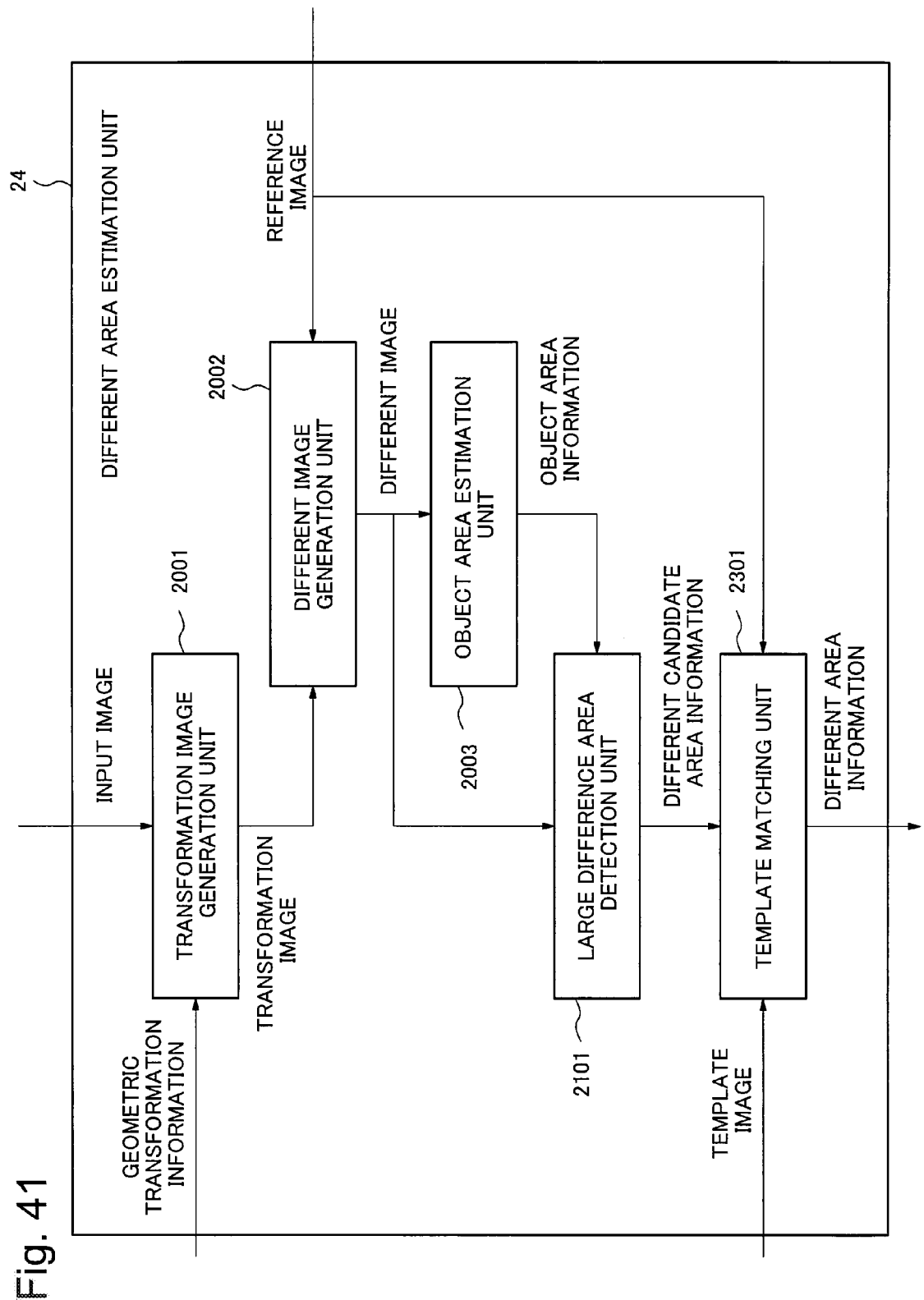
FIG. 41 is a block diagram illustrating an example of a configuration of a different area estimation unit 24.
Figure 42:
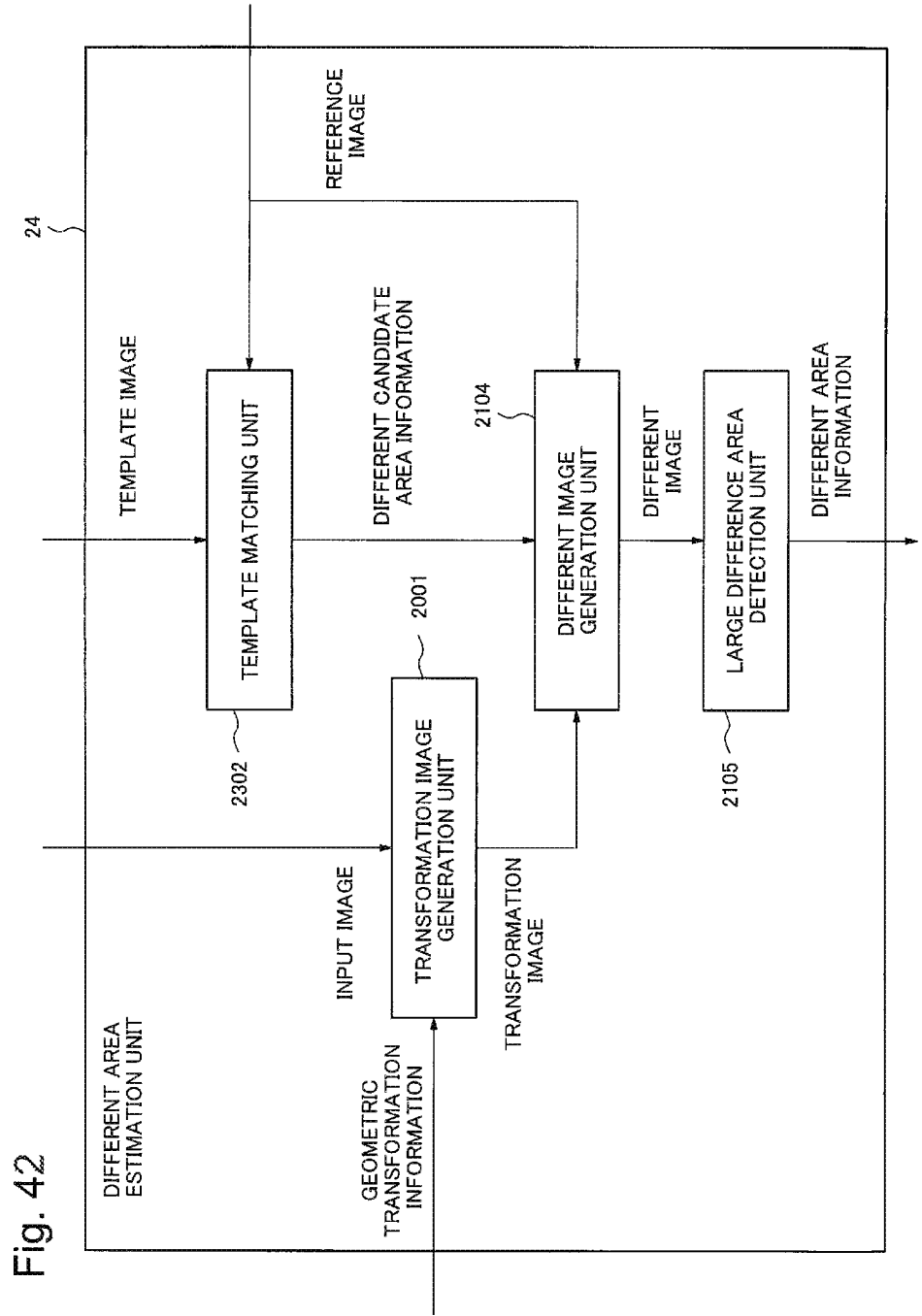
FIG. 42 is a block diagram illustrating an example of a configuration of a different area estimation unit 24.
Figure 43:
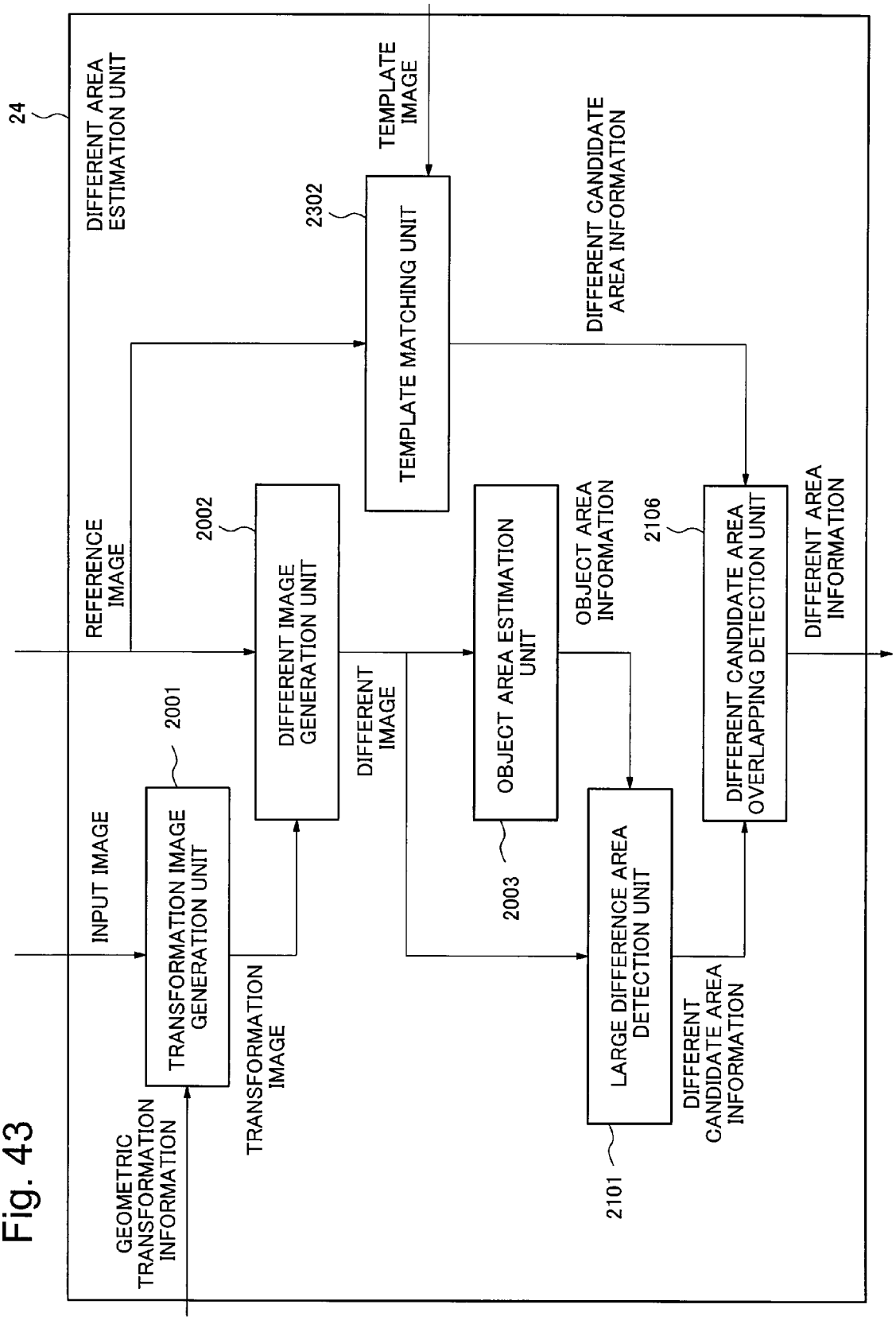
FIG. 43 is a block diagram illustrating an example of a configuration of a different area estimation unit 24.

FIG. 41, FIG. 42, and FIG. 43 are block diagrams illustrating examples of configurations of the different area estimation unit 24. Each of the diagrams will be hereinafter described.

As illustrated in FIG. 41, the different area estimation unit 24 is able to be constituted by the transformation image generation unit 2001, the different image generation unit 2002, the object area estimation unit 2003, the large difference area detection unit 2101, and the template matching unit 2301. The transformation image generation unit 2001, the different image generation unit 2002, and the object area estimation unit 2003 of FIG. 41 are the same as the transformation image generation unit 2001, the different image generation unit 2002, and the object area estimation unit 2003 which are constituent elements of the different area estimation unit 20 illustrated in FIG. 27, and detailed explanation thereabout is omitted. The large difference area detection unit 2101 of FIG. 41 is the same as the large difference area detection unit 2101 which is a constituent element of the different area estimation unit 21 illustrated in FIG. 30, and detailed explanation thereabout is omitted. The template matching unit 2301 of FIG. 41 is the same as template matching unit 2301 which is a constituent element of the different area estimation unit 23 illustrated in FIG. 37, and detailed explanation thereabout is omitted. More specifically, the template matching unit 2301 of FIG. 41 estimates the different area in the reference image by performing template matching using a template image with regard to only the different candidate area, in the reference image, estimated by the large difference area detection unit 2101. The template matching unit 2301 further narrows down the different area from the different candidate area estimated by the large difference area detection unit 2101, so that the template matching unit 2301 outputs highly reliable different area information.

As illustrated in FIG. 42, the different area estimation unit 24 is able to be constituted also by the transformation image generation unit 2001, the template matching unit 2302, the different image generation unit 2104, and the large difference area detection unit 2105. The transformation image generation unit 2001 of FIG. 42 is the same as the transformation image generation unit 2001 which is a constituent element of the different area estimation unit 20 illustrated in FIG. 27, and detailed explanation thereabout is omitted. The template matching unit 2302 of FIG. 42 is the same as the template matching unit 2302 which is a constituent element of the different area estimation unit 23 illustrated in FIG. 38, and detailed explanation thereabout is omitted. The different image generation unit 2104 and the large difference area detection unit 2105 of FIG. 42 are the same as the different image generation unit 2104 and the large difference area detection unit 2105, respectively, which are constituent elements of the different area estimation unit 21 illustrated in FIG. 31, and detailed explanation thereabout is omitted. The large difference area detection unit 2105 further narrows down the different area from the different candidate area estimated by the template matching unit 2302, so that the large difference area detection unit 2105 outputs highly reliable different area information.

As illustrated in FIG. 43, the different area estimation unit 24 is able to be constituted also by the transformation image generation unit 2001, the different image generation unit 2002, the object area estimation unit 2003, the large difference area detection unit 2101, the template matching unit 2302, and the different candidate area overlapping detection unit 2106. The transformation image generation unit 2001, the different image generation unit 2002, and the object area estimation unit 2003 of FIG. 43 are the same as the transformation image generation unit 2001, the different image generation unit 2002, and the object area estimation unit 2003 which are constituent elements of the different area estimation unit 20 illustrated in FIG. 27, and detailed explanation thereabout is omitted. The large difference area detection unit 2101 of FIG. 43 is the same as the large difference area detection unit 2101 which is a constituent element of the different area estimation unit 21 illustrated in FIG. 30, detailed explanation thereabout is omitted. The template matching unit 2302 of FIG. 43 is the same as the template matching unit 2302 which is a constituent element of the different area estimation unit 23 illustrated in FIG. 38, and detailed explanation thereabout is omitted. The different candidate area overlapping detection unit 2106 of FIG. 43 is the same as the different candidate area overlapping detection unit 2106 which is a constituent element of the different area estimation unit 21 illustrated in FIG. 32, and detailed explanation thereabout is omitted. In the configuration of FIG. 43, the different candidate area overlapping detection unit 2106 outputs information about the area determined to be the different candidate area by both of the large difference area detection unit 2101 and the template matching unit 2302, so that the different candidate area overlapping detection unit 2106 outputs highly reliable different area information.

As described above, in the eighth exemplary embodiment of the present invention, the object identification device Z8 uses the input image, the reference image, the geometric transformation information, and the template image to estimate information about the different area in the reference image. Like the second to seventh exemplary embodiments, the object identification device Z8 according to the eighth exemplary embodiment of the present invention does not require the different area in the reference image to be registered to a database in advance. Like the sixth and seventh exemplary embodiments, when the image pattern typically seen in the different area is given in advance, the object identification device Z8 is able to estimate the different area by using the image pattern as the template image. For example, when only a particular mail is to be identified from among a plurality of mail images in which envelopes are the same but only the recipient names are different, the area in which the recipient name is described is able to be defined as an image pattern of which layout of character strings such as a zip code, an address, and a recipient name is somewhat fixed. For this reason, the object identification device Z8 is effective in such case. The estimation of the different area in the reference image performed according to the eighth exemplary embodiment of the present invention is possible even when the different area is the entire object and when the different area is a part of the object, and like the fifth and seventh exemplary embodiments, a more highly reliable different area is able to be obtained compared with the second exemplary embodiment and the like, and therefore, highly accurate identification is able to be realized. In the eighth exemplary embodiment of the present invention, when the different area estimation unit 24 has the configuration illustrated in FIG. 42 or FIG. 43, an object area estimation unit may be added before the template matching unit 2302. In this configuration, the different area is estimated from the object area after eliminating influence of the background, and therefore, this configuration is particularly effective in the cases of FIG. 18 and FIG. 19.

Ninth Exemplary Embodiment

The ninth exemplary embodiment of the present invention will be described with reference to drawings.

Figure 44:
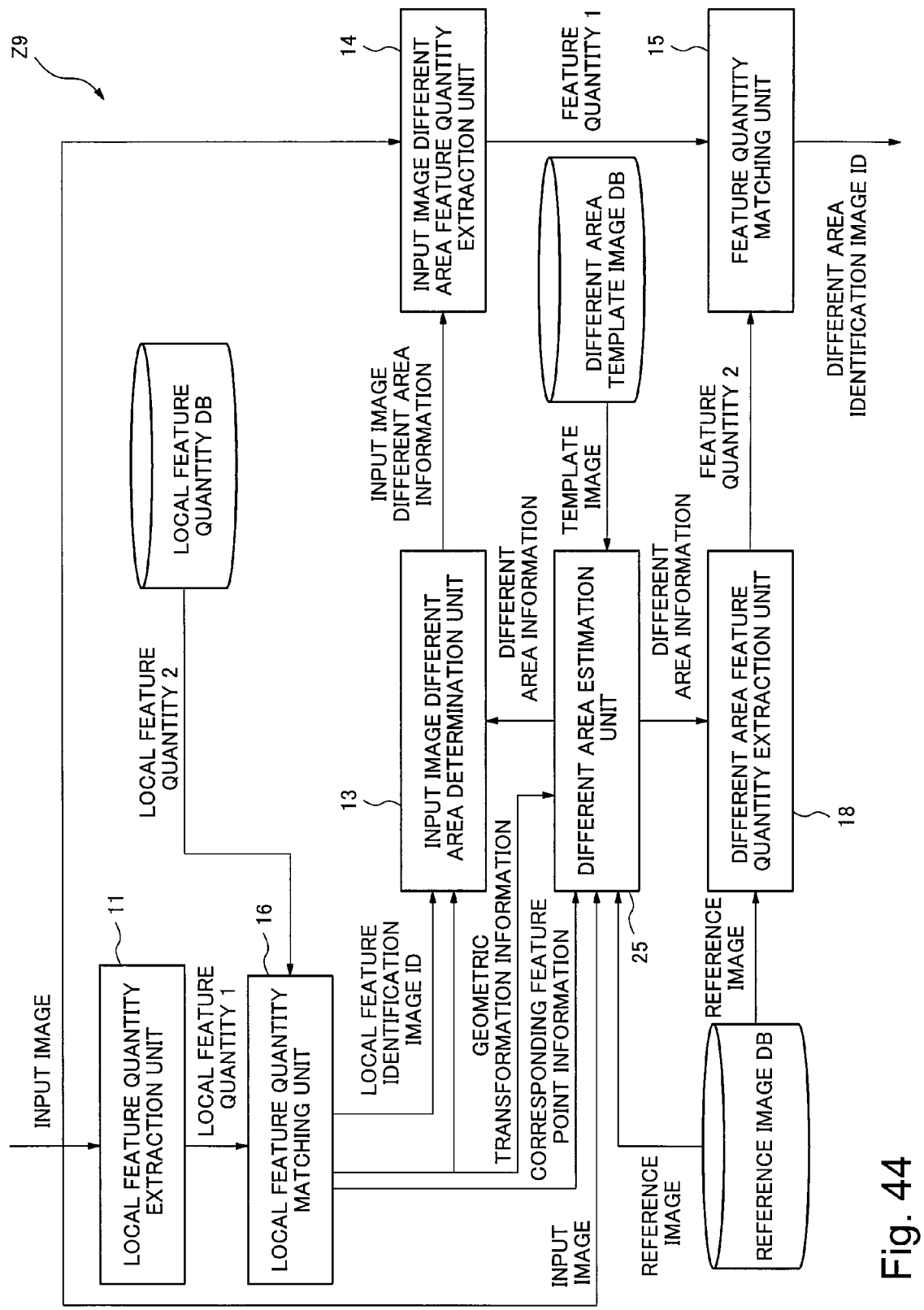
FIG. 44 is a block diagram illustrating an example of a configuration of an object identification device according to a ninth exemplary embodiment.

FIG. 44 is a block diagram illustrating a configuration of an object identification device according to the ninth exemplary embodiment of the present invention. As illustrated in FIG. 44, an object identification device Z9 according to the ninth exemplary embodiment includes the local feature quantity extraction unit 11, the local feature quantity matching unit 16, the input image different area determination unit 13, the input image different area feature quantity extraction unit 14, the feature quantity matching unit 15, a different area estimation unit 25, and the different area feature quantity extraction unit 18. As described above, the object identification device Z9 according to the ninth exemplary embodiment has a configuration in which the object identification device Z5 according to the fifth exemplary embodiment and the object identification device Z6 according to the sixth exemplary embodiment are mixed. When the object identification device Z9 is compared with the object identification device Z5 according to the fifth exemplary embodiment, the object identification device Z9 is different in that the different area estimation unit 21 is replaced with the different area estimation unit 25. The details of the different area estimation unit 25 will be described later. The other constituent elements are the same as those of the fifth exemplary embodiment. These constituent elements are denoted with the same reference numerals, and detailed explanation thereabout is omitted.

The different area estimation unit 25 is able to be configured as a combination of a configuration in which the different area is estimated only by the incorrect corresponding feature point concentration degree search unit 701 as illustrated in FIG. 22, a configuration in which the different area is estimated by the transformation image generation unit 2001, the different image generation unit 2002, the object area estimation unit 2003, and the large difference area detection unit 2004 as illustrated in FIG. 27, and a configuration in which the different area is estimated only by the template matching unit 2201 as illustrated in FIG. 34. With regard to these three configurations in which the different area is estimated, in a case where any given configuration is first used to estimate the different candidate area and thereafter another configuration is used to further narrow down the different candidate area, the three configurations in each of which the different area is estimated may be configured in any given order. With regard to these three configurations in each of which the different area is estimated, each of the configurations may be used to estimate the different candidate area, and the overlapping area of the different candidate areas estimated by the configurations may be output as an ultimate different area. With regard to these three configurations in each of which the different area is estimated, any given configuration is first used to estimate the different candidate area, and thereafter the remaining two configurations are used to narrow down the different candidate areas from the different candidate area, and the overlapping area of the different candidate areas estimated by the two configurations may be output as an ultimate different area. With regard to these three configurations in each of which the different area is estimated, two configurations may be first used to estimate the different candidate areas, and the remaining single configuration is used to narrow down the different candidate area from the overlapping area of the different candidate areas estimated by the two configurations, and the narrowed down area may be output as an ultimate different area.

Figure 45:
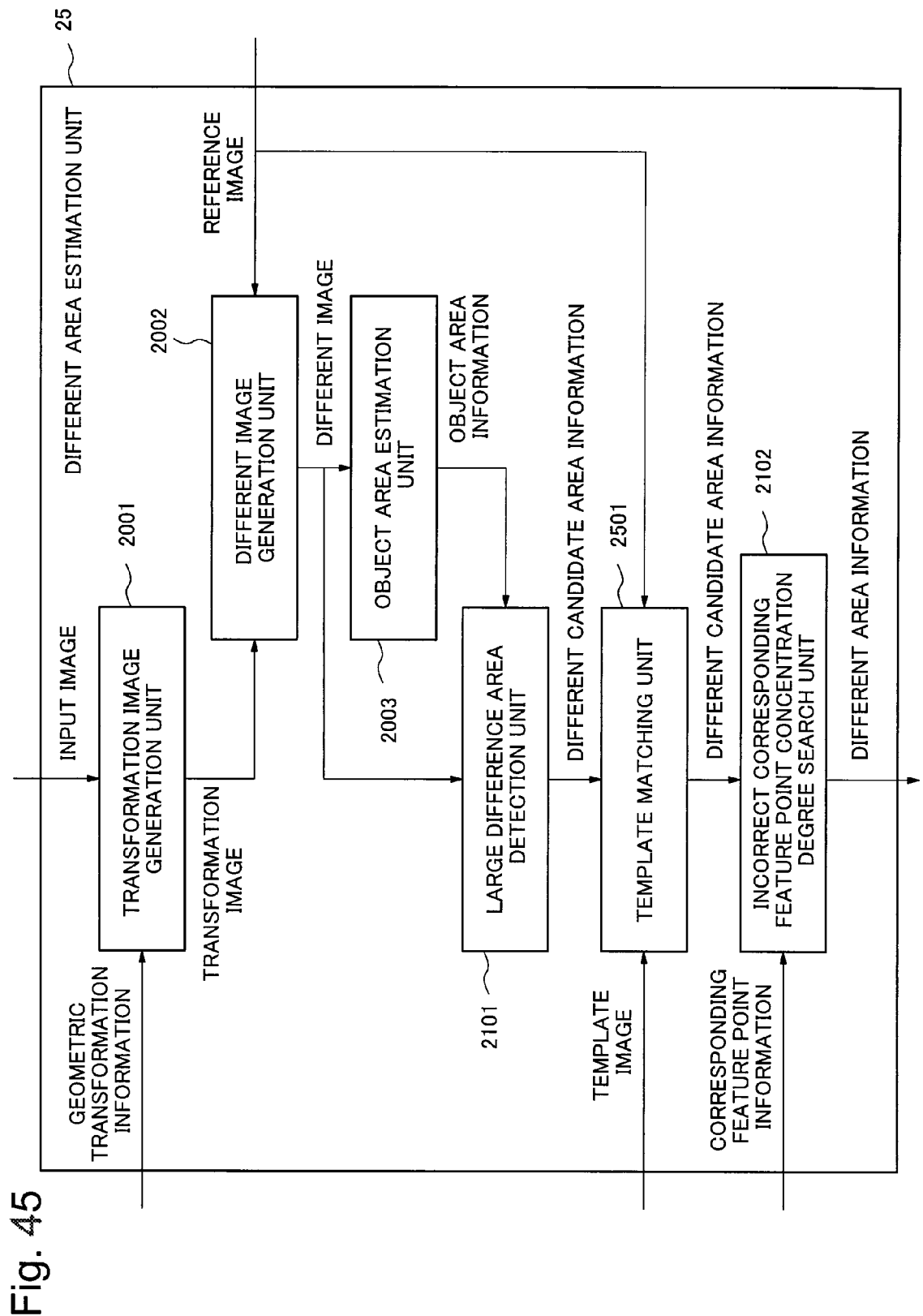
FIG. 45 is a block diagram illustrating an example of a configuration of a different area estimation unit 25.
Figure 46:
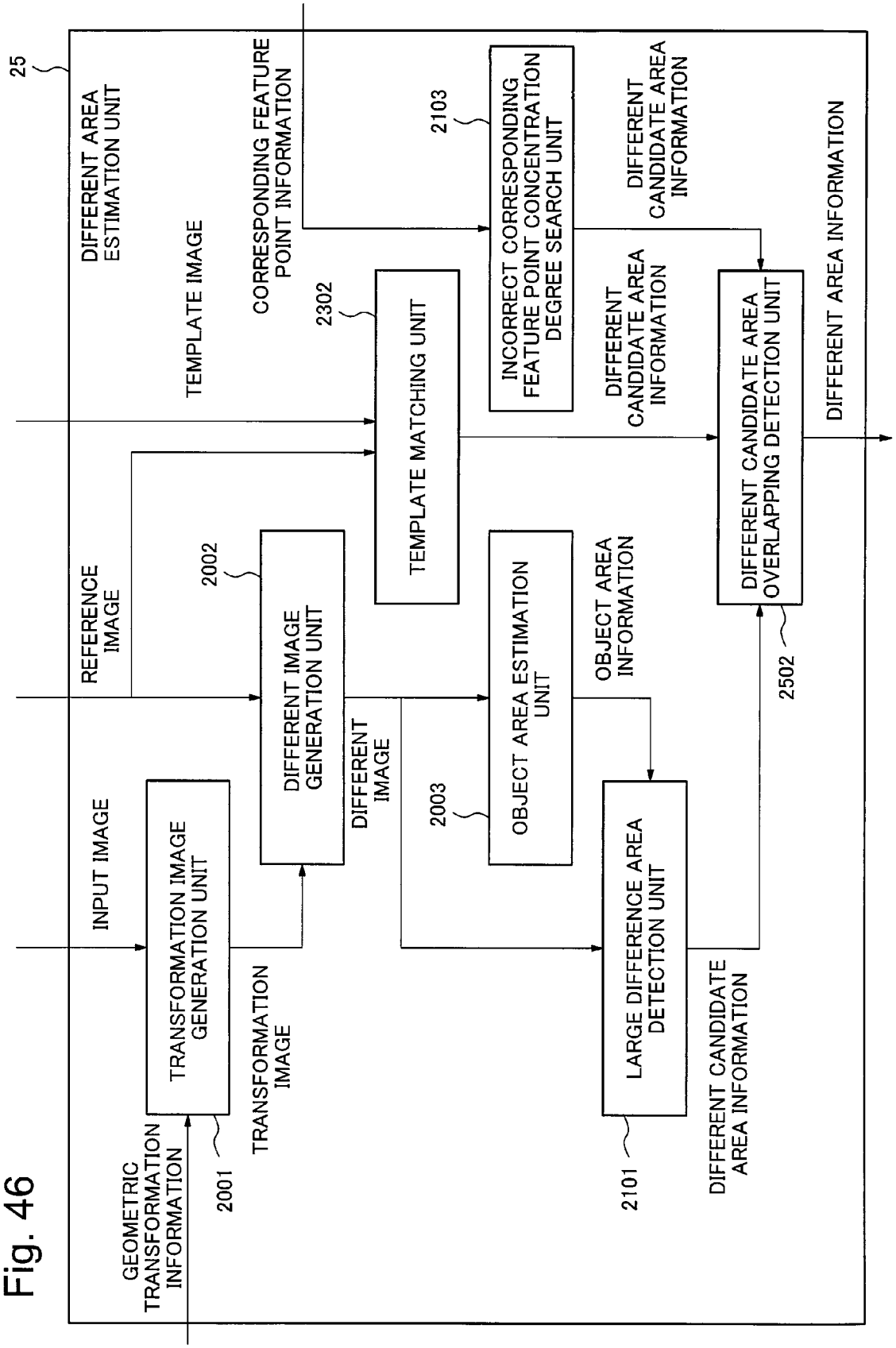
FIG. 46 is a block diagram illustrating an example of a configuration of a different area estimation unit 25.

FIG. 45 and FIG. 46 are block diagrams illustrating examples of configurations of the different area estimation unit 25. Each of the diagrams will be hereinafter described.

As illustrated in FIG. 45, the different area estimation unit 25 is able to be constituted by the transformation image generation unit 2001, the different image generation unit 2002, the object area estimation unit 2003, the large difference area detection unit 2101, a template matching unit 2501, and the incorrect corresponding feature point concentration degree search unit 2102. The transformation image generation unit 2001, the different image generation unit 2002, and the object area estimation unit 2003 of FIG. 45 are the same as the transformation image generation unit 2001, the different image generation unit 2002, and the object area estimation unit 2003 which are the constituent elements of the different area estimation unit 20 illustrated in FIG. 27, and detailed explanation thereabout is omitted. The large difference area detection unit 2101 of FIG. 45 is the same as the large difference area detection unit 2101 of FIG. 30, and detailed explanation thereabout is omitted. The template matching unit 2501 of FIG. 45 is substantially the same as the template matching unit 2301 which is a constituent element of the different area estimation unit 23 illustrated in FIG. 37, but the template matching unit 2501 of FIG. 45 is different in that the template matching unit 2501 of FIG. 45 outputs different candidate area information instead of the different area information. The incorrect corresponding feature point concentration degree search unit 2102 of FIG. 45 is the same as the incorrect corresponding feature point concentration degree search unit 2102 which is a constituent element of the different area estimation unit 21 illustrated in FIG. 30, and detailed explanation thereabout is omitted. More specifically, the incorrect corresponding feature point concentration degree search unit 2102 of FIG. 45 focuses on only points existing inside of the different candidate area estimated by the template matching unit 2501 in the reference image from among the corresponding feature points, and searches an area where incorrectly corresponding feature points are concentrated, thus estimating the different area. Then, the template matching unit 2501 also estimates the different candidate area in the reference image by performing template matching using a template image with regard to only the different candidate area estimated by the large difference area detection unit 2101 in the reference image. The different area is further narrowed down by the incorrect corresponding feature point concentration degree search unit 2102 from the different candidate areas estimated by the incorrect corresponding feature point concentration degree search unit 2102, the large difference area detection unit 2101, and the template matching unit 2501, so that highly reliable different area information is output.

As illustrated in FIG. 46, the different area estimation unit 25 is able to be constituted also by the transformation image generation unit 2001, the different image generation unit 2002, the object area estimation unit 2003, the large difference area detection unit 2101, the template matching unit 2302, the incorrect corresponding feature point concentration degree search unit 2103, and a different candidate area overlapping detection unit 2502.

The transformation image generation unit 2001, the different image generation unit 2002, and the object area estimation unit 2003 of FIG. 46 are the same as the transformation image generation unit 2001, the different image generation unit 2002, and the object area estimation unit 2003 which are constituent elements of the different area estimation unit 20 illustrated in FIG. 27, and detailed explanation thereabout is omitted. The large difference area detection unit 2101 of FIG. 46 is the same as the large difference area detection unit 2101 which is a constituent element of the different area estimation unit 21 illustrated in FIG. 30, and detailed explanation thereabout is omitted. The template matching unit 2302 of FIG. 46 is the same as the template matching unit 2302 which is a constituent element of the different area estimation unit 23 illustrated in FIG. 38, and detailed explanation thereabout is omitted. The incorrect corresponding feature point concentration degree search unit 2103 of FIG. 46 is the same as the incorrect corresponding feature point concentration degree search unit 2103 which is a constituent element of the different area estimation unit 21 illustrated in FIG. 31, and detailed explanation thereabout is omitted. The different candidate area overlapping detection unit 2502 of FIG. 46 is similar to the different candidate area overlapping detection unit 2106 which is a constituent element of the different area estimation unit 21 illustrated in FIG. 32. However, the different candidate area overlapping detection unit 2502 is different in that the different candidate area overlapping detection unit 2502 receives three pieces of different candidate area information, which are output from the large difference area detection unit 2101, the template matching unit 2302, and the incorrect corresponding feature point concentration degree search unit 2103, and determines that the area where the three different candidate areas are overlapping among them is the different area, and outputs the different area information. The different candidate area overlapping detection unit 2502 outputs information about the area determined to be the different candidate area by all of the large difference area detection unit 2101, the template matching unit 2302, and the incorrect corresponding feature point concentration degree search unit 2103, and outputs the highly reliable different area information.

It should be noted that the different area estimation unit 25 may be configured in a manner other than FIG. 45 and FIG. 46. For example, with regard to the different candidate area that is first estimated by the incorrect corresponding feature point concentration degree search unit 2103, the template matching unit 2501 may subsequently further narrow down the different candidate area, and finally, a combination of the transformation image generation unit 2001, the different image generation unit 2104, and the large difference area detection unit 2105 may ultimately estimate the different area information. The order of processing of the estimation of the different candidate area by using the incorrect corresponding feature point concentration degree search, the estimation of the different candidate area by using the template matching, and the estimation of the different candidate area by using the large difference area detection may be in an order other than the example of configuration described above.

As described above, in the ninth exemplary embodiment of the present invention, the different area estimation unit 25 uses the input image, the reference image, the geometric transformation information, the corresponding feature point information, and the template image to estimate information about the different area in the reference image information. Like the second to eighth exemplary embodiments, the object identification device Z9 according to the ninth exemplary embodiment of the present invention does not require the different area in the reference image to be registered to a database in advance. Like the sixth to eighth exemplary embodiments, when the image pattern typically seen in the different area is given in advance, the object identification device Z9 is able to estimate the different area by using the image pattern as the template image. For example, when only a particular mail is to be identified from among a plurality of mail images in which envelopes are the same but only the recipient names are different, the area in which the recipient name is described is able to be defined as an image pattern of which layout of character strings such as a zip code, an address, and a recipient name is somewhat fixed. For this reason, the object identification device Z9 is effective in such case. The estimation of the different area in the reference image performed according to the ninth exemplary embodiment of the present invention is possible even when the different area is the entire object and when the different area is a part of the object, and like the fifth, seventh, and eighth exemplary embodiments, a more highly reliable different area is able to be obtained compared with the second exemplary embodiment and the like, and therefore, highly accurate identification is able to be realized. In the ninth exemplary embodiment of the present invention, for example, when the different area estimation unit 25 has the configuration illustrated in FIG. 46, an object area estimation unit may be added before the template matching unit 2302 and the incorrect corresponding feature point concentration degree search unit 2103. In this configuration, the different area is estimated from the object area after eliminating influence of the background, and therefore, this configuration is particularly effective in the cases of FIG. 18 and FIG. 19.

Tenth Exemplary Embodiment

The tenth exemplary embodiment of the present invention will be described with reference to drawings.

Figure 47:
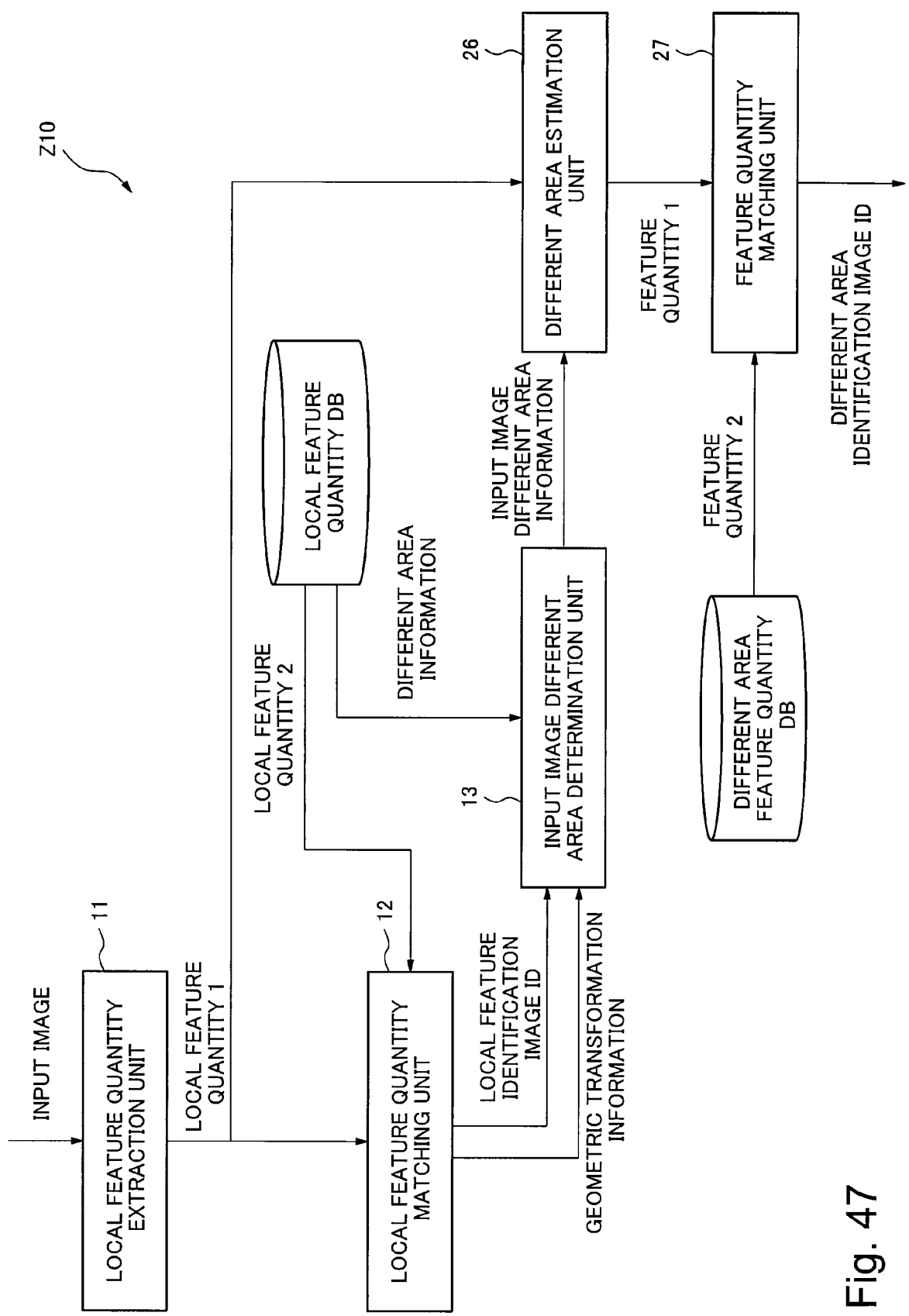
FIG. 47 is a block diagram illustrating an example of a configuration of an object identification device according to a tenth exemplary embodiment.

FIG. 47 is a block diagram illustrating an example of a configuration of an object identification device according to the tenth exemplary embodiment of the present invention. As illustrated in FIG. 47, an object identification device Z10 according to the tenth exemplary embodiment is able to be constituted by the local feature quantity extraction unit 11, the local feature quantity matching unit 12, the input image different area determination unit 13, an input image different area feature quantity extraction unit 26, and a feature quantity matching unit 27. As described above, the object identification device Z10 according to the tenth exemplary embodiment is different in that the input image different area feature quantity extraction unit 14 and the feature quantity matching unit 15 of the object identification device Z1 according to the first exemplary embodiment are replaced with an input image different area feature quantity extraction unit 26 and a feature quantity matching unit 27. The details of the input image different area feature quantity extraction unit 26 and the feature quantity matching unit 27 will be described later. The other constituent elements are the same as those of the first exemplary embodiment. These constituent elements are denoted with the same reference numerals, and detailed explanation thereabout is omitted.

Figure 48:
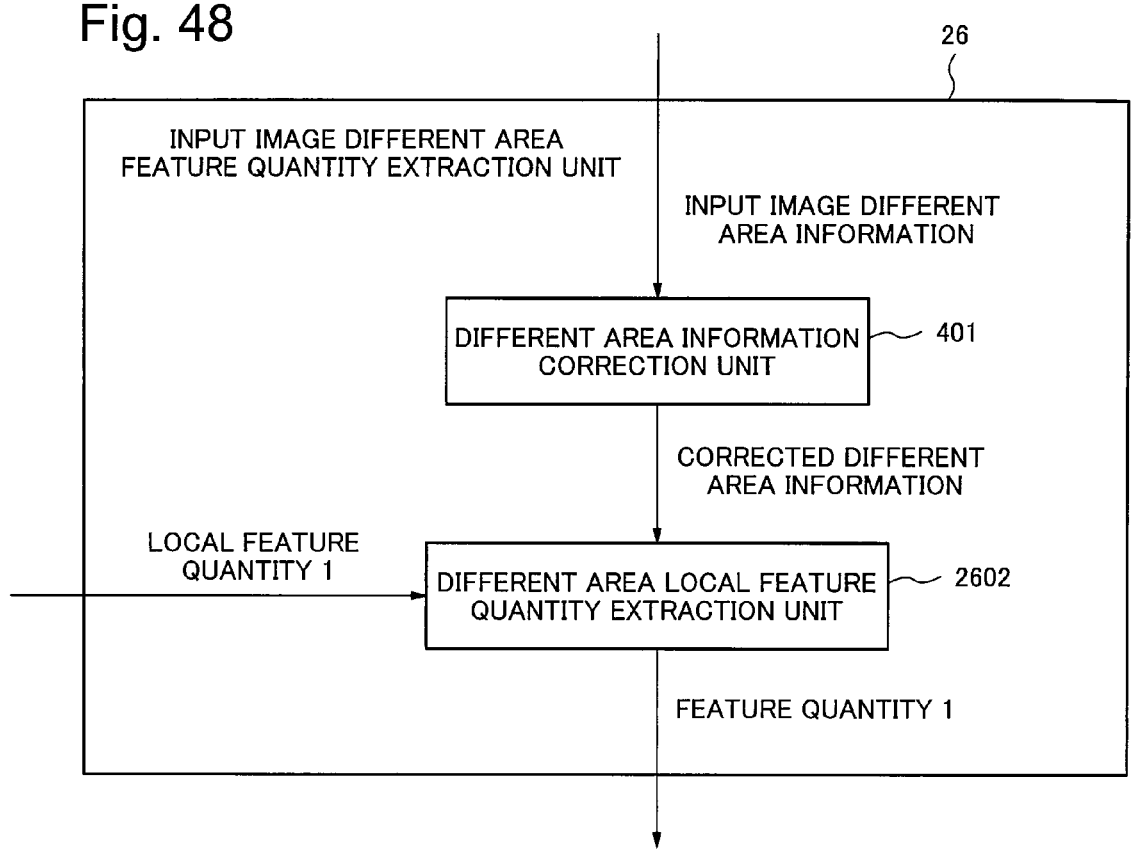
FIG. 48 is a block diagram illustrating an example of a configuration of an input image different area feature quantity extraction unit 26.
Figure 49:
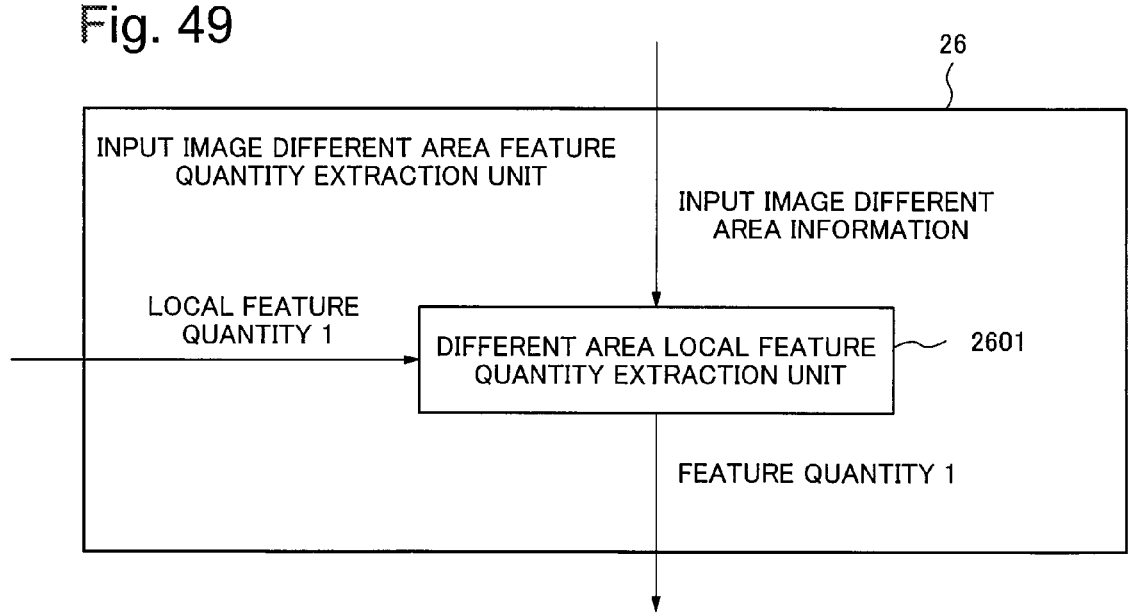
FIG. 49 is a block diagram illustrating an example of a configuration of an input image different area feature quantity extraction unit 26.

FIG. 48 and FIG. 49 are block diagrams illustrating examples of configurations of the input image different area feature quantity extraction unit 26. Each of the diagrams will be hereinafter described.

As illustrated in FIG. 48, the input image different area feature quantity extraction unit 26 is able to be constituted by the different area information correction unit 401 and a different area local feature quantity extraction unit 2602. The different area information correction unit 401 of FIG. 48 is the same as the different area information correction unit 401 which is a constituent element of the input image different area feature quantity extraction unit 14 illustrated in FIG. 5, and detailed explanation thereabout is omitted. The different area local feature quantity extraction unit 2602 receives corrected different area information which is output from the different area information correction unit 401 and a local feature quantity 1 which is a local feature quantity extracted from the input image by the local feature quantity extraction unit 11, and extracts the feature quantity 1. The different area local feature quantity extraction unit 2602 searches a feature point existing inside of the corrected different area of the input image on the basis of the coordinate information of the feature point which is the basis of describing the local feature quantity 1, and outputs, as a feature quantity 1, a feature quantity describing information around the feature point as a local feature quantity. More specifically, the feature quantity 1 which is output here is a feature quantity generated by cutting out a portion of the local feature quantity 1. In the tenth exemplary embodiment of the present invention, like the feature quantity 1, the feature quantity 2 matched with the feature quantity 1 by the feature quantity matching unit 27 is a feature quantity generated by cutting out a portion of the local feature quantity 2 which is a local feature quantity extracted from the reference image.

As illustrated in FIG. 49, the input image different area feature quantity extraction unit 26 is able to be constituted also by a different area local feature quantity extraction unit 2601. The different area local feature quantity extraction unit 2601 of FIG. 49 is substantially the same as the different area local feature quantity extraction unit 2602 which is a constituent element of the input image different area feature quantity extraction unit 26 illustrated in FIG. 48, but the different area local feature quantity extraction unit 2601 of FIG. 49 is different in that the different area local feature quantity extraction unit 2601 of FIG. 49 receives input image different area information which is information about the different area of the input image before the correction, instead of receiving the corrected different area information.

Figure 50:
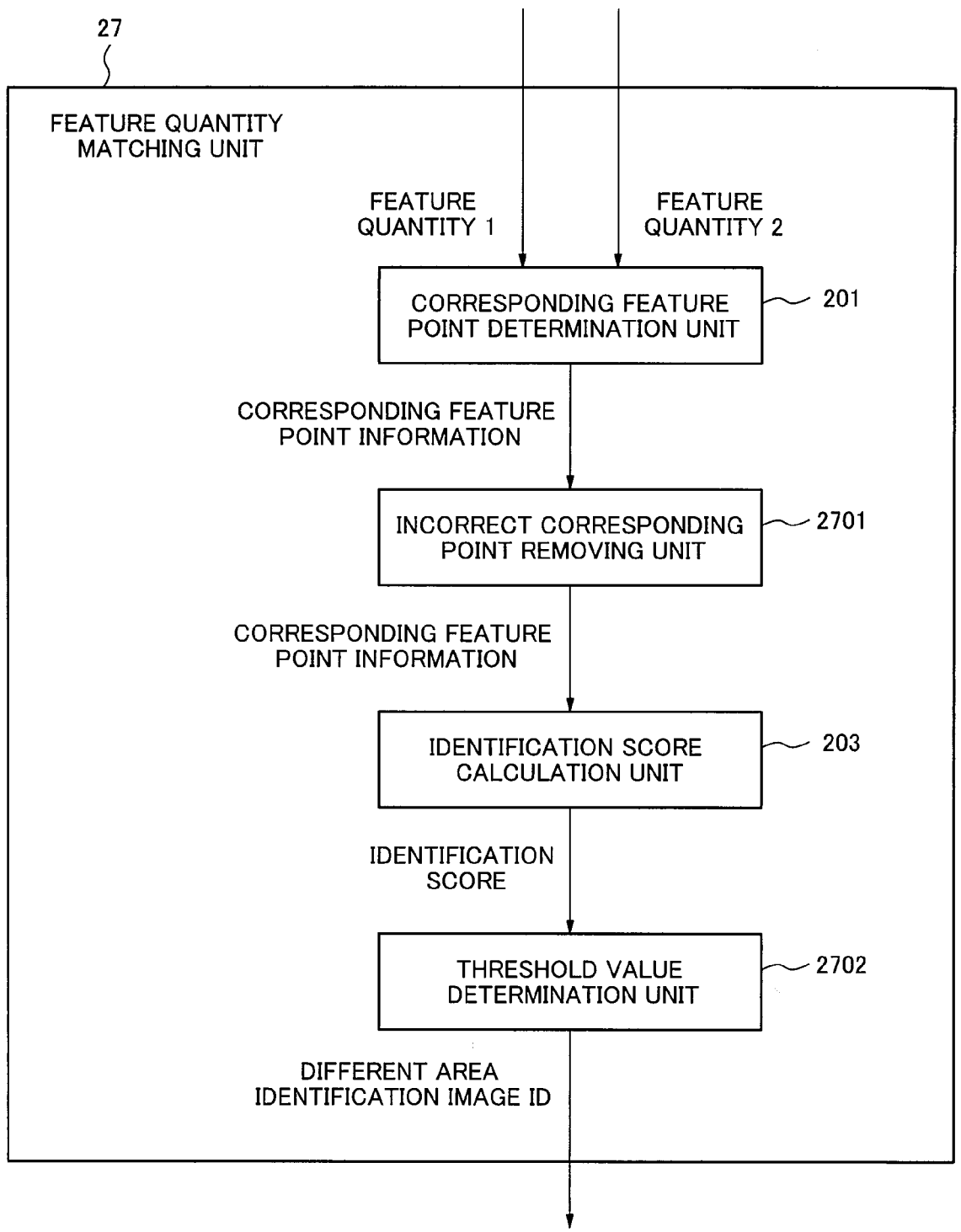
FIG. 50 is a block diagram illustrating an example of a configuration of a feature quantity matching unit 27.

FIG. 50 is a block diagram illustrating an example of a configuration of the feature quantity matching unit 27. This diagram will be hereinafter described. As illustrated in FIG. 50, the feature quantity matching unit 27 is able to be constituted by the corresponding feature point determination unit 201, an incorrect corresponding point removing unit 2701, the identification score calculation unit 203, and a threshold value determination unit 2702. The corresponding feature point determination unit 201 and the identification score calculation unit 203 of FIG. 50 are the same as the corresponding feature point determination unit 201 and the identification score calculation unit 203 which are constituent elements of the local feature quantity matching unit 12 illustrated in FIG. 4, and detailed explanation thereabout is omitted. The incorrect corresponding point removing unit 2701 of FIG. 50 is substantially the same as the incorrect corresponding point removing unit 202 which is a constituent element of the local feature quantity matching unit 12 illustrated in FIG. 4, but the incorrect corresponding point removing unit 2701 of FIG. 50 is different in that the incorrect corresponding point removing unit 2701 of FIG. 50 does not output the geometric transformation information, and outputs the corresponding feature point information only. The threshold value determination unit 2702 of FIG. 50 is substantially the same as the threshold value determination unit 204 which is a constituent element of the local feature quantity matching unit 12 illustrated in FIG. 4, but the threshold value determination unit 2702 of FIG. 50 is different in that the threshold value determination unit 2702 of FIG. 50 outputs the different area identification image ID instead of outputting the local feature identification image ID.

Unlike the first to ninth exemplary embodiments, the tenth exemplary embodiment of the present invention uses the feature quantity generated by cutting out a portion of the local feature quantity in order to identify the different area. For this reason, in the tenth exemplary embodiment, when the feature quantity is generated by the input image different area feature quantity extraction unit, the input image different area feature quantity extraction unit may receive the local feature quantity extracted from the input image, and does not require the input image itself. Therefore, in a case where the object identification device Z10 is configured as a server client system in which only the extraction of the local feature quantity is performed by a client side and the other processing is performed by a server side, only the local feature quantity lighter than the input image may be transmitted to the server side. Therefore, the object identification device Z10 is able to reduce the processing time until an identification result is obtained. The feature quantity matching unit according to the tenth exemplary embodiment of the present invention performs substantially the same processing as the local feature quantity matching unit, but is able to perform matching only with the different areas to exclude influence of the correspondence of the feature point detected from an area other than the different area. As compared with a conventional method using all of the local feature quantities extracted from the entire image, the feature quantity matching unit according to the tenth exemplary embodiment of the present invention is able to distinguish the difference in the object, and is able to realize highly accurate identification as a result. FIG. 47 which is hereinabove described in order as an example of a configuration of the tenth exemplary embodiment of the present invention is a configuration based on the first exemplary embodiment. Likewise, FIG. 47 may be configured on the basis of each of the second to ninth exemplary embodiments and the thirteenth and fourteenth exemplary embodiments described below. More specifically, the object identification device Z10 may be configured in such a manner that, instead of the input image, the local feature quantity 1 may be input into the input image different area feature quantity extraction unit 14 in each of the examples of configurations of the second to ninth, thirteenth, and fourteenth exemplary embodiments.

Eleventh Exemplary Embodiment

Figure 51:
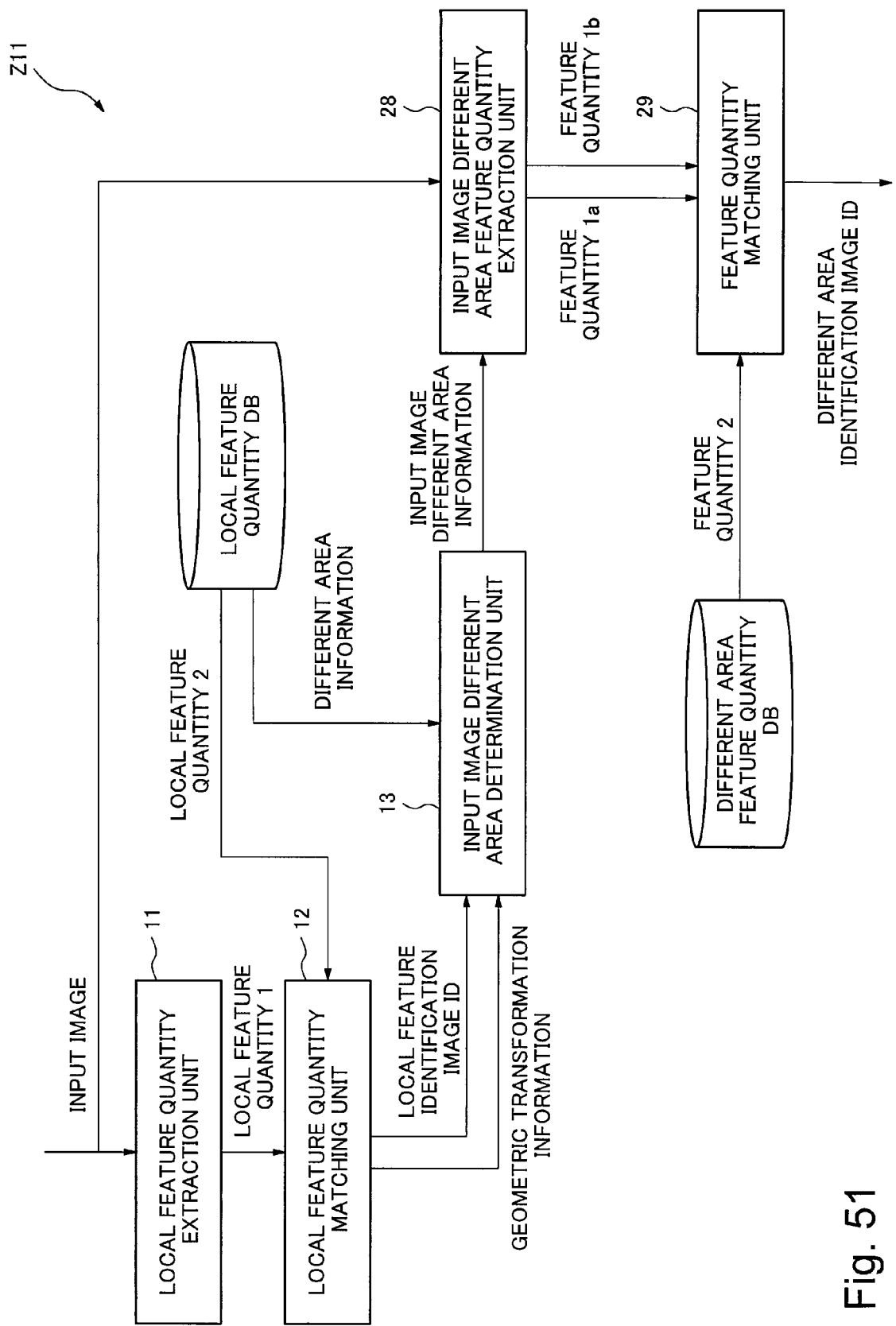
FIG. 51 is a block diagram illustrating an example of a configuration of an object identification device according to an eleventh exemplary embodiment.

The eleventh exemplary embodiment of the present invention will be described with reference to drawings. FIG. 51 is a block diagram illustrating a configuration of an object identification device according to the eleventh exemplary embodiment of the present invention. As illustrated in FIG. 51, an object identification device Z11 according to the eleventh exemplary embodiment includes the local feature quantity extraction unit 11, the local feature quantity matching unit 12, the input image different area determination unit 13, an input image different area feature quantity extraction unit 28, and a feature quantity matching unit 29. As described above, the object identification device Z11 according to the eleventh exemplary embodiment is different in that the input image different area feature quantity extraction unit 14 and the feature quantity matching unit 15 of the object identification device Z1 according to the first exemplary embodiment is replaced with the input image different area feature quantity extraction unit 28 and the feature quantity matching unit 29. The details of the input image different area feature quantity extraction unit 28 and the feature quantity matching unit 29 will be described later. The other constituent elements are the same as those of the first exemplary embodiment. These constituent elements are denoted with the same reference numerals, and detailed explanation thereabout is omitted.

Figure 52:
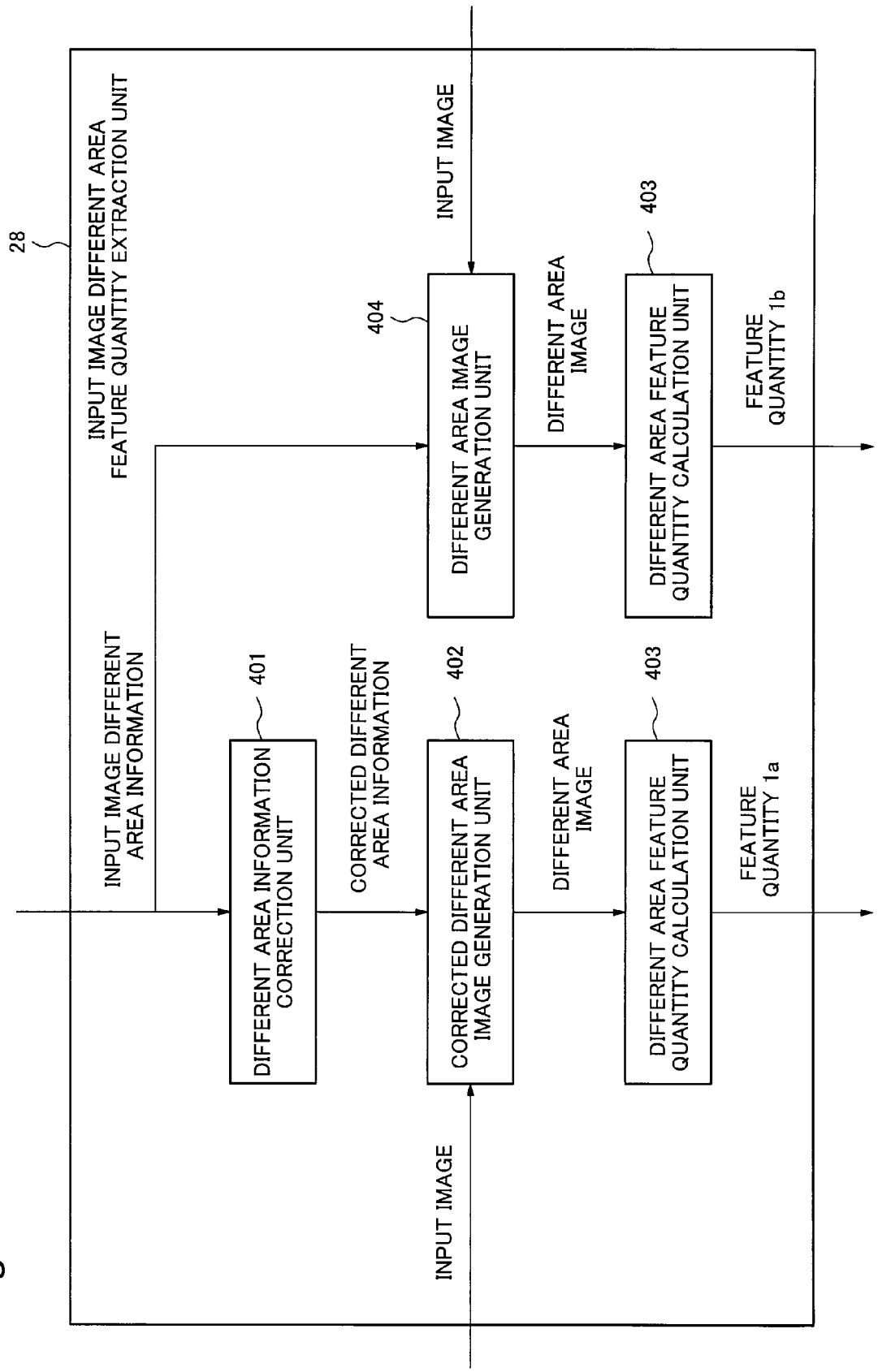
FIG. 52 is a block diagram illustrating an example of a configuration of an input image different area feature quantity extraction unit 28.

FIG. 52 is a block diagram illustrating an example of a configuration of the input image different area feature quantity extraction unit 28. This diagram will be hereinafter described. As illustrated in FIG. 52, the input image different area feature quantity extraction unit 28 is able to be constituted by the different area information correction unit 401, the corrected different area image generation unit 402, the different area feature quantity calculation unit 403, and the different area image generation unit 404. The different area information correction unit 401, the corrected different area image generation unit 402, and the different area feature quantity calculation unit 403 of FIG. 52 are the same as the different area information correction unit 401, the corrected different area image generation unit 402, and the different area feature quantity calculation unit 403 which are constituent elements of the input image different area feature quantity extraction unit 14 illustrated in FIG. 5, and detailed explanation thereabout is omitted. The different area image generation unit 404 of FIG. 52 is the same as the different area image generation unit 404 which is a constituent element of the input image different area feature quantity extraction unit 14 illustrated in FIG. 6, and detailed explanation thereabout is omitted. More specifically, the input image different area feature quantity extraction unit 28 has the combination of the configurations of FIG. 5 and FIG. 6, and extracts a feature quantity 1a from the different area of the input image that is corrected, and extracts a feature quantity 1b from the different area of the input image that is not corrected.

Figure 53:
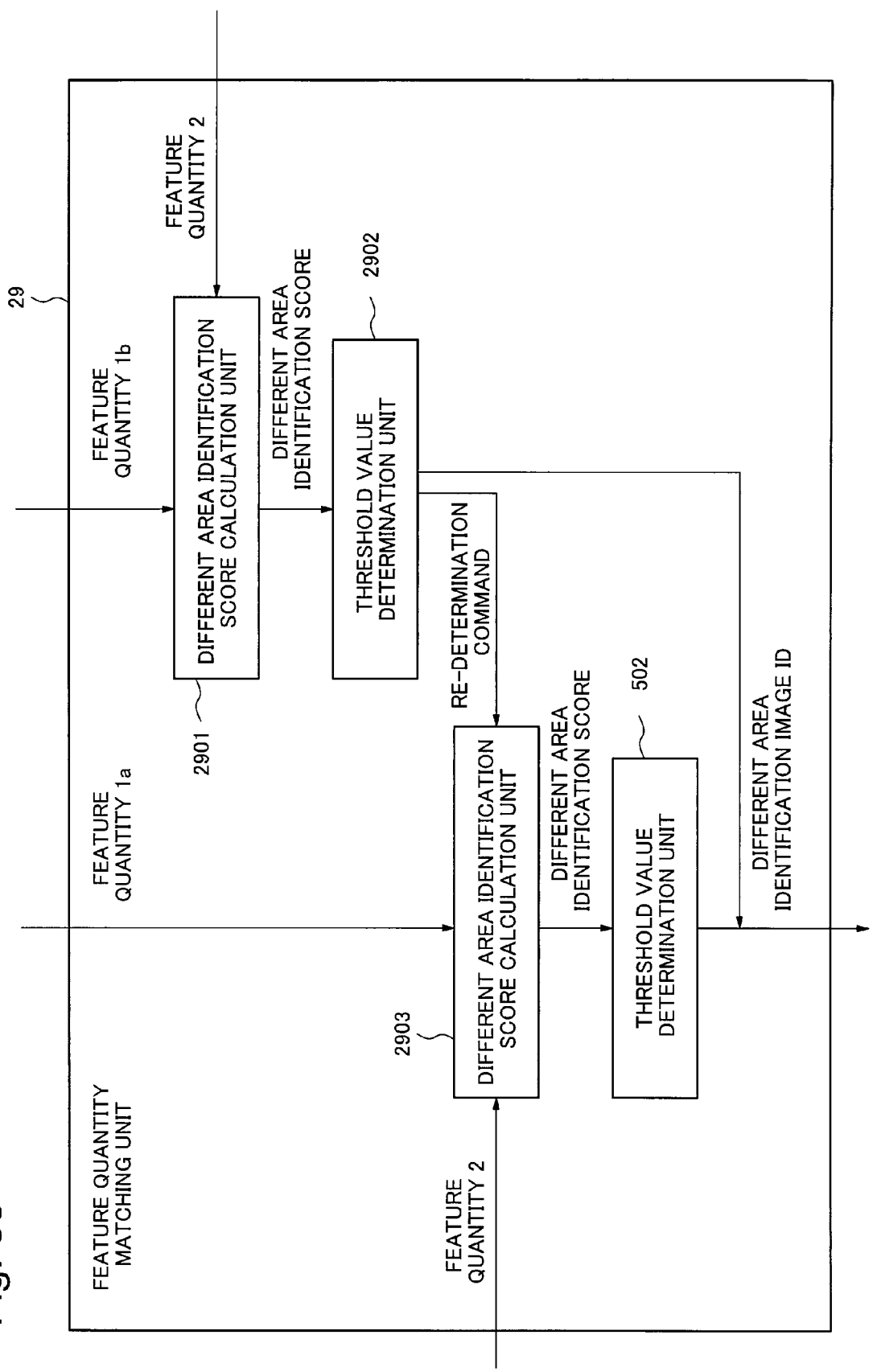
FIG. 53 is a block diagram illustrating an example of a configuration of a feature quantity matching unit 29.
Figure 54:
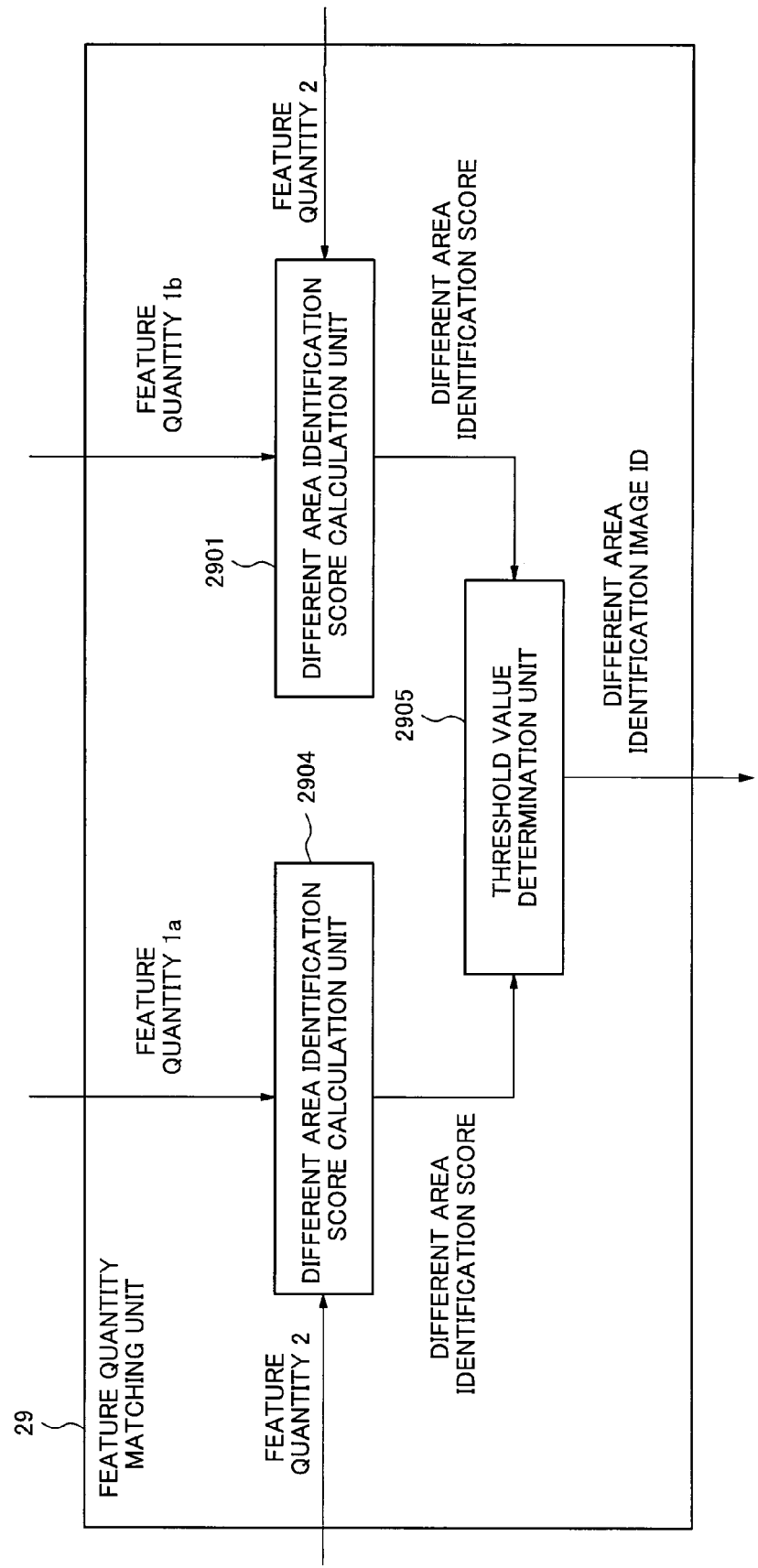
FIG. 54 is a block diagram illustrating an example of a configuration of a feature quantity matching unit 29.

FIG. 53 and FIG. 54 are block diagrams illustrating examples of configurations of the feature quantity matching unit 29. Each of the diagrams will be hereinafter described.

As illustrated in FIG. 53, the feature quantity matching unit 29 is able to be constituted by a different area identification score calculation unit 2901, a threshold value determination unit 2902, a different area identification score calculation unit 2903, and the threshold value determination unit 502. The different area identification score calculation unit 2901 of FIG. 53 is the same as the different area identification score calculation unit 501 which is a constituent element of the feature quantity matching unit 15 illustrated in FIG. 14, and detailed explanation thereabout is omitted. The threshold value determination unit 2902 of FIG. 53 is substantially the same as the threshold value determination unit 502 which is a constituent element of the feature quantity matching unit 15 illustrated in FIG. 14, but the threshold value determination unit 2902 of FIG. 53 is different in that, in a case where images are determined not to be the same as a result of the threshold value determination, the threshold value determination unit 2902 of FIG. 53 outputs a re-determination command for these images. The different area identification score calculation unit 2903 of FIG. 53 is substantially the same as the different area identification score calculation unit 501 which is a constituent element of the feature quantity matching unit 15 illustrated in FIG. 14, but the different area identification score calculation unit 2903 of FIG. 53 is different in that the different area identification score calculation unit 2903 of FIG. 53 receives not only two feature quantities but also a re-determination command from the threshold value determination unit 2902. The different area identification score calculation unit 2903 calculates a different area identification score again for images for which a re-determination command is given. The threshold value determination unit 502 of FIG. 53 is the same as the threshold value determination unit 502 which is a constituent element of the feature quantity matching unit 15 illustrated in FIG. 14, and detailed explanation thereabout is omitted. More specifically, in a case where the feature quantity matching unit 29 is in the configuration of FIG. 53, the following processing is performed. First, the different area identification score calculation unit 2901 calculates an identification score by using the feature quantity 1b extracted from the different area of the input image that is not corrected and the feature quantity extracted from the different area of the reference image. Then, the threshold value determination unit 2902 determines the sameness. For the reference image determined to be the same in that stage, the threshold value determination unit 2902 outputs the ID of the reference image as the different area identification image ID. On the other hand, for the reference image determined not to be the same in that stage, the different area identification score calculation unit 2903 calculates the identification score again by using the feature quantity 1a extracted from the different area of the input image that is corrected and the feature quantity extracted from the different area of the reference image. Then, the threshold value determination unit 502 determines the sameness. When the images are determined to be the same, the threshold value determination unit 502 outputs the ID of the reference image as the different area identification image ID. The threshold value determination unit 2902 and the threshold value determination unit 502 of FIG. 53 may perform determination using the same threshold value, or the threshold value for the threshold value determination unit 2902 may be less strict than the threshold value of the threshold value determination unit 502.

As illustrated in FIG. 54, the feature quantity matching unit 29 is able to be constituted also by the different area identification score calculation unit 2901, a different area identification score calculation unit 2904, and a threshold value determination unit 2905. The different area identification score calculation unit 2901 and the different area identification score calculation unit 2904 of FIG. 54 are the same as the different area identification score calculation unit 501 which is a constituent element of the feature quantity matching unit 15 illustrated in FIG. 14, and detailed explanation thereabout is omitted. The threshold value determination unit 2905 of FIG. 54 is similar to the threshold value determination unit 502 which is a constituent element of the feature quantity matching unit 15 illustrated in FIG. 14, but the threshold value determination unit 2905 of FIG. 54 is different in that the threshold value determination unit 2905 of FIG. 54 receives two different area identification scores. The threshold value determination unit 2905 combines different area identification scores which are output from the different area identification score calculation unit 2901 and the different area identification score calculation unit 2904, and performs the same processing as that of the threshold value determination unit 502 on the combined different area identification score. The method for combining the different area identification scores may be, for example, calculating a product of the different area identification scores which are output from the different area identification score calculation unit 2901 and the different area identification score calculation unit 2904, or may be calculating a summation of these scores, or may be selecting a larger one of the two different area identification scores. More specifically, the feature quantity matching unit 29 executes, in parallel, matching of the feature quantity 1a (first feature quantity) and the feature quantity (third feature quantity) extracted from the different area of the reference image, and matching of the feature quantity 1b (second feature quantity) and the third feature quantity, and outputs, as a matching result, a result obtained by integrating these two results of matchings.

Like the first exemplary embodiment, the eleventh exemplary embodiment of the present invention has information about the different area registered to a database in advance. As the registered different area in the reference image, the different area, in the input image, determined using the geometric transformation information and the different area information, and the area obtained by further correcting the different area in the input image, the minimum necessary areas where there are differences are able to be extracted from the reference image and the input image. Therefore, even when the different area is the entire object and when the different area is only a part of the object, the object identification device Z11 according to the eleventh exemplary embodiment of the present invention is able to accurately identify an object shown in an image, and is able to suppress identification error which is the problem that occurred when only a conventional local feature quantity is used. Further, in contrast to the first exemplary embodiment in which identification is done using only the feature quantity extracted from any one of the non-corrected different area of the input image and the corrected different area thereof, the object identification device Z11 according to the eleventh exemplary embodiment of the present invention performs identification using both of the feature quantities extracted from the non-corrected different area of the input image and the feature quantity extracted from the corrected different area thereof, so that the object identification device Z11 is able to perform identification in a more accurate manner. It should be noted that the FIG. 51 hereinabove described as the example of the configuration of the eleventh exemplary embodiment of the present invention in order is the configuration based on the first exemplary embodiment. Likewise, FIG. 51 may be configured on the basis of each of the second to tenth exemplary embodiments, and the thirteenth and fourteenth exemplary embodiments described below.

Twelfth Exemplary Embodiment

The twelfth exemplary embodiment of the present invention will be described with reference to drawings.

Figure 55:
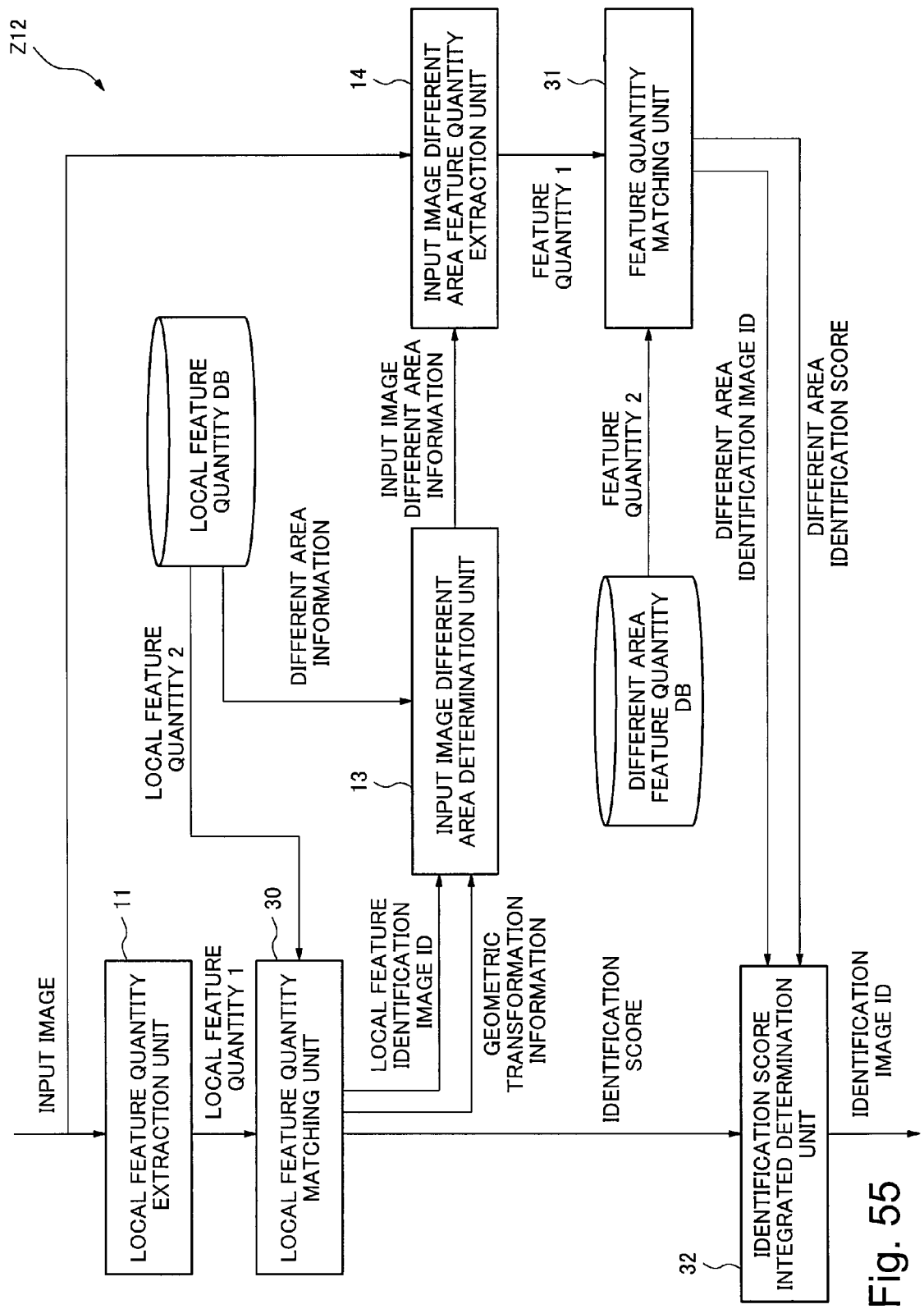
FIG. 55 is a block diagram illustrating an example of a configuration of an object identification device according to a twelfth exemplary embodiment.

FIG. 55 is a block diagram illustrating an example of a configuration of an object identification device according to the twelfth exemplary embodiment of the present invention. As illustrated in FIG. 55, an object identification device Z12 according to the twelfth exemplary embodiment is able to be constituted by the local feature quantity extraction unit 11, a local feature quantity matching unit 30, the input image different area determination unit 13, the input image different area feature quantity extraction unit 14, a feature quantity matching unit 31, and an identification score integrated determination unit 32. As described above, the object identification device Z12 according to the twelfth exemplary embodiment is different in that the local feature quantity matching unit 12 and the feature quantity matching unit 15 of the object identification device Z1 according to the first exemplary embodiment are replaced with the local feature quantity matching unit 30 and the feature quantity matching unit 31, and the identification score integrated determination unit 32 is added as a new constituent element. The details of the local feature quantity matching unit 30, the feature quantity matching unit 31, and the identification score integrated determination unit 32 will be described later. The other constituent elements are the same as those of the first exemplary embodiment. These constituent elements are denoted with the same reference numerals, and detailed explanation thereabout is omitted.

Figure 56:
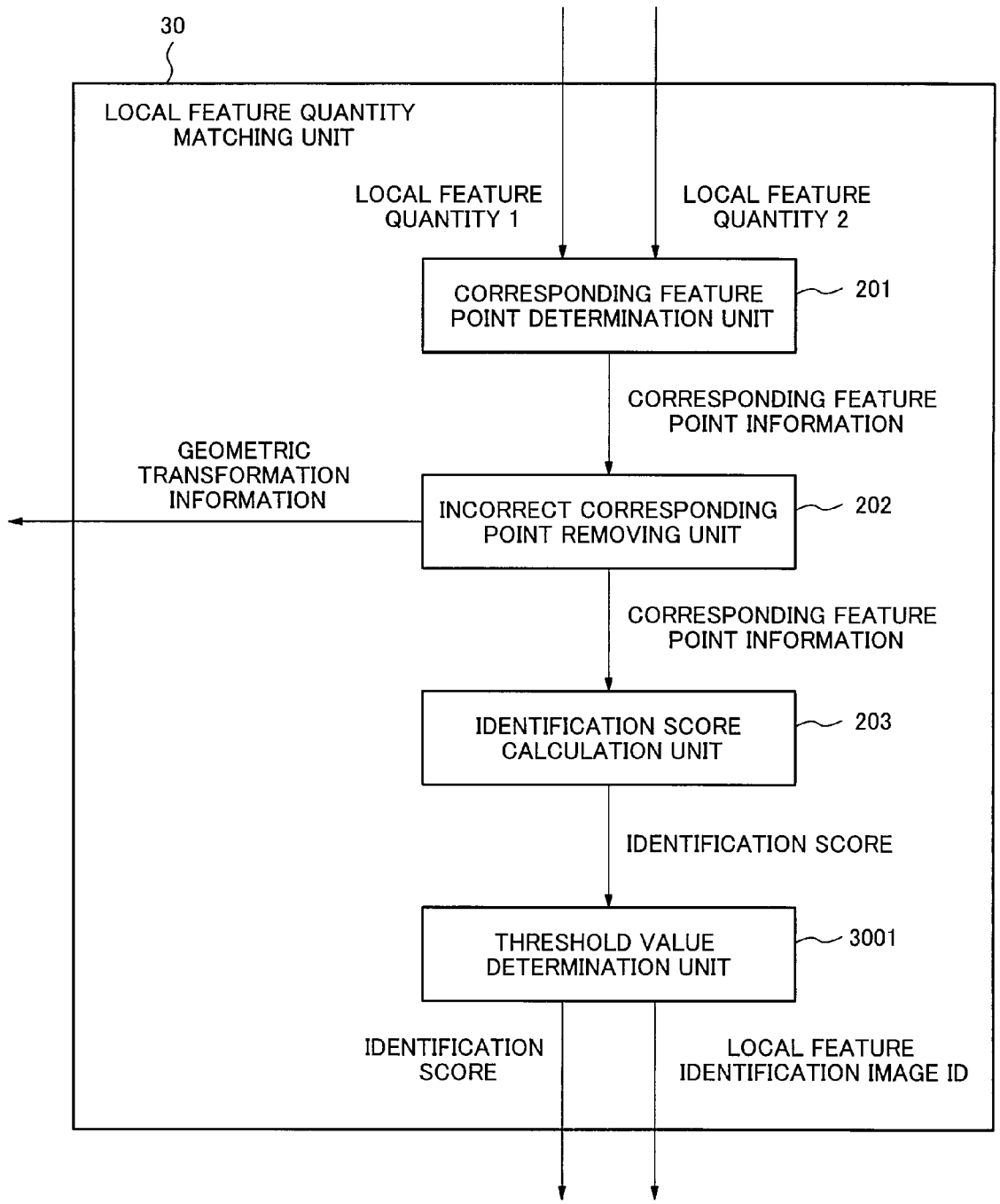
FIG. 56 is a block diagram illustrating an example of a configuration of a local feature quantity matching unit 30.

FIG. 56 is a block diagram illustrating an example of a configuration of the local feature quantity matching unit 30. This diagram will be hereinafter described. As illustrated in FIG. 56, the local feature quantity matching unit 30 is able to be constituted by the corresponding feature point determination unit 201, the incorrect corresponding point removing unit 202, the identification score calculation unit 203, and a threshold value determination unit 3001. The corresponding feature point determination unit 201, the incorrect corresponding point removing unit 202, and the identification score calculation unit 203 of FIG. 56 are the same as the corresponding feature point determination unit 201, the incorrect corresponding point removing unit 202, and the identification score calculation unit 203 which are constituent elements of the local feature quantity matching unit 12 illustrated in FIG. 4, detailed explanation thereabout is omitted. The threshold value determination unit 3001 of FIG. 56 is substantially the same as the threshold value determination unit 204 which is a constituent element of the local feature quantity matching unit 12 illustrated in FIG. 4, but the threshold value determination unit 3001 of FIG. 56 is different in that the threshold value determination unit 3001 of FIG. 56 outputs not only the local feature identification image ID but also the identification score with respect to the local feature extracted from the reference image corresponding to the local feature identification image ID or the reference image group related thereto. The threshold value that is set by the threshold value determination unit 3001 is set less strictly than the threshold value that is set by the threshold value determination unit 204, so that many local feature identification image IDs and many identification scores are output.

Figure 57:
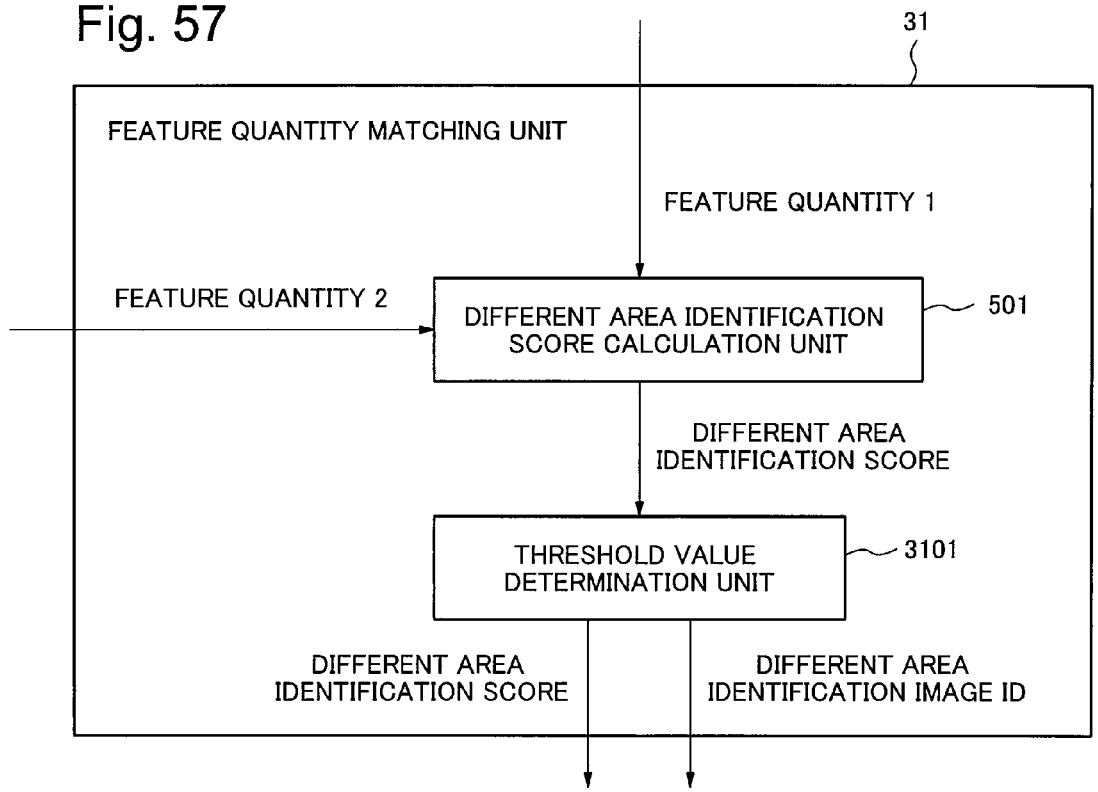
FIG. 57 is a block diagram illustrating an example of a configuration of a feature quantity matching unit 31.

FIG. 57 is a block diagram illustrating an example of a configuration of the feature quantity matching unit 31. This diagram will be hereinafter described. As illustrated in FIG. 57, the feature quantity matching unit 31 is able to be constituted by the different area identification score calculation unit 501 and a threshold value determination unit 3101. The different area identification score calculation unit 501 of FIG. 57 is the same as the different area identification score calculation unit 501 which is a constituent element of the feature quantity matching unit 15 illustrated in FIG. 14, and detailed explanation thereabout is omitted. The threshold value determination unit 3101 of FIG. 57 is substantially the same as the threshold value determination unit 502 which is a constituent element of the feature quantity matching unit 15 illustrated in FIG. 14, but the threshold value determination unit 3101 of FIG. 57 is different in that the threshold value determination unit 3101 of FIG. 57 outputs not only the different area identification image ID but also the different area identification score with respect to the feature quantity extracted from the different area of the reference image corresponding to the different area identification image ID or the reference image group related thereto. The threshold value that is set by the threshold value determination unit 3101 is set less strictly than the threshold value that is set by the threshold value determination unit 502, so that many local feature identification image IDs and many identification scores are output.

Figure 58:
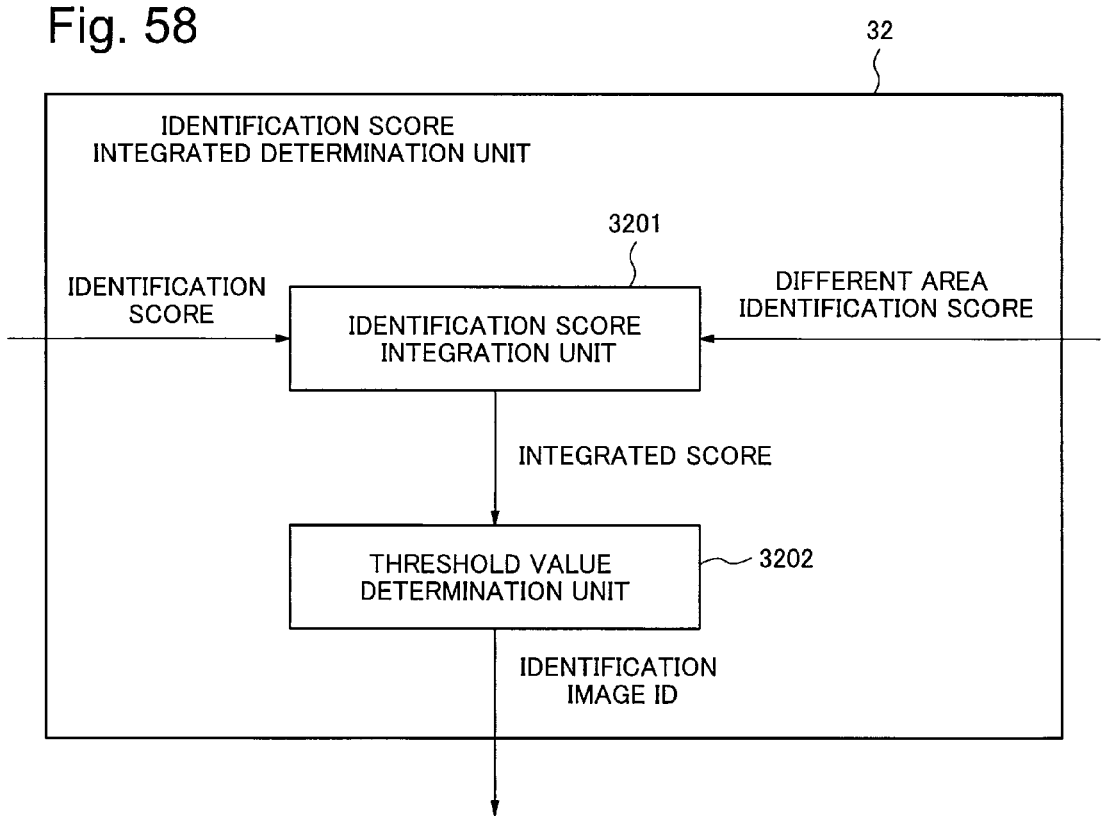
FIG. 58 is a block diagram illustrating an example of a configuration of an identification score integrated determination unit 32.

FIG. 58 is a block diagram illustrating an example of a configuration of the identification score integrated determination unit 32. This diagram will be hereinafter described. As illustrated in FIG. 58, the identification score integrated determination unit 32 is able to be constituted by an identification score integration unit 3201 and a threshold value determination unit 3202. The identification score integration unit 3201 receives the identification scores which are output from the local feature quantity matching unit 30 and the different area identification scores which are output from the feature quantity matching unit 31, and outputs an integrated score. At this occasion, the identification score integrated determination unit 32 may derive, for example, a product of the identification score and the different area identification score which are corresponding to the same image ID, and may output a value thereof as the integrated score. The threshold value determination unit 3202 of FIG. 58 are substantially the same as the threshold value determination unit 204 which is a constituent element of the local feature quantity matching unit 12 illustrated in FIG. 4 and the threshold value determination unit 502 which is a constituent element of the feature quantity matching unit 15 illustrated in FIG. 14 but the threshold value determination unit 3202 of FIG. 58 is different in that the threshold value determination unit 3202 of FIG. 58 receives the integrated score which is output from the identification score integration unit 3201, and outputs, as the identification image ID, the image ID of the image a value of the integrated score of which is equal to or more than a threshold value.

Unlike the first to eleventh exemplary embodiments, the object identification device Z12 according to the twelfth exemplary embodiment of the present invention does not determine the ultimate identification result with the different area identification scores only, but determines the ultimate identification result from a score obtained by integrating them with the identification score based on the local feature quantity. For example, in a case where images showing the same object are captured in a bad environment (for example, dark environment) and another similar object is captured in an ideal environment, and in a case where the similar object is similar not only in the texture but also in the color tone, then it is not possible to perform correct identification with only the feature quantity extracted from the different area. However, when combined with the identification result based on the local feature quantity, the identification result for the same object is able to be relatively increased. It should be noted that the FIG. 55 hereinabove described as the example of the configuration of the twelfth exemplary embodiment of the present invention in order is the configuration based on the first exemplary embodiment. Likewise, FIG. 55 may be configured on the basis of each of the second to eleventh exemplary embodiments, and the thirteenth and fourteenth exemplary embodiments described below. More specifically, the object identification device Z12 is able to be configured such that the local feature quantity matching unit outputs the identification score and the feature quantity matching unit outputs the different area identification score, and the identification score and the different area identification score are input into the identification score integrated determination unit in each of the examples of the configurations of the second to eleventh exemplary embodiments and the thirteenth and fourteenth exemplary embodiments.

Thirteenth Exemplary Embodiment

The thirteenth exemplary embodiment of the present invention will be described with reference to drawings.

Figure 61:
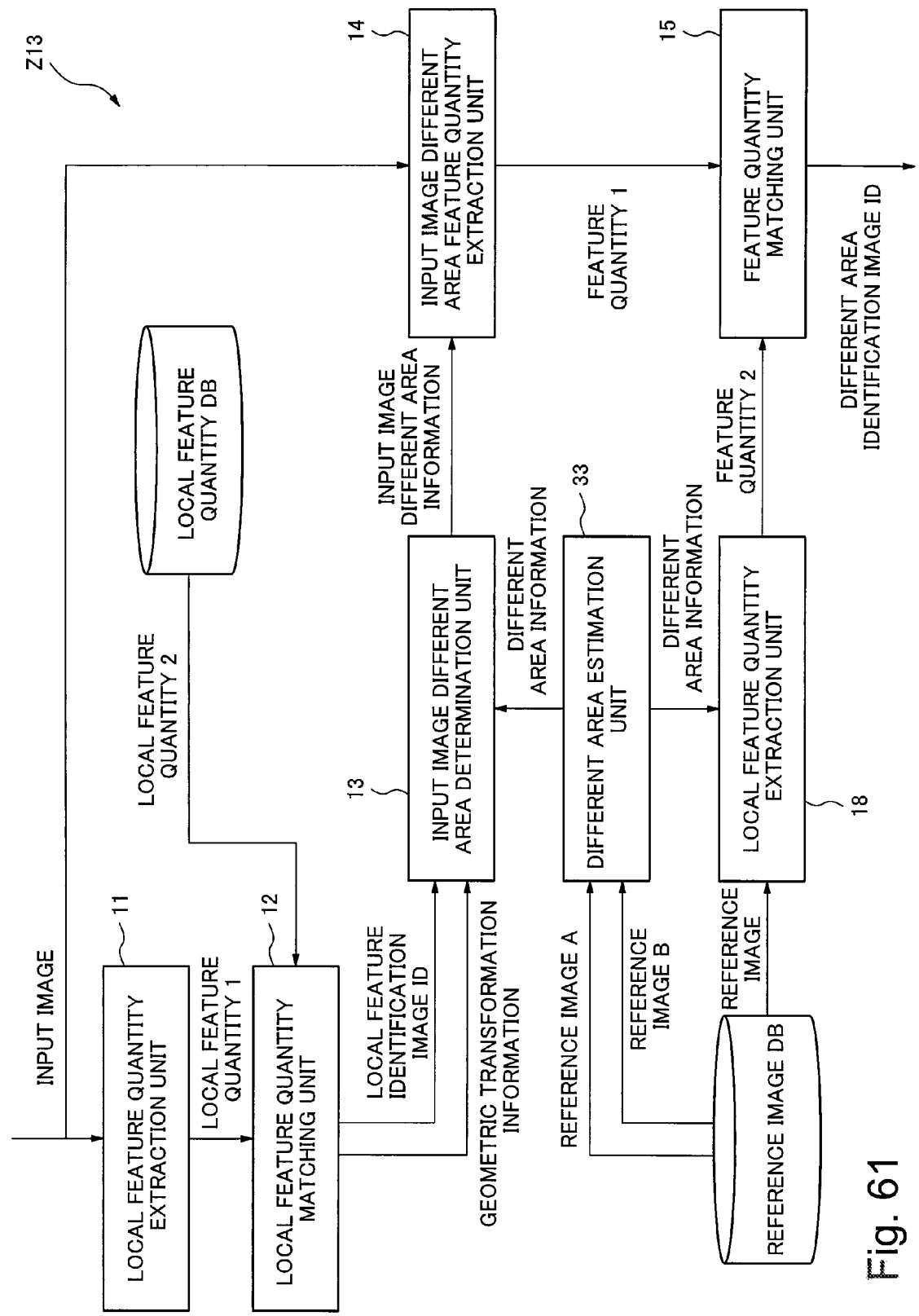
FIG. 61 is a block diagram illustrating an example of a configuration of an object identification device according to a thirteenth exemplary embodiment.

FIG. 61 is a block diagram illustrating an example of a configuration of an object identification device according to the thirteenth exemplary embodiment of the present invention. As illustrated in FIG. 61, an object identification device Z13 according to the thirteenth exemplary embodiment includes the local feature quantity extraction unit 11, the local feature quantity matching unit 12, the input image different area determination unit 13, the input image different area feature quantity extraction unit 14, the feature quantity matching unit 15, the different area feature quantity extraction unit 18, and a different area estimation unit 33. The reference image DB is a database capable of storing multiple reference images.

As described above, the object identification device Z13 according to the thirteenth exemplary embodiment is different in that the different area estimation unit 20 of the object identification device Z4 according to the fourth exemplary embodiment is replaced with the different area estimation unit 33. The other constituent elements are the same as those of the fourth exemplary embodiment. These constituent elements are denoted with the same reference numerals, and detailed explanation thereabout is omitted.

The different area estimation unit 33 compares two reference images at a time, so that the different area estimation unit 33 estimates the different area in the reference image. More specifically, the different area estimation unit 33 performs the following processing. First, the different area estimation unit 33 extracts the local feature quantities from the two reference images, respectively. Subsequently, the different area estimation unit 33 uses the geometric transformation information calculated by matching these local feature quantities to adjust the positions of the two reference images. Subsequently, the different area estimation unit 33 derives the difference of the two reference images which are position-adjusted. Then, the different area estimation unit 33 estimates the different area on the basis of the difference, so that the different area estimation unit 33 outputs the different area information corresponding to the two reference images. The different area estimation unit 33 may output the different area information for each combination of the two reference images selected from the reference images stored in the reference image DB. For example, in a case where the reference image DB stores five reference images, i.e., reference images A, B, C, D, and E, the different area estimation unit 33 may output ten types of different area information, which is as many as the number of combinations of two reference images selected from five reference images.

In the processing of estimating the different area, the different area estimation unit 33 may extract the local feature quantities from the two reference images, respectively, and match the local feature quantities, so that the different area estimation unit 33 calculates the corresponding feature points. Since the calculated corresponding feature points indicate the areas where the two reference images are in conformity (the same area), the different area estimation unit 33 may estimate an area excluding the area circumscribing the corresponding feature points so that the area is determined to be the different area in each reference image, and may output the area as the different area information.

Like the feature quantity matching unit 15 according to the first exemplary embodiment of FIG. 14, the feature quantity matching unit 15 according to the thirteenth exemplary embodiment is able to be constituted by the different area identification score calculation unit 501 and the threshold value determination unit 502. Subsequently, processing performed by the feature quantity matching unit 15 according to the thirteenth exemplary embodiment will be described. The feature quantity matching unit 15 may perform processing according to the following tournament method on the different area information which is output by the different area estimation unit 33. First, in the different area information corresponding to any two reference images, the feature quantity matching unit 15 matches the feature quantity extracted from the different area of the input image and the feature quantity extracted from each of the different areas of the two reference images, and calculates the different area identification score. Then, the feature quantity matching unit 15 selects the reference image having a higher different area identification score, and repeats the same processing on the different area information corresponding to the selected reference image and another reference image that is not processed. This processing is performed until all the reference images are processed. Then, the feature quantity matching unit 15 determines that the reference image ultimately selected is the image showing the same object as the input image, and outputs the ID of the reference image as the different area identification image ID.

An example of specific processing according to the above tournament method will be described. The reference image DB is assumed to be storing five reference images, i.e., the reference images A, B, C, D, and E. First, in the different areas corresponding to the reference image A and the reference image B, the feature quantity matching unit 15 calculates the different area identification score from the feature quantity of the input image and the feature quantity of each of the reference image A and the reference image B. In this case, in a case where the reference image A has a different area identification score higher than that of the reference image B, the feature quantity matching unit 15 calculates the feature quantity of the input image and the different area identification scores from the feature quantities of the reference image A and the reference image C in the different areas corresponding to the reference image A and the reference image C which is a subsequent reference image. In a case where the reference image C has a different area identification score higher than that of the reference image A, the feature quantity matching unit 15 performs the same processing in the different areas corresponding to the reference image C and the reference image D which is a subsequent reference image. In a case where the reference image D has a different area identification score higher than that of the reference image C, the feature quantity matching unit 15 performs the same processing in the different areas corresponding to the reference image D and the reference image E which is a subsequent reference image. In a case where the reference image D has a different area identification score higher than that of the reference image E, all the reference images is processed, and therefore, the feature quantity matching unit 15 determines that the reference image D is an image showing the same object as the input image. Then, the feature quantity matching unit 15 outputs the ID of the reference image D as the different area identification image ID.

Alternatively, the feature quantity matching unit 15 may not necessarily output the reference image ultimately selected in the processing of the tournament method. For example, the feature quantity matching unit 15 may determine whether the average value or the minimum value of the different area identification scores, which are calculated with the combinations of the ultimately selected reference image and another reference image, of the reference image ultimately selected are equal to or more than a threshold value or not, so that the feature quantity matching unit 15 may ultimately determine whether to output or not.

Alternatively, processing different from the processing of the above-described tournament method may be performed. For example, in all the combinations of the reference image, the feature quantity matching unit 15 matches the feature quantity extracted from the different area of the input image and the feature quantity extracted from each of the different areas of the two reference images, and calculates the different area identification score of each of the reference image. Then, instead of selecting one of the reference images in an alternative manner, the feature quantity matching unit 15 selects all the reference images of which different area identification scores are equal to or more than the preset threshold value. Alternatively, the feature quantity matching unit 15 may select all the reference images of which the different area identification scores are equal to or more than the preset threshold value, and of which differences of the different area identification scores from the different area identification scores of other the reference images are equal to or more than a preset value. Then, the feature quantity matching unit 15 may determine that the reference image thus selected is the image showing the same object as the input image, and may output the IDs of the reference images as the different area identification image IDs.

Alternatively, the following processing may be performed. The feature quantity matching unit 15 holds the different area identification score calculated in each combination of the reference images. At the point in time when the different area identification scores is calculated for all the combinations of the reference images, the feature quantity matching unit 15 calculates the average value of the different area identification scores for each of the reference images, and adopts the calculated value as the ultimate different area identification score of each of the reference images. The feature quantity matching unit 15 may output the different area identification image ID on the basis of the ultimate different area identification scores.

In the processing of estimating the different area, the different area estimation unit 33 may estimate the area where the color is not similar in the two reference images so that the area is determined to be the different area. For example, this processing is performed as follows. First, the different area estimation unit 33 changes the sizes of the two reference images so as to make the sizes of the two reference images be the same. Subsequently, the different area estimation unit 33 calculates the degree of similarity of the colors of the pixels corresponding to the two reference images. Subsequently, the different area estimation unit 33 estimates the area where the colors are not similar so that the area is determined to be the different area, and outputs the area as the different area information. In the area detected as the area where the colors are not similar in the comparison of the reference images, the feature quantity matching unit 15 performs the matching processing between the reference image and the input image of which size is changed to the same image size as the reference image. In a case where this method is used, when the degree of similarity of the colors of the reference images or of the reference image and the input image is calculated, the similar colors not only in the corresponding pixels but also in the surrounding pixels may be searched. As a method of calculating the degree of similarity of the colors, for example, a method of calculating a sum of squares of differences of brightness values of each of R (red), G (green), and B (blue) of the pixels to be compared may be used. Alternatively, it may be possible to use a method of calculating, after normalizing each of the brightness values of R, G, and B by using the total summation of the brightness values of R, G, and B, a summation of squares of differences of the normalized values in the pixels to be compared.

In the processing of estimating the different area, the different area estimation unit 33 may estimate the area where not the colors but the edge components are not similar in the two reference images so that the area is determined to be the different area. More specifically, in the two reference images of which sizes have been changed into the same image size, the different area estimation unit 33 extracts the edge components from the reference images, and calculates the degree of similarity of the edge components extracted. Subsequently, the different area estimation unit 33 estimates the area where the edge components are not similar so that the area is determined to be the different area, and outputs the area as the different area information. In the area detected as the area where the edge components are not similar in the comparison between the reference images, the feature quantity matching unit 15 performs matching processing between the input image and the reference image.

The similar processing may be performed by using the feature quantities other than the colors and the edges.

As described above, the object identification device Z13 according to the thirteenth exemplary embodiment of the present invention does not estimate the different area by dynamically comparing the input image and the reference image as is done in the second to twelfth exemplary embodiments, and instead, the object identification device Z13 according to the thirteenth exemplary embodiment of the present invention estimates the different area by comparing the reference images in advance. By using the different area estimated in advance, the object identification device Z13 according to the thirteenth exemplary embodiment of the present invention is able to obtain an identification result in a shorter time compared with the second to twelfth exemplary embodiments.

Fourteenth Exemplary Embodiment

The fourteenth exemplary embodiment of the present invention will be described with reference to drawings.

Figure 62:
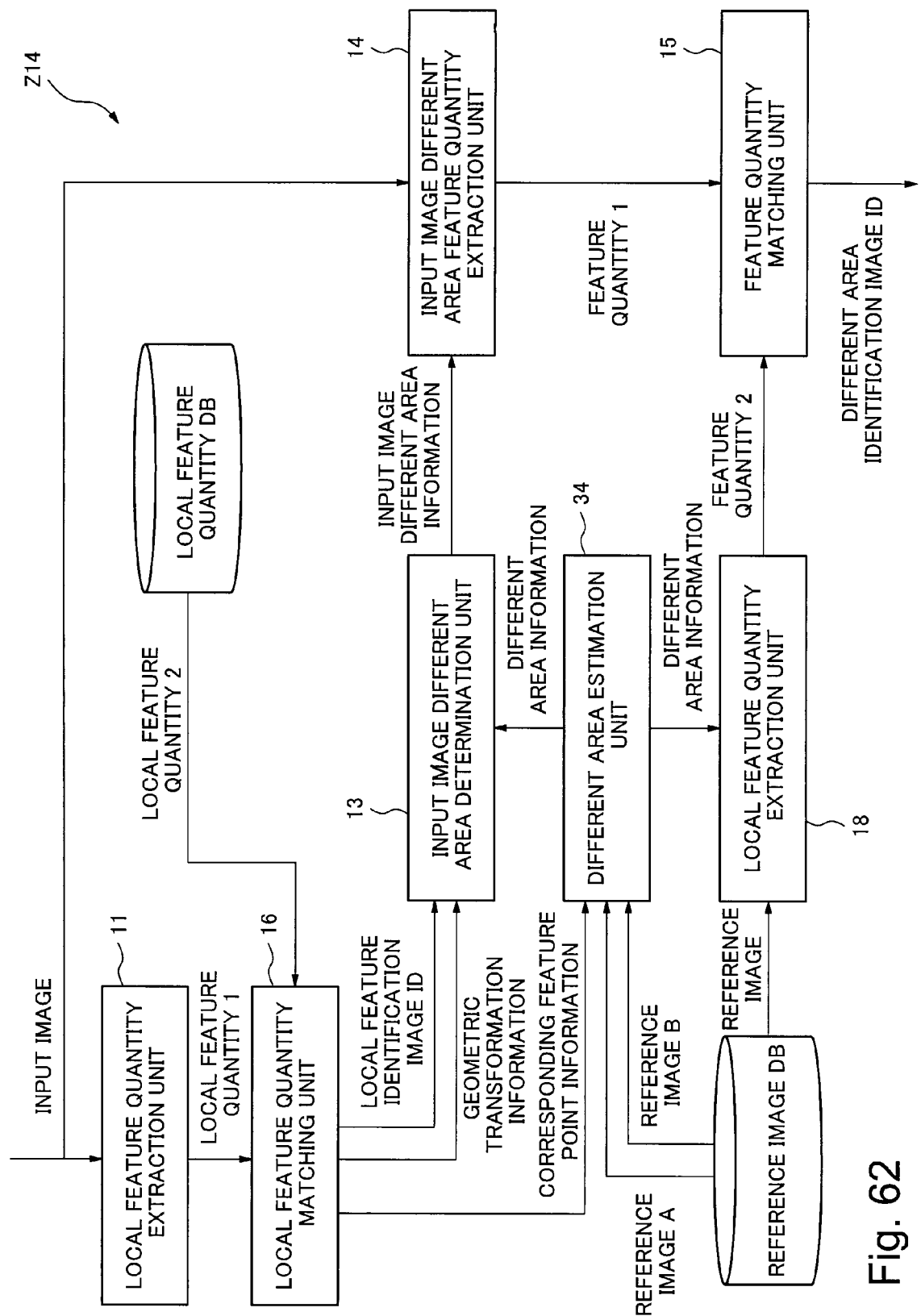
FIG. 62 is a block diagram illustrating an example of a configuration of an object identification device according to a fourteenth exemplary embodiment.

FIG. 62 is a block diagram illustrating an example of a configuration of an object identification device according to the fourteenth exemplary embodiment of the present invention. As illustrated in FIG. 62, an object identification device Z14 according to the fourteenth exemplary embodiment includes the local feature quantity extraction unit 11, the local feature quantity matching unit 16, the input image different area determination unit 13, the input image different area feature quantity extraction unit 14, the feature quantity matching unit 15, the different area feature quantity extraction unit 18, and a different area estimation unit 34.

As described above, the object identification device Z14 according to the fourteenth exemplary embodiment is different in that the local feature quantity matching unit 12 and the different area estimation unit 33 of the object identification device Z13 according to the thirteenth exemplary embodiment are replaced with the local feature quantity matching unit 16 and the different area estimation unit 34. The other constituent elements are the same as those of the thirteenth exemplary embodiment. These constituent elements are denoted with the same reference numerals, and detailed explanation thereabout is omitted.

Like the different area estimation unit 33 according to the thirteenth exemplary embodiment, the different area estimation unit 34 compares two reference images at a time, so that the different area estimation unit 34 estimates the different area in the reference images. The different area estimation unit 34 is different from the thirteenth exemplary embodiment in that, in the processing of estimating the different area, the different area estimation unit 34 uses the corresponding feature point information which is output from the local feature quantity matching unit 16 and the corresponding feature point information of the two reference images (hereinafter referred to as "reference image corresponding feature point information").

More specifically, the different area estimation unit 34 performs the following processing. First, the different area estimation unit 34 extracts the local feature quantities from the two reference images, respectively. Subsequently, the different area estimation unit 34 matches the local feature quantities of the two reference images, thus calculating the reference image corresponding feature point information. Subsequently, the different area estimation unit 34 excludes the corresponding feature point information that matches the calculated reference image corresponding feature point information from the corresponding feature point information which is output from the local feature quantity matching unit 16. Subsequently, the different area estimation unit 34 selects, in the two reference images, the reference image having more corresponding feature point information that remains without being excluded, and in the selected reference image, the different area estimation unit 34 outputs the area circumscribing the remaining corresponding feature points as the different area information corresponding to the two reference images.

Alternatively, instead of the information about the area circumscribing the corresponding feature points, the different area estimation unit 34 may output, as the different area information, the corresponding feature point information itself that is obtained by excluding the corresponding feature point information that matches the reference image corresponding feature point information from the corresponding feature point information. In this case, the feature quantities used by the input image different area feature quantity extraction unit 14 are the local feature quantities.

In the processing of matching, two images are compared at a time like the thirteenth exemplary embodiments.

Like the different area estimation unit 33 according to the thirteenth exemplary embodiment, the method, by the different area estimation unit 34, of estimating the different area in the reference image by comparing two reference images at a time may be the method of adopting the area where the colors and the edge components are not similar as the different area. In this method, the different area estimation unit 34 may additionally perform the processing using the corresponding feature point information of the input image and the reference image. For example, the different area estimation unit 34 may set a high degree of reliability of the calculated degree of similarity of the colors and edges in an area where there is a corresponding feature point in proximity, and may set a low degree of reliability of the calculated degree of similarity of the colors and edges in an area where there is no corresponding feature point in proximity. It should be noted that "high degree of reliability" means the calculated degree of similarity is estimated to be higher (for example, a larger coefficient is multiplied), and "low degree of reliability" means the calculated degree of similarity is estimated to be lower (for example, a smaller coefficient is multiplied).

As described above, in the estimation processing of the different area in advance, the object identification device Z14 according to the fourteenth exemplary embodiment of the present invention performs not only the comparison processing between the reference images but also the processing based on the corresponding feature point information of the input image and the reference image. Therefore, the object identification device Z14 is also able to perform more highly accurate identification than the thirteenth exemplary embodiment.

Figure 59:
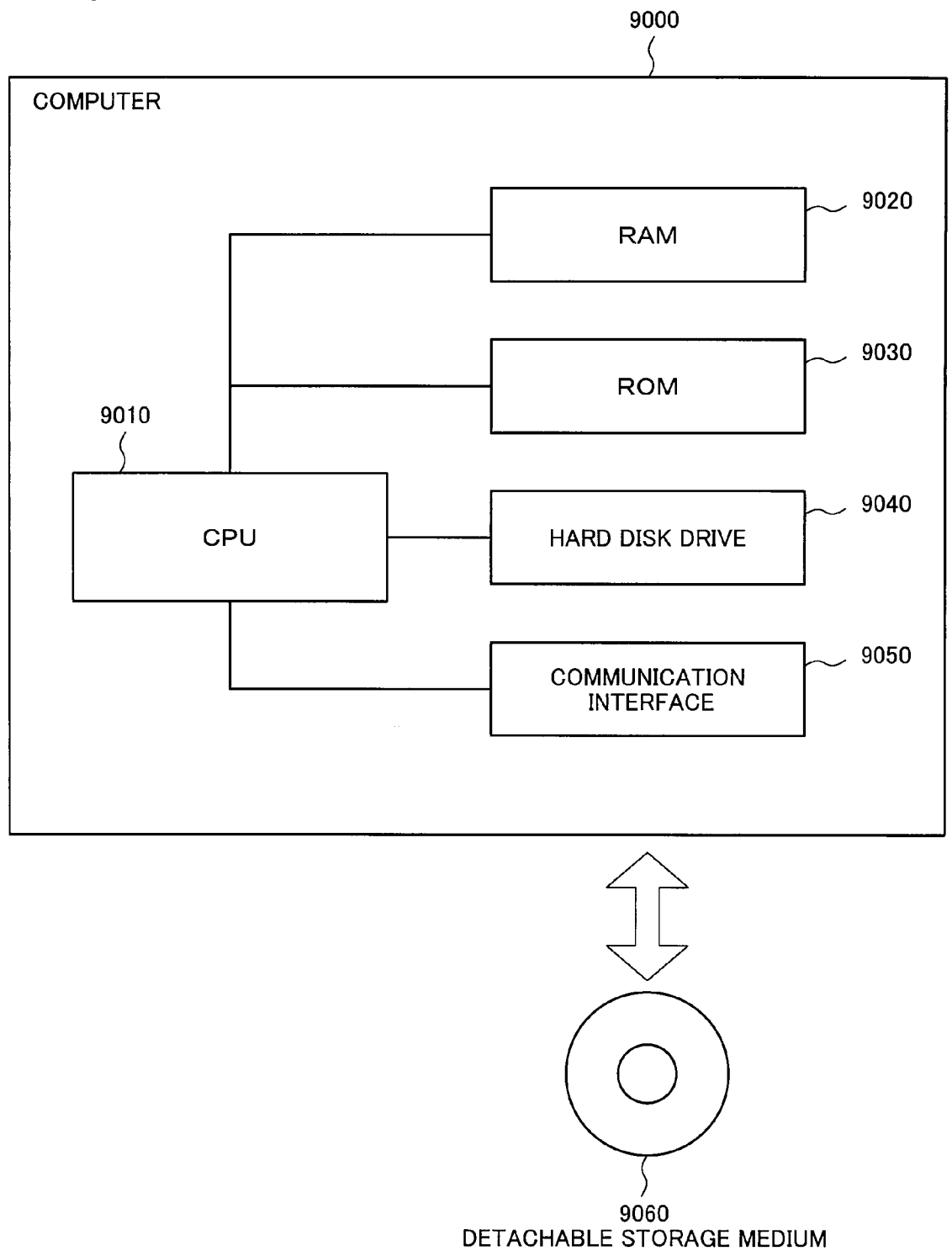
FIG. 59 is a block configuration diagram illustrating examples of elements constituting a computer.

FIG. 59 is a block configuration diagram illustrating examples of elements constituting a computer. A computer 9000 of FIG. 59 includes a CPU (Central Processing Unit) 9010, a RAM (Random Access Memory) 9020, a ROM (Read Only Memory) 9030, a hard disk drive 9040, and a communication interface 9050. A detachable storage medium 9060 is detachably attached to the computer 9000. The detachable storage medium 9060 may be a magnetic disk medium, a optical disk medium, a memory card, or the like, which is detachable.

The constituent elements of the object identification devices Z1, Z1', Z2 to Z14 described above may be realized by causing the CPU 9010 of the computer 9000 to execute a program. More specifically, these constituent elements may be realized by causing the CPU 9010 to read the program from the ROM 9030, the hard disk drive 9040, or the detachable storage medium 9060, and causing the CPU 9010 to execute the read program according to a procedure of a flowchart as illustrated in FIG. 2, for example. In such case, the present invention described using the above exemplary embodiments as examples may be understood as being configured by a code expressing such computer program or a computer readable storage medium (for example, the hard disk drive 9040, the detachable storage medium 9060, and the like) storing a code expressing the computer program.

Alternatively, these constituent elements may be realized by dedicated hardware. The object identification devices Z1, Z1', Z2 to Z14 may be dedicated hardware having the constituent elements thereof.

The invention of the present application is hereinabove described with reference to the exemplary embodiments, but the invention of the present application is not limited to the above exemplary embodiments. The structure and the details of the invention of the present application may be changed in various manners that can be understood by a person skilled in the art within the scope of the invention of the present application.

This application claims priority based on Japanese Patent Application No. 2012-288397 filed on Dec. 28, 2012, and the entire disclosure thereof is incorporated herein by reference.

A part or all of the above exemplary embodiments may be described as in the following Supplementary Notes, but it is to be understood that the present invention is not limited to what is described below.

(Supplementary Note 1) An object identification device characterized by including:
 a local feature quantity matching unit that calculates geometric transformation information for transformation from coordinates in a reference image to corresponding coordinates in an input image, and matches a local feature quantity extracted from the reference image and a local feature quantity extracted from the input image;
 an input image different area determination unit that transforms the different area in the reference image on the basis of the geometric transformation information about the input image determined to be in conformity by the matching, and determines a different area in the input image corresponding to the different area in the reference image;
 an input image different area feature quantity extraction unit that corrects a different area in the input image, and extracts a feature quantity from the corrected different area of the input image; and
 a feature quantity matching unit that matches a feature quantity extracted by the input image different area feature quantity extraction unit and a feature quantity extracted from the different area in the reference image, and outputs a matching result.

(Supplementary Note 2) The object identification device according to Supplementary Note 1, wherein the input image different area feature quantity extraction unit corrects the different area of the input image into an area enlarged by a preset pixel, and extracts a feature quantity from the corrected different area of the input image.

(Supplementary Note 3) The object identification device according to Supplementary Note 1, wherein the input image different area feature quantity extraction unit corrects the different area of the input image into an area enlarged by a preset ratio on the basis of a reference point in the different area, and extracts a feature quantity from the corrected different area of the input image.

(Supplementary Note 4) The object identification device according to Supplementary Note 1, wherein in a case where there is an area where edges are concentrated at an end in the different area of the input image, the input image different area feature quantity extraction unit corrects the different area of the input image into an area enlarged in a direction where the edges are concentrated, and extracts a feature quantity from the corrected different area of the input image.

(Supplementary Note 5) The object identification device according to Supplementary Note 1, further including: a different area estimation unit which compares two reference images at a time, and calculates, as the different area in the reference image, an area where there is a difference between compared reference images.

(Supplementary Note 6) The object identification device according to Supplementary Note 5, wherein
 the local feature quantity matching unit outputs geometric transformation information and corresponding feature point information including information indicating a correctly corresponding feature point and an incorrectly corresponding feature point, and
 the different area estimation unit calculates the different area in the reference image on the basis of corresponding feature point information which is output from the local feature quantity matching unit.

(Supplementary Note 7) The object identification device according to any one of Supplementary Notes 1 to 6, wherein
 the input image different area feature quantity extraction unit outputs a first feature quantity which is a feature quantity extracted from a different area in the input image determined by the input image different area determination unit, and a second feature quantity which is a feature quantity extracted by the input image different area feature quantity extraction unit, and
 the feature quantity matching unit matches the first feature quantity and a feature quantity extracted from the different area in the reference image, and in a case where it is determined that there is no sameness, the feature quantity matching unit matches the second feature quantity and the feature quantity extracted from the different area in the reference image, and outputs a result of the matching.

(Supplementary Note 8) The object identification device according to Supplementary Note 7, wherein the feature quantity matching unit executes, in parallel, matching of the first feature quantity and the feature quantity extracted from the different area in the reference image and matching of the second feature quantity and the feature quantity extracted from the different area in the reference image, and outputs, as a matching result, a result obtained by integrating the results of the two matchings.

(Supplementary Note 9) An object identification method including:
 a local feature quantity matching step of calculating geometric transformation information for transformation from coordinates in a reference image to corresponding coordinates in an input image, and matching a local feature quantity extracted from the reference image and a local feature quantity extracted from the input image;
 an input image different area determination step of transforming the different area in the reference image on the basis of the geometric transformation information about the input image determined to be in conformity by the matching, and determining a different area in the input image corresponding to the different area in the reference image;
 an input image different area feature quantity extraction step of correcting a different area in the input image, and extracting a feature quantity from the corrected different area of the input image; and
 a feature quantity matching step of matching a feature quantity extracted in the input image different area feature quantity extraction step and a feature quantity extracted from the different area in the reference image, and outputting a matching result.

(Supplementary Note 10) A program for causing a computer to function as:
- a local feature quantity matching unit that calculates geometric transformation information for transformation from coordinates in a reference image to corresponding coordinates in an input image, and matches a local feature quantity extracted from the reference image and a local feature quantity extracted from the input image;
- an input image different area determination unit that transforms the different area in the reference image on the basis of the geometric transformation information about the input image determined to be in conformity by the matching, and determines a different area in the input image corresponding to the different area in the reference image;
- an input image different area feature quantity extraction unit that corrects a different area in the input image, and extracts a feature quantity from the corrected different area of the input image; and
- a feature quantity matching unit that matches a feature quantity extracted by the input image different area feature quantity extraction unit and a feature quantity extracted from the different area in the reference image, and outputs a matching result.

INDUSTRIAL APPLICABILITY

By a conventional object identification using only a local feature quantity, it is difficult to perform accurate identification of products which are of the same brand but are different only in the color of the package or some of the characters, and it is difficult to perform accurate identification of mails which are of the same envelopes but are different only in the recipient names. According to the present invention, small difference, which could not be identified by performing only the matching based on a conventional local feature quantity, is able to be distinguished, and only an image showing the same object is able to be identified. The present invention is able to be applied to a barcodeless POS (Point of Sale) system, an inspection system, a mail automatic sorting system, and the like.

REFERENCE SIGNS LIST

Z1, Z1', Z2, Z3, Z4, Z5, Z6, Z7, Z8, Z9, Z10, Z11, Z12, Z13, Z14 object identification device
11 local feature quantity extraction unit
12 local feature quantity matching unit
13 input image different area determination unit
14 input image different area feature quantity extraction unit
15 feature quantity matching unit
16 local feature quantity matching unit
17 different area estimation unit
18 different area feature quantity extraction unit
19 different area estimation unit
20 different area estimation unit
21 different area estimation unit
22 different area estimation unit
23 different area estimation unit
24 different area estimation unit
25 different area estimation unit
26 input image different area feature quantity extraction unit
27 feature quantity matching unit
28 input image different area feature quantity extraction unit
29 feature quantity matching unit
30 local feature quantity matching unit
31 feature quantity matching unit
32 identification score integrated determination unit
33 different area estimation unit
34 different area estimation unit
101 brightness information extraction unit
102 local feature point detection unit
103 local feature quantity generation unit
201 corresponding feature point determination unit
202 incorrect corresponding point removing unit
203 identification score calculation unit
204 threshold value determination unit
401 different area information correction unit
402 corrected different area image generation unit
403 different area feature quantity calculation unit
404 different area image generation unit
501 different area identification score calculation unit
502 threshold value determination unit
701 incorrect corresponding feature point concentration degree search unit
801 different area image generation unit
901 object area estimation unit
902 incorrect corresponding feature point concentration degree search unit
2001 transformation image generation unit
2002 different image generation unit
2003 object area estimation unit
2004 large difference area detection unit
2101 large difference area detection unit
2102 incorrect corresponding feature point concentration degree search unit
2103 incorrect corresponding feature point concentration degree search unit
2104 different image generation unit
2105 large difference area detection unit
2106 different candidate area overlapping detection unit
2201 template matching unit
2202 template matching unit
2301 template matching unit
2302 template matching unit
2501 template matching unit
2502 different candidate area overlapping detection unit
2601 different area local feature quantity extraction unit
2602 different area local feature quantity extraction unit
2701 incorrect corresponding point removing unit
2702 threshold value determination unit
2901 different area identification score calculation unit
2902 threshold value determination unit
2903 different area identification score calculation unit
2904 different area identification score calculation unit
2905 threshold value determination unit
3001 threshold value determination unit
3101 threshold value determination unit
3201 identification score integration unit
3202 threshold value determination unit
9000 computer
9010 CPU
9020 RAM
9030 ROM
9040 hard disk drive
9050 communication interface
9060 detachable storage medium
40301 color configuration ratio feature quantity calculation unit
40302 color arrangement feature quantity calculation unit
40303 character matching feature quantity calculation unit 40304 binarization processing unit
40305 character area detection unit
40306 character matching feature quantity calculation unit
40307 image value extraction unit
40308 shape feature quantity calculation unit

What is claimed is:

1. An object identification device comprising:
a memory that stores a set of instructions; and
at least one processor configured to execute the set of instructions to:
calculate geometric transformation information for transformation from coordinates in a reference image to corresponding coordinates in an input image captured electronically, and matches perform matching between a local feature quantity extracted from the reference image and a local feature quantity extracted from the input image;
estimate a different area in the reference image on a basis of density of incorrectly corresponding feature points that is feature points whose feature quantities are determined to incorrectly correspond;
transform the different area in the reference image on a basis of the geometric transformation information calculated for the input image determined to correspond to the reference image by the matching, and determine the transformed area in the reference image to be a different area in the input image corresponding to the different area in the reference image;
correct the different area in the input image, and extracts a feature quantity from the corrected different area of the input image; and
match the feature quantity extracted from the different area in the input image and a feature quantity extracted from the different area in the reference image, and output a matching result indicating an extent to which the input image captured electronically matches the reference image.

2. The object identification device according to claim 1, wherein
the set of instructions is executed by the at least one processor to further correct the different area of the input image into an area enlarged by a preset pixel, and extract the feature quantity from the corrected different area of the input image.

3. The object identification device according to claim 1, wherein
the set of instructions is executed by the at least one processor to further correct the different area of the input image into an area enlarged by a preset ratio on a basis of a reference point in the different area, and extracts the feature quantity from the corrected different area of the input image.

4. The object identification device according to claim 1, wherein
in a case where there is an area where edges are concentrated at an end in the different area of the input image, the set of instructions is executed by the at least one processor to further correct the different area of the input image into an area enlarged in a direction where the edges are concentrated, and extracts the feature quantity from the corrected different area of the input image.

5. The object identification device according to claim 1 wherein the set of instructions is executed by the at least one processor to further:
compare two reference images at a time, and calculates, as the different area in the reference image, an area where there is a difference between compared reference images.

6. The object identification device according to claim 5, wherein the set of instructions is executed by the at least one processor to further:
output geometric transformation information and corresponding feature point information including information indicating a correctly corresponding feature point and an incorrectly corresponding feature point, and
calculate the different area in the reference image on a basis of corresponding feature point information which has been output.

7. The object identification device according claim 1, wherein the set of instructions is executed by the at least one processor to further:
output a first feature quantity which is the feature quantity extracted from the different area in the input image that has been determined, and a second feature quantity which is the feature quantity that has been extracted, and
match the first feature quantity and the feature quantity extracted from the different area in the reference image, and in a case where it is determined that there is no sameness, match the second feature quantity and the feature quantity extracted from the different area in the reference image, and outputs a result of the matching.

8. The object identification device according to claim 7, wherein the set of instructions is executed by the at least one processor to further:
execute, in parallel, matching of the first feature quantity and the feature quantity extracted from the different area in the reference image and matching of the second feature quantity and the feature quantity extracted from the different area in the reference image, and output, as a matching result, a result obtained by integrating the results of the two matchings.

9. An object identification method comprising:
calculating geometric transformation information for transformation from coordinates in a reference image to corresponding coordinates in an input image captured electronically, and matching a local feature quantity extracted from the reference image and a local feature quantity extracted from the input image;
estimating a different area in the reference image on a basis of density of incorrectly corresponding feature points that is feature points whose feature quantities are determined to incorrectly correspond;
transforming the different area in the reference image on a basis of the geometric transformation information calculated for the input image determined to correspond to the reference image by the matching, and determining in the transformed area in the reference image to be a different area in the input image corresponding to the different area in the reference image;
correcting the different area in the input image, and extracting a feature quantity from the corrected different area of the input image; and
matching the feature quantity extracted from the different area of the input image and a feature quantity extracted from the different area in the reference image, and outputting a matching result indicating an extent to which the input image captured electronically matches the reference image.

10. A non-transitory computer readable storage medium storing a computer program causing a computer to perform:

local feature quantity matching processing of calculating geometric transformation information for transformation from coordinates in a reference image to corresponding coordinates in an input image captured electronically, and matching a local feature quantity extracted from the reference image and a local feature quantity extracted from the input image;

estimating processing of estimating a different area in the reference image on a basis of density of incorrectly corresponding feature points that is feature points whose feature quantities are determined to incorrectly correspond;

input image different area determination processing of transforming the different area in the reference image on a basis of the geometric transformation information calculated for the input image determined to correspond to the reference image by the matching, and determining in the transformed area in the reference image to be the different area in the input image corresponding to the transformed different area in the reference image;

input image different area feature quantity extraction processing of correcting the different area in the input image, and extracting a feature quantity from the corrected different area of the input image; and feature quantity matching processing of matching the feature quantity extracted by the input image different area feature quantity extraction processing and the feature quantity extracted from the different area in the reference image, and outputting a matching result indicating an extent to which the input image captured electronically matches the reference image.

* * * * *